(12) United States Patent
Patterson et al.

(10) Patent No.: US 11,221,535 B2
(45) Date of Patent: *Jan. 11, 2022

(54) MOISTURE RESISTANT ELECTROCHROMIC DEVICE

(71) Applicant: SAGE Electrochromics, Inc., Faribault, MN (US)

(72) Inventors: Zachary Richard Patterson, Burnsville, MN (US); Erik Jon Bjornard, Lakeville, MN (US); Avanti M. Jain, Richland, WA (US); Jean-Christophe Giron, Edina, MN (US); Neil L. Sbar, Northfield, MN (US)

(73) Assignee: SAGE Electrochromics, Inc., Faribault, MN (US)

( * ) Notice: Subject to any disclaimer, the term of this patent is extended or adjusted under 35 U.S.C. 154(b) by 434 days.

This patent is subject to a terminal disclaimer.

(21) Appl. No.: 15/948,975

(22) Filed: Apr. 9, 2018

(65) Prior Publication Data

US 2018/0299742 A1    Oct. 18, 2018

Related U.S. Application Data

(63) Continuation of application No. 14/741,166, filed on Jun. 16, 2015, now Pat. No. 9,939,704.

(Continued)

(51) Int. Cl.
*G02F 1/15* (2019.01)
*G02F 1/03* (2006.01)
(Continued)

(52) U.S. Cl.
CPC .......... *G02F 1/161* (2013.01); *G02F 1/13439* (2013.01); *G02F 1/153* (2013.01);
(Continued)

(58) Field of Classification Search
CPC .... G02F 1/1523; G02F 1/1525; G02F 1/1521; G02F 1/1533; G02F 1/155; G02F 1/03;
(Continued)

(56) References Cited

U.S. PATENT DOCUMENTS

| | | | |
|---|---|---|---|
| 4,728,177 A * | 3/1988 | Green | G02F 1/1523 |
| | | | 235/382.5 |
| 5,233,461 A | 8/1993 | Dornan et al. | |

(Continued)

FOREIGN PATENT DOCUMENTS

| | | |
|---|---|---|
| CN | 101218536 | 7/2008 |
| JP | H09138430 A | 5/1997 |
| JP | 2001033830 | 2/2001 |

OTHER PUBLICATIONS

First Office Action from Application No. 201580041847.7, dated Mar. 12, 2019, pp. 1-31.

(Continued)

*Primary Examiner* — Dawayne Pinkney
(74) *Attorney, Agent, or Firm* — Robert C. Kowert; Kowert, Hood, Munyon, Rankin & Goetzel, P.C.

(57) ABSTRACT

An electrochromic device is structured to restrict moisture permeation between an electrochromic stack in the device and an external environment. The electrochromic device includes conductive layers and one or more encapsulation layers, where the encapsulation layers and conductive layers collectively isolate the electrochromic stack from the ambient environment. The encapsulation layers resist moisture permeation, and at least the outer portions of the conductive layers resist moisture permeation. The moisture-resistant electrochromic device can be fabricated based at least in part upon selective removal of one or more outer portions of at least the EC stack, so that at least the encapsulation layer extends over one or more edge portions of the EC stack to isolate the edge portions of the EC stack from the ambient (Continued)

environment. The encapsulation layer can include one or more of an anti-reflective layer, infrared cut-off filter, etc.

20 Claims, 25 Drawing Sheets

Related U.S. Application Data

(60) Provisional application No. 62/013,403, filed on Jun. 17, 2014.

(51) Int. Cl.
| | |
|---|---|
| *G09G 3/19* | (2006.01) |
| *G09G 3/38* | (2006.01) |
| *H04N 9/24* | (2006.01) |
| *H04N 9/16* | (2006.01) |
| *G02F 1/161* | (2006.01) |
| *G02F 1/153* | (2006.01) |
| *G02F 1/155* | (2006.01) |
| *G02F 1/1523* | (2019.01) |
| *G02F 1/1343* | (2006.01) |
| *G02F 1/163* | (2006.01) |
| *G02F 1/1514* | (2019.01) |
| *G02F 1/157* | (2006.01) |

(52) U.S. Cl.
CPC .............. *G02F 1/155* (2013.01); *G02F 1/157* (2013.01); *G02F 1/1525* (2013.01); *G02F 1/1533* (2013.01); *G02F 1/163* (2013.01); *G02F 2001/1555* (2013.01); *G02F 2001/15145* (2019.01); *G02F 2201/50* (2013.01); *Y10T 156/10* (2015.01)

(58) Field of Classification Search
CPC .......... G02F 1/0316; G02F 3/16; G02F 1/163; C09K 9/02; B60R 1/088; H04N 9/3137; H04N 9/22; G09G 3/16

USPC ........ 359/265–275, 277, 245–247, 254, 242; 345/49, 105; 250/70; 438/929; 348/814, 348/817; 349/182–186
See application file for complete search history.

(56) References Cited

U.S. PATENT DOCUMENTS

| | | |
|---|---|---|
| 5,995,271 A | 11/1999 | Zieba et al. |
| 7,894,120 B2 | 2/2011 | Valentin et al. |
| 2003/0156313 A1 | 8/2003 | Serra et al. |
| 2008/0190759 A1 | 8/2008 | Valenrtin et al. |
| 2010/0039690 A1 | 2/2010 | Agrawal et al. |
| 2012/0327499 A1 | 12/2012 | Parker et al. |
| 2013/0215489 A1 | 8/2013 | Blackburn et al. |
| 2013/0222877 A1 | 8/2013 | Greer et al. |
| 2013/0222878 A1 | 8/2013 | Greer et al. |
| 2013/0258436 A1* | 10/2013 | Podbelski ......... B32B 17/10266 359/265 |
| 2014/0002884 A1 | 1/2014 | Marcel et al. |
| 2014/0133005 A1 | 5/2014 | Sbar et al. |
| 2014/0226199 A1 | 8/2014 | Kukita |

OTHER PUBLICATIONS

Office Action from Chinese Application No. 10820501590, dated May 28, 2019, (Chinese Version and English Translation), pp. 1-20.
International Search Report and Written Opinion from PCT/US2015/036100, Sage Electrochomics, Inc., dated Sep. 23, 2015, pp. 1-7.
European Office action from Application No. 15810524.7-1210, dated Sep. 18, 2020, pp. 1-6.
Office action and Search Report from Chinese Application No. 201580041847.7, dated Feb. 22, 2021, (English translation and Chinese version), pp. 1-21.

* cited by examiner

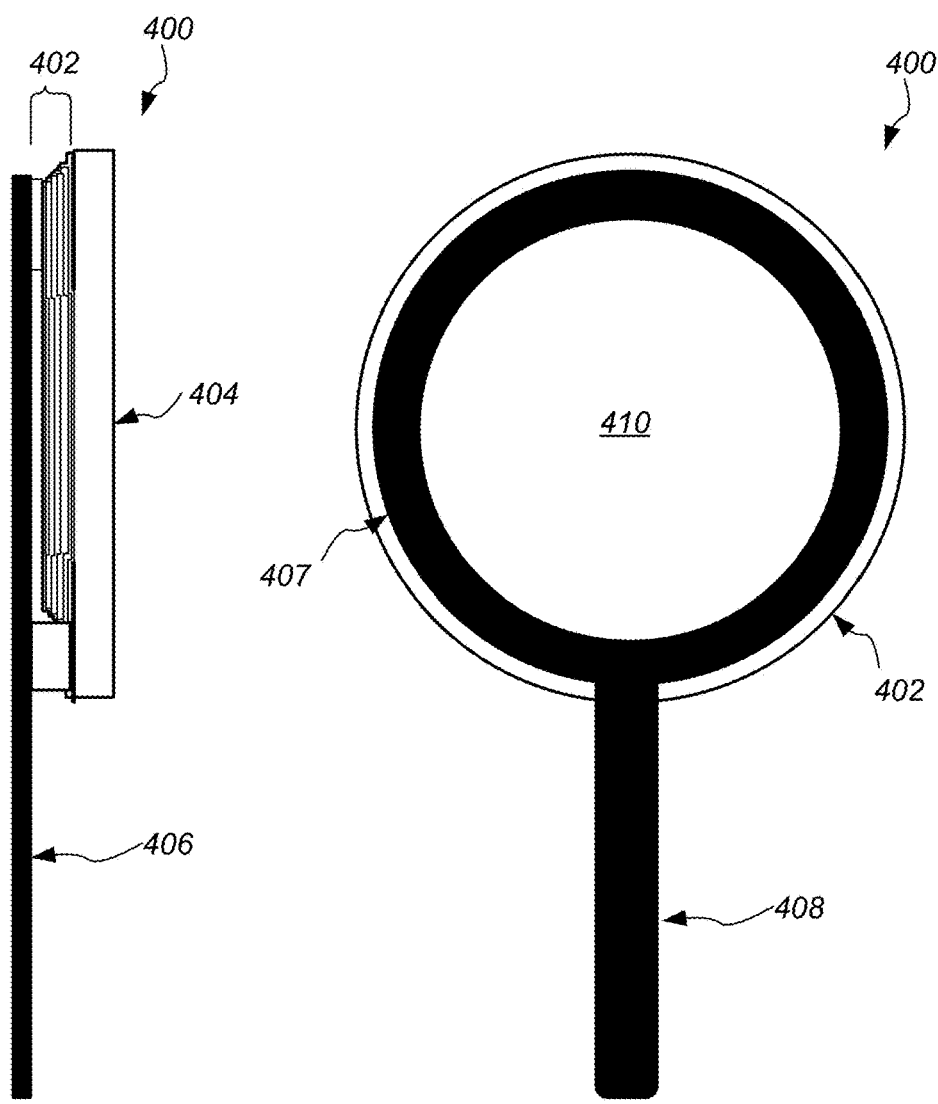
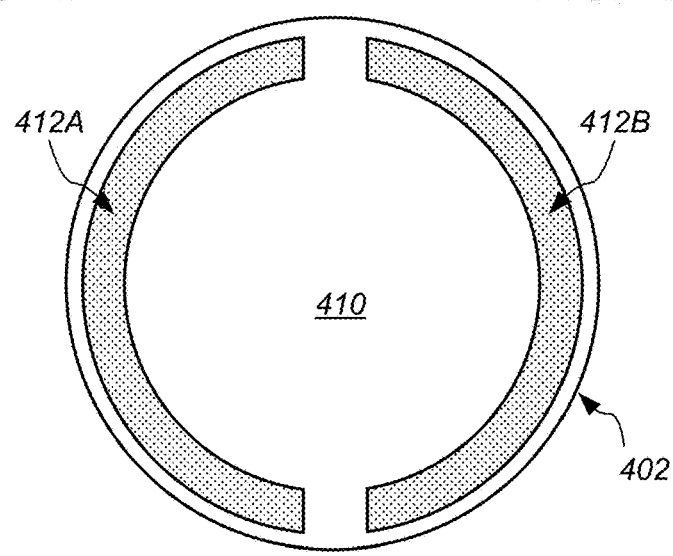
FIG. 4A    FIG. 4B
FIG. 4C

MOISTURE RESISTANT ELECTROCHROMIC DEVICE

PRIORITY INFORMATION

This application is a continuation of U.S. patent application Ser. No. 14/741,166, filed Jun. 16, 2015, now U.S. Pat. No. 9,939,704, which claims benefit of priority to U.S. Provisional Patent Application No. 62/013,403, filed Jun. 17, 2014 titled "MOISTURE RESISTANT ELECTROCHROMIC DEVICE," which are hereby incorporated by reference herein in their entirety.

BACKGROUND

Electrochromic devices include electrochromic materials that are known to change their optical properties, such as coloration, in response to the application of an electrical potential, thereby making the device more or less transparent or more or less reflective. Typical electrochromic ("EC") devices include a counter electrode layer ("CE layer"), an electrochromic material layer ("EC layer") which is deposited substantially parallel to the counter electrode layer, and an ionically conductive layer ("IC layer") separating the counter electrode layer from the electrochromic layer respectively. In addition, two transparent conductive layers ("TC layers") respectively are substantially parallel to and in contact with the CE layer and the EC layer. The EC layer, IC layer, and CE layer can be referred to collectively as an EC stack, EC thin film stack, etc.

Materials for making the CE layer, the EC layer, the IC layer and the TC layers are known and described, for example, in US. Patent Application No. 2008/0169185, incorporated by reference herein, and desirably are substantially transparent oxides or nitrides. When an electric potential is applied across the layered structure of the electrochromic device, such as by connecting the respective TC layers to a low voltage electrical source, ions, which can include Li+ ions stored in the CE layer, flow from the CE layer, through the IC layer and to the EC layer. In addition, electrons flow from the CE layer, around an external circuit including a low voltage electrical source, to the EC layer so as to maintain charge neutrality in the CE layer and the EC layer. The transfer of ions and electrons to the EC layer causes the optical characteristics of the EC layer, and optionally the CE layer in a complementary EC device, to change, thereby changing the coloration and, thus, the transparency of the electrochromic device.

Changes in coloration of a medium, which can include one or more layers, stacks, devices, etc., can be described as changes in "transmission" of the medium. As used hereinafter, transmission refers to the permittance of the passage of electromagnetic (EM) radiation, which can include visible light, through the medium, and a "transmission level" of the medium can refer to a transmittance of the medium. Where a medium changes transmission level, the medium may change from a clear transmission state ("full transmission level") to a transmission level where a reduced proportion of incident EM radiation passes through the medium. Such a change in transmission level may cause the coloration of the medium to change, the transparency to change, etc. For example, a medium which changes from a full transmission level to a lower transmission level may be observed to become more opaque, darker in coloration, etc.

In some cases, an EC device can switch between separate transmission levels based at least in part upon application of an electric potential across the EC device. Such application, which can include applying one or more separate voltages to one or more separate layers of the EC device, can cause one or more layers of the EC stack, including the EC layer, CE layer, etc. to change coloration, transparency, etc. In some cases, it may be desirable for different regions of an EC stack to change transmission levels differently, so that application of an electric potential across the EC stack causes separate regions of the EC stack to change to separate ones of two or more different transmission levels.

In some cases, an electrochromic device can be located in an environment which includes moisture. For example, an electrochromic device may be exposed to an ambient environment in which the ambient environment is a mixture of ambient air and water vapor. Moisture from the ambient environment can permeate through various layers of the EC device, including the EC stack. Where an EC stack is sensitive to moisture, permeation of moisture to the EC stack can cause degraded performance of the EC stack, including a degraded ability of the EC stack to change coloration based at least in part upon applied electric potential.

BRIEF DESCRIPTION OF THE DRAWINGS

FIG. 4A-C illustrate an apparatus which can include one or more electrochromic devices which are structured to selectively switch separate EC regions between different transmission levels to selectively apodize a window through which light passes from an imaged subject to a light sensor of a camera, according to some embodiments.

Figure 1A:
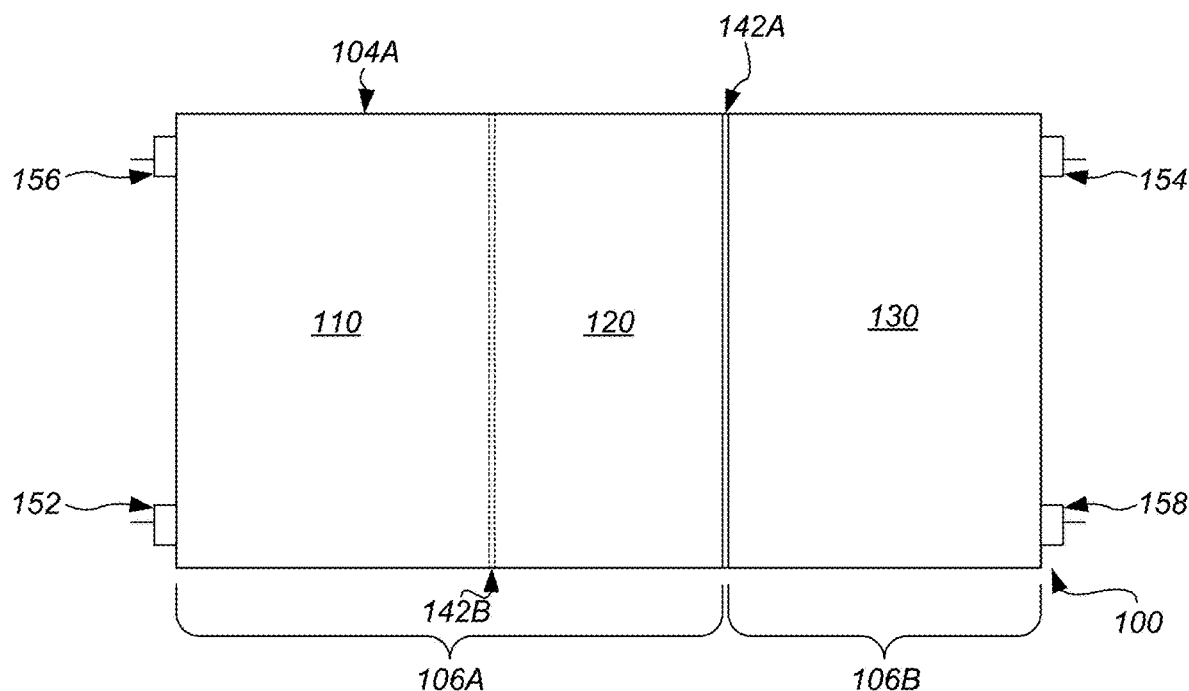
FIG. 1A, FIG. 1B, and FIG. 1C illustrate plan and cross-sectional views, respectively, of an EC device which comprises multiple separate EC regions, according to some embodiments.

The various embodiments described herein are susceptible to various modifications and alternative forms. Specific embodiments are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of an electrochromic (EC) device and methods for configuring an electrochromic device are disclosed. An EC device can be structured to selectively switch between different transmission levels in different regions of the EC device. The methods for configuring an EC device can include methods for configuring the EC device to selectively switch between different transmission levels in different regions of the EC device. An EC device can be structured to restrict moisture permeation between an EC stack of the device and an external environment. The methods for configuring an EC device can include methods for structuring the EC device to restrict moisture permeation between an EC stack of the device and an external environment.

As used hereinafter, "configuring" an EC device can be referred to interchangeably as "structuring" the EC device, and an EC device which is "configured to" do something can be referred to interchangeably as an EC device which is "structured" to do something, "structurally configured" to do something, etc.

I. Controlled Electrochromic Switching with Isolated Electrochromic Regions

In some embodiments, an electrochromic (EC) device includes multiple regions ("EC regions") which are independently controllable, so that two or more separate regions can be selectively switched, reversibly switched, etc. to separate ones of at least two different transmission levels. In some embodiments, the two or more separate EC regions can be switched to one or more separate transmission patterns, including one or more transmission distribution patterns. In some embodiments, each of the EC regions of the EC device may have the same or different sizes, volume, and/or surface areas. In other embodiments, each of the EC regions may have the same or different shapes (including curved or arcuate shapes).

Figure 1B:
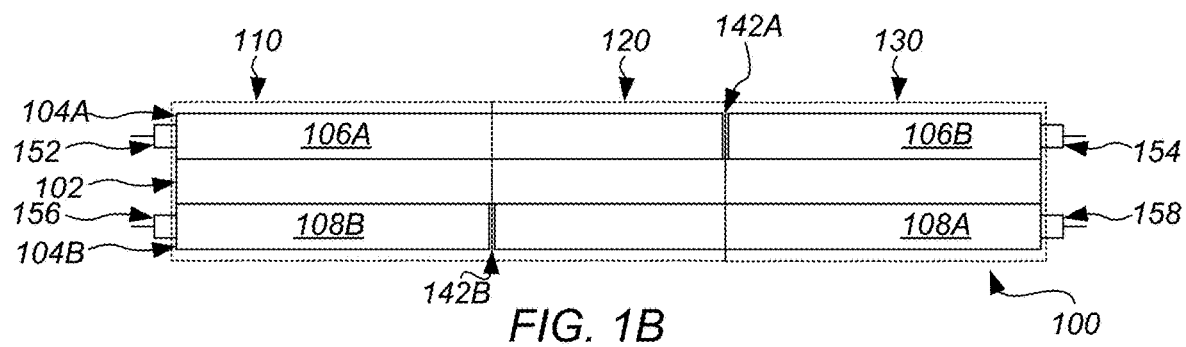
Figure 1C:
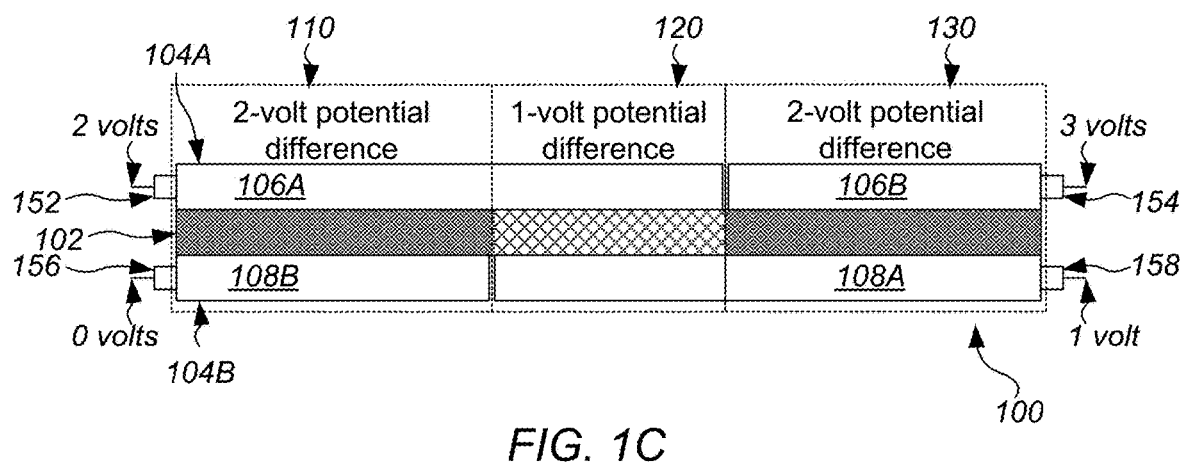

FIG. 1A, FIG. 1B, and FIG. 1C illustrate plan and cross-sectional views, respectively, of an EC device 100 which comprises multiple separate EC regions, according to some embodiments. In the illustrated embodiments, EC device 100 comprises an EC stack 102 and at least two separate conductive layers 104A-B on opposite sides of the EC stack. The EC stack 102 can include one or more of an EC layer, IC layer, and CE layer. The conductive layers 104A-B can include one or more transparent conductive (TC) layers.

Each conductive layer 104A-B is segmented into separate respective segments 106A-B, 108A-B by separate segmentations 142A-B in the separate layers 104A-B. The conductive layers can be segmented via various well-known cutting processes, ablation processes, etc. In some embodiments, one or more of the segmentations 142A-B in a conductive layer 104A-B is a cut that extends at least partially through the layer. In some embodiments, one or more segmentations 142A-B is an ablation line. A laser can be used to produce one or more of the segmentations 142A-B. Lasers that are suitable for producing the segmentations can include one or more solid-state lasers, including Nd:YAG at a wavelength of 1064 nm, and excimer lasers, including ArF and KrF excimer lasers respectively emitting at 248 nm and 193 nm. Other solid-state and excimer lasers are also suitable.

As shown in the illustrated embodiments of FIG. 1A-C, an EC device 100 can include multiple EC regions 110, 120, 130, where one or more boundaries of the EC regions is defined by one or more segmentations 142A-B of one or more of the conductive layers 104A-B. For example, as shown in FIG. 1A-B, EC region 120 has boundaries which are defined by segmentations 142A-B of the conductive layers 104A-B.

In some embodiments, EC regions in an EC device can include at least one EC region which is isolated from a direct electrical connection with one or more electrodes. As referred to herein, a direct electrical connection between an EC region and an electrode can refer to an electrode being physically coupled to a portion of the EC device that is located within the respective EC region. For example, in the illustrated embodiment, EC region 110 includes direct electrical connections with both electrodes 152, 156, and EC region 130 includes direct electrical connections with both electrodes 154, 158. In contrast, none of the electrodes 152-158 which are coupled to EC device 100 are physically coupled to the EC device 100 in region 120. As a result, EC region 120 may be understood to be isolated from a direct electrical connection with any of the electrodes 152-158. In addition, EC region 120 may be understood to be an "inner" EC region and regions 110, 130 may be understood to be "outer" EC regions, as EC region 120 is bounded, on at least two sides, by the EC regions 110, 130. Electrodes 152-158 can include one or more bus bars which are applied to one or more portions of the EC device via one or more various well-known processes.

In some embodiments, an "isolated" EC region which is isolated from direct electrical connections with any electrodes can have an indirect electrical connection with one or more electrodes, via one or more "interposing" EC regions which interpose the indirect electrical connection between the isolated EC region and one or more electrodes. For example, where an electrode is coupled to a conductive layer segment in one region, and the segment extends through both the one region and another region in which no electrodes are physically coupled (i.e., an isolated EC region), the segment can establish an "indirect" electrical connection between the electrode and the isolated region via the portions of the segment which extend through at least the EC region in which the electrode is physically coupled and the isolated region. As a result, the one or more EC regions through which the conductive layer segment extends between the electrode and the isolated EC region, including the EC region in which the electrode is physically coupled, are understood to be "interposing" EC regions which interpose an indirect electrical connection between the isolated EC region and the electrode.

In the illustrated embodiment of FIG. 1A-C, for example, EC region 120 is an "isolated" region that is isolated from any direct electrical connections with any of the electrodes 152-158 coupled to EC device 110, and EC regions 110, 130 are "interposer" regions which each interpose a separate indirect electrical connection between EC region and a separate one of electrodes 152, 158. For example, conductive layer segment 106A extends through both EC regions 110 and 120, and electrode 152 is physically coupled to segment 106A. As a result, the conductive layer segment 106A establishes an electrical connection between electrode 152 and EC region 120, so that an electrical potential difference across the EC stack 102 in region 120 can be established based at least in part upon an applied voltage to electrode 152. Because the electrode 152 is not physically coupled to the segment 106A in region 120, and is physically coupled to the segment 106A in region 110, the electrical connection between EC region 120 and electrode 152 is to be understood to be "indirect", while the electrical connection between EC region 110 and electrode 152 is to be understood to be "direct".

In some embodiments, the electrical potential difference, also referred to as a "potential difference", across an EC stack in a given EC region determines the maximum rate of current flow through the respective portion of the EC stack in that EC region from the CE layer of the EC stack to the EC layer of the EC stack, causing the EC device in the given region to change transmission level, which can include transforming to a colored state and, thus, causing coloring of the EC device. Current can flow at a rate proportional to the potential difference across the layers of the device, provided there is a ready supply of charge, in the form of lithium ions and electrons, to satisfy the requirements.

Some embodiments of an EC device can include conductive layers which are segmented into conductive layer segments which include a major conductive layer segment and a minor conductive layer segment. Each major conductive layer segment is structured to extend through at least one outer EC region, and at least a portion of an inner EC region. For example, in the illustrated embodiment of FIG. 1A-C, conductive layer 104A is segmented into conductive layer segments which include a major conductive layer segment 106A and a minor conductive layer segment 106B. Segment 106A extends through outer region 110 and through an entirety of inner region 120. Segment 106B extends through outer region 130. Similarly, conductive layer 104B is segmented into conductive layer segments which include a major conductive layer segment 108A and a minor conductive layer segment 108B. Segment 108A extends through outer region 130 and through an entirety of inner region 120. Segment 108B extends through outer region 110. In the illustrated embodiment, where outer regions 110 and 130 are interposing EC regions which interpose at least one indirect electrical connection between region 120 and one or more electrodes 152-158, each major segment 106A, 108B is understood to extend through a separate interposing region and into the EC region 120 which is isolated from any direct electrical connection with any of the electrodes 152-158.

As both major segments 106A, 108A extend through EC region 120, on opposite sides of the EC stack 102, the major segments 106A, 108A are understood to "overlap" on opposite sides of the EC stack 102 in EC region 120. As a result, segments 106A and 108A establish an electrical pathway between electrodes 152, 158 through EC region 120. Thus, an electrical potential difference, also referred to herein as a "potential difference", across the EC stack 102 in region 120 can include a difference between the applied voltage to electrode 152 and the applied voltage to electrode 158. Furthermore, as at least one portion of each of the major conductive layer segments 106A-B extend through the EC region 120, which can be understood to be an "inner" EC region that is isolated from direct electrical connections with any electrodes, the conductive layer segments in the illustrated embodiment may be understood to be arranged in a rotationally symmetric configuration.

As minor conductive layer segment 106B extends through EC region 130, segment 106B can be understood to "overlap" with the portion of the major conductive layer segment 108A which extends through region 130 on the opposite side of EC stack 102. As a result, segments 106B and 108A establish an electrical pathway between electrodes 154, 158 through EC region 130. Thus, a potential difference across the EC stack 102 in region 130 can include a difference between the applied voltage to electrode 154 and the applied voltage to electrode 158. As minor conductive layer segment 108B extends through EC region 110, segment 108B can be understood to "overlap" with the portion of the major conductive layer segment 106A which extends through region 110 on the opposite side of EC stack 102. As a result, segments 108B and 106A establish an electrical pathway between electrodes 152, 156 through EC region 110. Thus, a potential difference across the EC stack 102 in region 110 can include a difference between the applied voltage to electrode 152 and the applied voltage to electrode 156.

In some embodiments, the electrical pathways through separate EC regions are different pathways between different sets of electrodes. As a result, different potential differences can be established ("induced") across separate regions of an EC device, based at least in part upon different voltages applied to different electrodes. Applying separate voltages to separate electrodes, so that different potential differences are induced in different EC regions, can cause separate regions of the EC stack in the separate EC regions to change transmission level differently. For example, applying separate voltages to separate electrodes can cause separate EC regions to switch from a common transmission level, which can include a clear or "full" transmission state, to separate ones of at least two different transmission levels.

In the illustrated embodiment of FIG. 1C, separate voltages are applied to each of the separate electrodes 152-158, which causes separate potential differences across at least two separate sets of EC regions, which causes the EC stack to change to different transmission levels in the separate sets of EC regions. As shown, because an electrical pathway is established between electrodes 152, 156 through EC region 110, and another electrical pathway is established between electrodes 154, 158 through EC region 130, the illustrated application of 2 volts to electrode 152, 0 volts to electrode 156, 3 volts to electrode 154, and 1 volt to electrode 158 results in a 2-volt potential difference across the separate regions of the EC stack that are located in the separate EC regions 110, 130. As the transmission level of the EC stack can have an inverse relationship with the potential difference across the EC stack, inducing a 2-volt drop across the EC stack in each of separate EC regions 110, 130 can cause the portions of the EC stack in the separate regions 110, 130 to change transmission level, as shown.

Because the electrical pathway through "isolated" EC region 120 is between electrodes 152 and 158, a 1-volt drop is established across the region of the EC stack 102 that is in the EC region 120. As the potential difference in EC region 120 is different than the potential differences in EC regions 110, 130, the EC region 120 can switch to a transmission level which is different from the transmission levels to which EC regions 110, 130 are switched. As shown, because the potential difference in EC region 120 is less than the potential difference in EC regions 110, 130, the transmission level of EC region 120 can be greater than the transmission level of EC regions 110, 130.

As shown, the potential differences through the separate EC regions 110, 120, 130 can be independently controlled via application of particular voltages to the separate electrodes 152-158. As potential differences through the separate EC regions cause the EC regions to switch transmission level, independent control of potential differences in separate EC regions enables independent control of transmission levels in the separate EC regions. In one example, as shown in the illustrated embodiment of FIG. 1A-C, the EC device is structured to selectively switch each of separate EC regions from a common transmission level to a separate one of at least two different transmission levels. Such switching of transmission levels can be reversible.

Figure 2A:
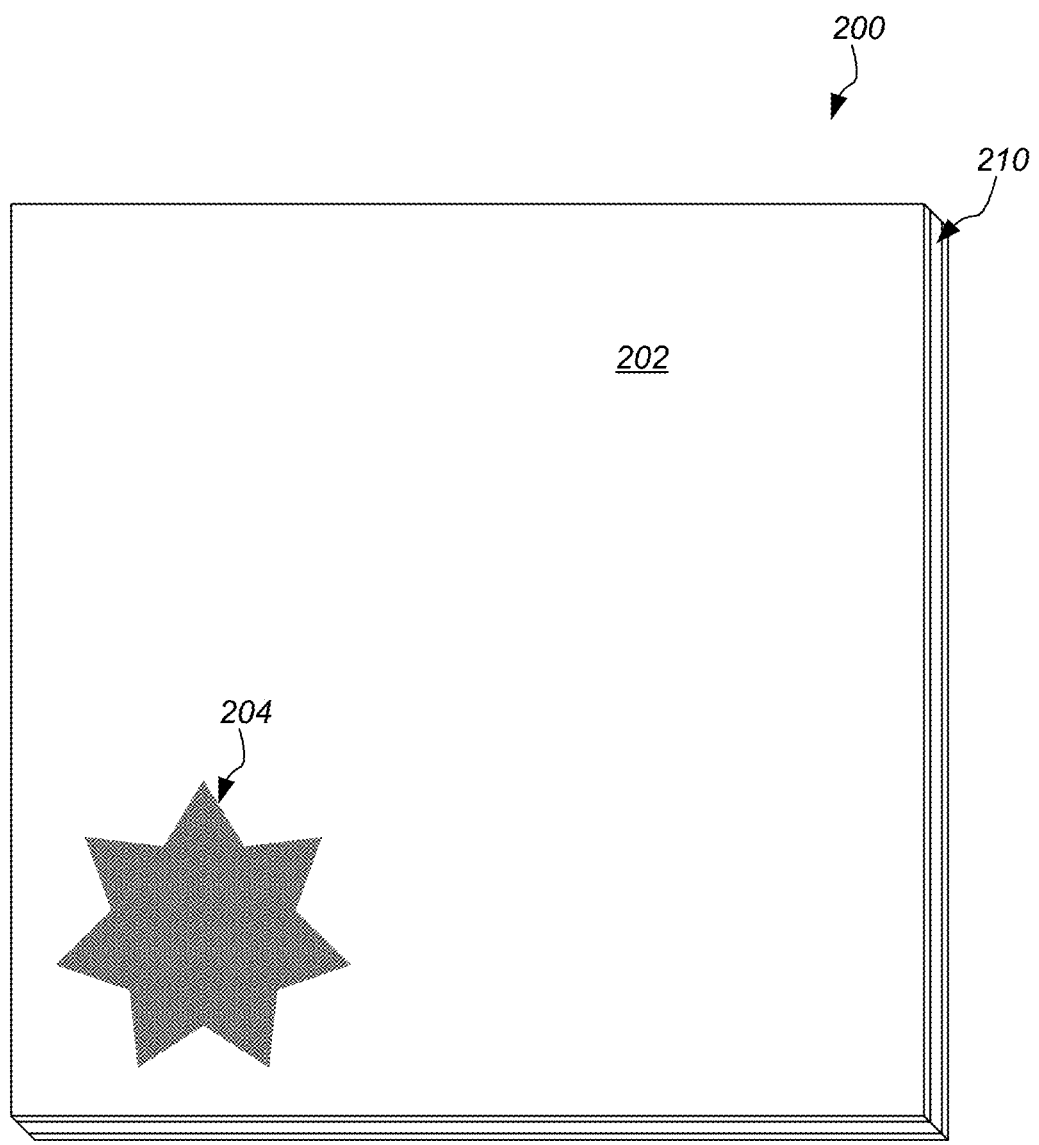
FIG. 2A illustrates a window surface which is a multilayer surface that includes an EC device with separate EC regions, according to some embodiments.

In some embodiments, the EC regions are independently controlled to switch between different transmission levels, so that the EC device switches between at least one particular transmission pattern. For example, the EC device may be structured so that, when voltages are selectively applied to separate electrodes in the EC device, the separate EC regions switch from a common transmission level to separate transmission levels, so that the EC device has a particular transmission pattern established by the different EC regions of the EC device having different transmission levels. Such independent control of transmission level switching by different EC regions can enable independent control of tint level of various EC regions of an EC device. In some embodiments, regions can be shaped to form some or all of a particular pattern, which can include one or more logos, names, pictures, etc., so that the EC device is structured to cause a pattern to appear, based at least in part upon different EC regions of the EC device switching to different transmission levels. FIG. 2A illustrates a window surface 200 which is a multi-layer surface that includes an EC device 210 with separate EC regions 202, 204, according to some embodiments. EC device 210 can include some or all of EC device 100 illustrated in FIG. 1A-C, including one or more isolated EC regions. For example, region 204 can be an EC region which is isolated from direct electrical connections with any electrodes, including any bus bars, coupled to any other EC regions of EC device 210. Region 202 may be an interposer EC region which interposes an indirect electrical connection between region 204 and one or more electrodes.

In some embodiments, regions 202, 204 are established via one or more various structuring of EC device 210. Such structuring can include segmenting one or more conductive layers, including one or more TC layers, of the EC device 210, as discussed above. Such structuring can include one or more various other structuring discussed further below, including adjusting sheet resistances of one or more layers of the EC device 210, introducing charged electrolyte species with different transport rates in different regions of the EC stack of EC device 210, etc. EC device 210 may be structured to resist moisture permeation between the EC stack of EC device 210 and an external environment, as further discussed below. Region 204 is shaped to match a particular 7-pointed star pattern. In some embodiments, region 204 includes one or more EC regions which are encircled by one or more EC regions 202, so that none of the EC regions 204 bound an outer edge of EC device 210.

Inducing different potential differences across the EC device in the separate regions 202, 204, causes the separate regions 202, 204 to switch to different transmission levels. As a result, the 7-pointed star pattern becomes observable, as shown. Where no potential differences are induced across both regions 202, 204, or where the potential differences in both EC regions 202, 204 are the same, the pattern may not be observable. As a result, the surface 200 can be selectively switched, based at least in part upon applying one or more certain voltages to one or more electrodes coupled to surface 200, between a certain transmission state, where EC regions 202, 204 are at a common transmission level and the star pattern is not observable, to another transmission state where the EC regions 202, 204 are at different transmission levels, and the star pattern is visible.

In some embodiments, an electrochromic device which includes multiple EC regions which can be independently controlled to selectively switch to separate transmission levels is included in a camera aperture filter of a camera device, where the EC regions of the EC device can be selectively switched between separate transmission levels to control diffraction of images captured by the camera.

Figure 2B:
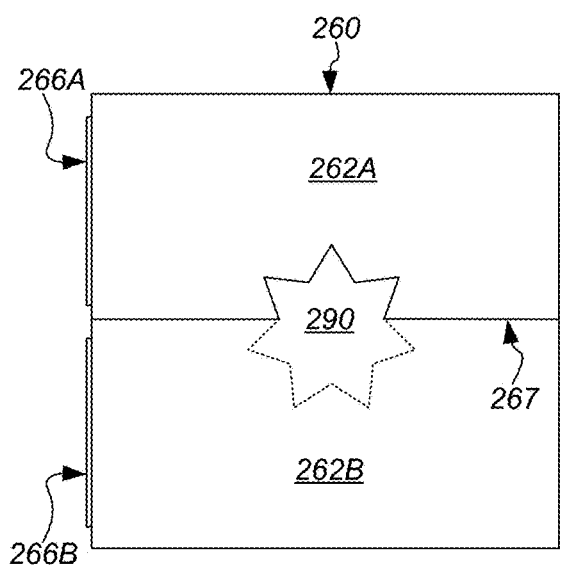
FIG. 2B-D illustrate plan views of an EC device which comprises multiple separate EC regions, according to some embodiments.
Figure 2C:
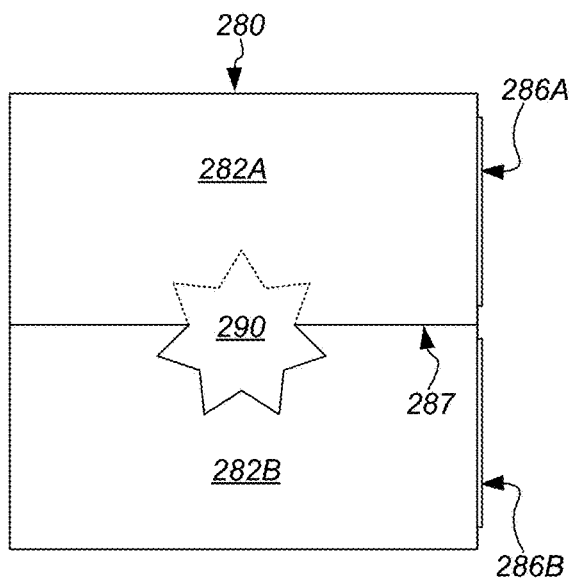
Figure 2D:
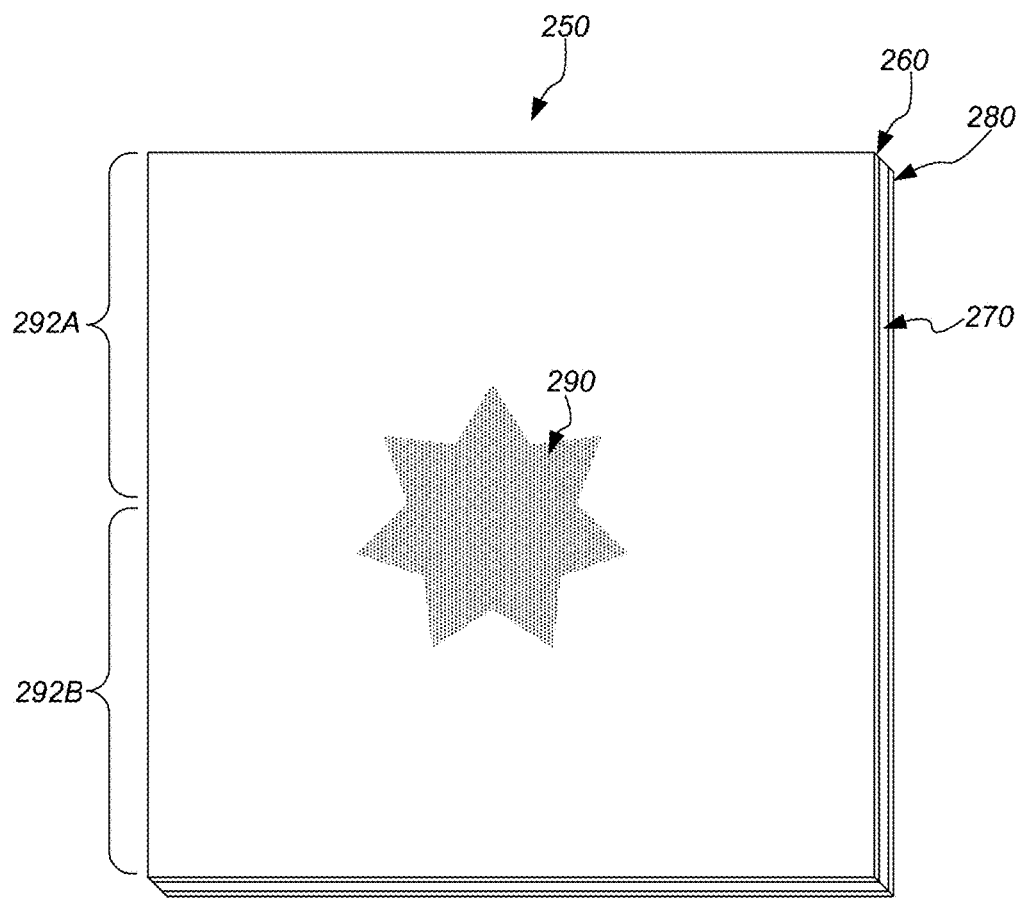

FIG. 2B-D illustrate plan views of an EC device 250 which comprises multiple separate EC regions, according to some embodiments. In the illustrated embodiments, EC device 250 comprises an EC stack 270 and at least two separate conductive layers 260, 280 on opposite sides of the EC stack 270. The EC stack 270 can include one or more of an EC layer, IC layer, and CE layer. The conductive layers 260, 280 can include one or more transparent conductive (TC) layers.

As shown in FIG. 2B-C, each conductive layer 260, 280 is segmented into separate respective segments 262A-B, 282A-B by separate segmentations 267, 287 in the separate layers 260, 280. The conductive layers can be segmented via various well-known cutting processes, ablation processes, etc. In some embodiments, one or more of the segmentations 267, 287 in a conductive layer is a cut that extends at least partially through the layer. In some embodiments, one or more segmentations 267, 287 is an ablation line. A laser can be used to produce one or more of the segmentations 267, 287. Lasers that are suitable for producing the segmentations can include one or more solid-state lasers, including Nd:YAG at a wavelength of 1064 nm, and excimer lasers, including ArF and KrF excimer lasers respectively emitting at 248 nm and 193 nm. Other solid-state and excimer lasers are also suitable.

As shown in the illustrated embodiments of FIG. 2B-D, an EC device 250 can include multiple EC regions 292A-B and 290, where one or more boundaries of the EC regions is defined by one or more segmentations 267, 287 of one or more of the conductive layers 260, 280. For example, as shown in FIG. 2B-D, EC region 290 has boundaries which are defined by segmentations 267, 287 of the conductive layers 260, 280. As shown in FIG. 2B-D, the size and shape of region 290 can be adjusted based on the segmentations 267, 287.

In some embodiments, EC regions in an EC device can include at least one EC region which is isolated from a direct electrical connection with one or more electrodes. As referred to herein, a direct electrical connection between an EC region and an electrode can refer to an electrode being physically coupled to a portion of the EC device that is located within the respective EC region.

For example, in the illustrated embodiment of FIG. 2B-D, EC region 292A includes direct electrical connections with both electrodes 266A, 286A, and EC region 292B includes direct electrical connections with both electrodes 266B, 286B. In contrast, none of the electrodes 266A-B, 286A-B which are coupled to EC device 250 are physically coupled to the EC device 250 in region 290. As a result, EC region 290 may be understood to be isolated from a direct electrical connection with any of the electrodes 266A-B, 286A-B. In addition, EC region 290 may be understood to be an "inner" EC region and regions 292A-B may be understood to be "outer" EC regions, as EC region 290 is bounded, on at least two sides, by the EC regions 292A-B. Electrodes 266A-B, 286A-B can include one or more bus bars which are applied to one or more portions of the EC device via one or more various well-known processes.

In some embodiments, an "isolated" EC region which is isolated from direct electrical connections with any electrodes can have an indirect electrical connection with one or more electrodes, via one or more "interposing" EC regions which interpose the indirect electrical connection between the isolated EC region and one or more electrodes. For example, where an electrode is coupled to a conductive layer segment in one region, and the segment extends through both the one region and another region in which no electrodes are physically coupled (i.e., an isolated EC region), the segment can establish an "indirect" electrical connection between the electrode and the isolated region via the portions of the segment which extend through at least the EC region in which the electrode is physically coupled and the isolated region. As a result, the one or more EC regions through which the conductive layer segment extends between the electrode and the isolated EC region, including the EC region in which the electrode is physically coupled, are understood to be "interposing" EC regions which interpose an indirect electrical connection between the isolated EC region and the electrode.

In the illustrated embodiment of FIG. 2B-D, for example, EC region 290 is an "isolated" region that is isolated from any direct electrical connections with any of the electrodes 266A-B, 286A-B coupled to EC device 250, and EC regions 292A-B are "interposer" regions which each interpose a separate indirect electrical connection between EC region and a separate one of electrodes 266A-B, 286A-B. For example, conductive layer segment 262B extends through both EC regions 292A-B, and electrode 266B is physically coupled to segment 262B. As a result, the conductive layer segment 262B establishes an electrical connection between electrode 266B and EC region 292A, so that an electrical potential difference across the EC stack 270 in region 290 can be established based at least in part upon an applied voltage to electrode 266B. Because the electrode 266B is not physically coupled to the portion of segment 262B located in region 290, and is physically coupled to the portion of segment 262B located in region 292B, the electrical connection between EC region 290 and electrode 266B is to be understood to be "indirect", while the electrical connection between EC region 292B and electrode 266B is to be understood to be "direct".

Some embodiments of an EC device can include conductive layers which are segmented into conductive layer segments which include a major conductive layer segment and a minor conductive layer segment. Each major conductive layer segment is structured to extend through at least one outer EC region, and at least a portion of an inner EC region.

For example, in the illustrated embodiment of FIG. 2B-D, conductive layer 280 is segmented into conductive layer segments which include a major conductive layer segment 282A and a minor conductive layer segment 282B. Segment 282A extends through outer region 292A and through an entirety of inner region 290. Segment 282B extends through outer region 292B. Similarly, conductive layer 260 is segmented into conductive layer segments which include a major conductive layer segment 262B and a minor conductive layer segment 262A. Segment 262B extends through outer region 292B and through an entirety of inner region 290. Segment 262A extends through outer region 292A. In the illustrated embodiment, where outer regions 292A-B are interposing EC regions which interpose at least one indirect electrical connection between region 290 and one or more electrodes 266A-B, 286A-B, each major segment 262B, 282A is understood to extend through a separate interposing region and into the EC region 292 which is isolated from any direct electrical connection with any of the electrodes 266A-B, 286A-B.

As both major segments 262B, 282A extend through EC region 290, on opposite sides of the EC stack 270, the major segments 262B, 282A are understood to "overlap" on opposite sides of the EC stack 270 in EC region 290. As a result, segments 262B and 282A establish an electrical pathway between electrodes 266B, 286A through EC region 290. Thus, an electrical potential difference, also referred to herein as a "potential difference", across the EC stack 270 in region 290 can include a difference between the applied voltage to electrode 266B and the applied voltage to electrode 286A.

Figure 3A:
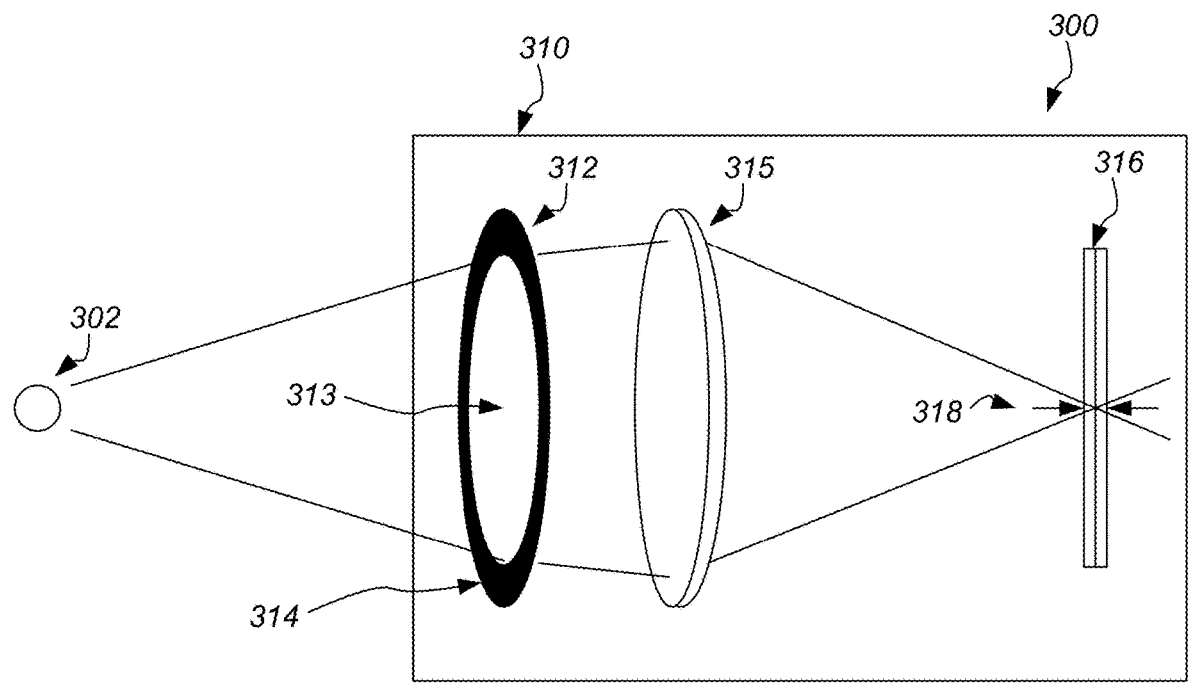
FIG. 3A-B illustrate a camera device 300 according to some embodiments.
Figure 3B:
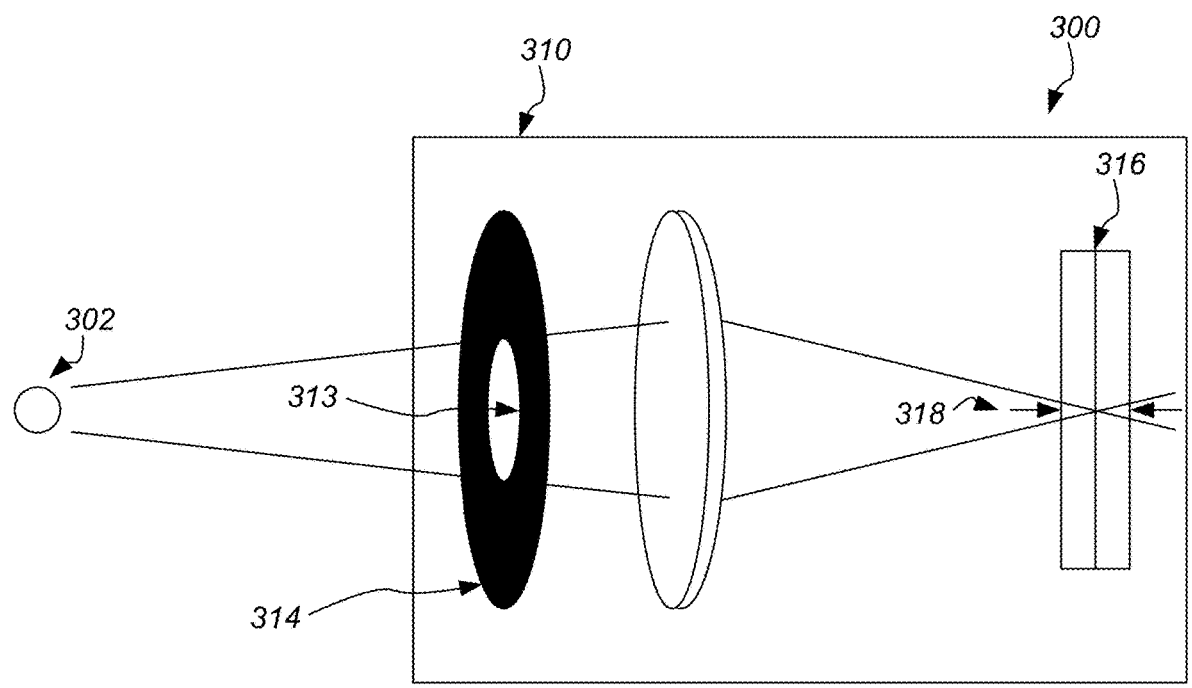

FIG. 3A-B illustrate a camera device 300 according to some embodiments. The camera device 300 includes a housing 310 in which an aperture 312, a lens 315, and a light sensor 316 are located. Light from a subject 302 outside the camera 300 passes through the aperture 313 of the filter, through the lens 315, and on to light sensor 316. As shown in FIG. 3A-B the aperture 313 can be adjusted in size, based at least in part upon adjusting the filter 314, to control the amount of light which reaches the lens 315 and light sensor 316. Such adjustment of the aperture 313 size can include selectively adjusting the transmission level of various portions of the aperture filter 312, including selectively darkening annular regions of the filter 312, to adjust the size of aperture 313. Such adjustment of the aperture 313 size can adjust the depth of field 318 of an image of the subject 302 which is captured on the light sensor 316. For example, in FIG. 3A, where the aperture is "dilated" and a relatively large amount of light from subject 302 reaches the sensor 316, the depth of field 318 can be narrow, so that an image of the subject 302 may be focused on the subject, but images of the background and foreground, relative to the subject, may be blurred, relative to the subject 302. In FIG. 3B, where the aperture 313 is "constricted" by filter 314, a relatively small amount of light from subject 302 reaches the sensor 316; as a result, the depth of field 318 can be widened, relative to FIG. 3A, so that the field of sharp focus extends in front of, and behind the subject 302 in the captured image.

In some embodiments, light passing through an aperture 313 exhibits a diffraction pattern. Such a diffraction pattern can include the well-known Airy diffraction pattern (also referred to as an "Airy disk"). As is well known, a diffraction pattern, including an Airy disk, of a point light source imaged through an aperture 313 can result in a bright central region, surrounded by concentric bright rings (the "Airy pattern"). The diffraction pattern can be characterized by one or more of the wavelength of light through the aperture and the size of the aperture 313. In some embodiments, a capability of a camera device 300 to resolve detail on a subject 302 can be limited by diffraction, such that light from a subject 302 forms an Airy pattern (including an Airy disk) with a central spot with concentric patterns. Where two or more subjects 302 are included in an image captured by the camera 300 and are separated by an angle sufficiently small to cause an Airy pattern around the respective subjects 302 on the sensor 316 to overlap, the two or more subjects 302 may not be clearly resolved in the captured image.

In some embodiments, the light from subject 302 which passes through the periphery of the lens, is approximately equal to the amount of light passing through center of the lens 315. As a result, elements in the foreground and background of a captured image, which may be blurred relative to the subject 302, may be present as sharp objects in a captured image. This can cause the subject 302 to be less vivid in a captured image relative to the blurred foreground and background objects. In some embodiments, a camera device is configured to apodize the light passing through the camera, so that less light passes through the periphery of the lens, relative to the center of the lens. Apodization can include apodizing the aperture 313. Such apodization results in diffusion at the edges of the out-of-focus elements captured in the image of subject 302 at sensor 316. Such diffusion results in smoothing the out-of-focus elements, and enables the subject 302 to stand out more vividly against the out-of-focus elements.

In some embodiments, apodizing a camera aperture 313 enables augmented resolution of images by the camera 300, as the diffraction patterns around an image of a subject 302 on the sensor 316 may be reduced. For example, an apodized aperture 313, reducing the amount of light which passes through the periphery of the lens 315, can result in an image of a subject 302 where the Airy patterns around the image of the subject are reduced in intensity, if not removed altogether. In addition, sensitivity of the light sensor 316 to aberrations in the lens 315 may be mitigated.

In some embodiments, one or more portions of a camera 300, including one or more of the lens 315, aperture filter 312, etc., includes an EC device structured to selectively switch separate regions between separate transmission levels, so that the EC device can selectively apodize one or more of the aperture 313, lens 315, etc.

FIG. 4A, FIG. 4B illustrate an apparatus which can be included in a camera device, including camera 300 illustrated in FIG. 3, and can include one or more electrochromic devices which are structured to selectively switch separate EC regions between different transmission levels to selectively apodize a window through which light passes from an imaged subject to a light sensor of the camera, according to some embodiments. Apparatus 400 can be included in a camera aperture filter 312, such that window 410 is the aperture 313, a lens 315, can be separate from each, etc.

Apparatus 400 includes an EC device 402 which is coupled to a substrate 404. The substrate can comprise one or more of various materials. In some embodiments, a substrate includes one or more of a transparent or reflective material, including a material which can reflect at least one wavelength of the electromagnetic spectrum. The substrate can include one or more various transparent materials, including one or more glasses, crystalline materials, polymer materials, etc. Crystalline materials can include Sapphire, Germanium, silicon, etc. Polymer materials can include PC, PMMA, PET, etc. A substrate can have one or more various thicknesses. For example, a substrate can have one or more thicknesses between 1 to 100 microns thick, inclusively. A substrate can include one or more thermally tempered materials, chemically tempered materials, etc. For example, a substrate can include GORILLA GLASS™. A substrate can include materials having one or more various thermal expansion coefficients. A substrate can include one or more of an IGU, TGU, laminate, monolithic substrate, etc. The substrate 404 can face out of a camera device in which apparatus 400 is included, toward subjects to be imaged. In some embodiments, the surface of substrate 404 which is opposite the surface on which the EC device 402 is included is exposed to an ambient environment external to the camera device. EC device can include various layers, including one or more conductive layers, EC stack layers, etc., as discussed elsewhere in the disclosure. In some embodiments, the EC device includes one or more encapsulation layers and is structured to restrict, mitigate, prevent, etc., moisture permeation between an EC stack in the device 402 and an external environment relative to apparatus 400, including an ambient environment. Support structure 406 can include one or more electrical pathways which can distribute electrical power through the structure 406. Support structure 406 includes a "flex" structure 408 which supports the EC device 402 and substrate 404, and a connection element 407 which both couples the structure 406 to the EC device 402 and electrically couples with one or more electrodes ("terminals") of the EC device to establish an electrical connection between the EC device 402 and one or more power sources via one or more electrical pathways in the structure 406.

EC device 402, in some embodiments, is structured to selectively switch various EC regions of the device 402 to separate, different transmission levels. Such selective switching can establish one or more various transmission patterns in the window 410. In some embodiments, and as discussed further below, the EC device 402 includes multiple concentric annular EC regions, and one or more of the annular EC regions can be switched to one or more separate transmission levels to selectively apodize the window 410. For example, the EC device 402 may switch multiple concentric annular regions from a common transmission level to separate ones of different transmission levels, where at least one of the annular EC regions has a higher transmission level than another annular region which is further from the center of the window 410. Such selective apodization can be based at least in part upon one or more certain voltages applied to one or more certain electrodes 412A-B of the EC device 402, as shown in FIG. 4C.

Figure 5A:
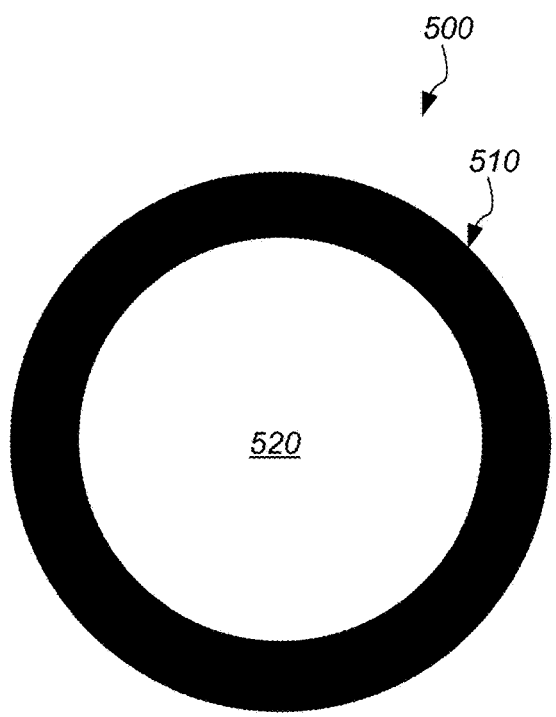
FIG. 5A and FIG. 5B illustrate a circular EC device which is selectively apodized, according to some embodiments.
Figure 5B:
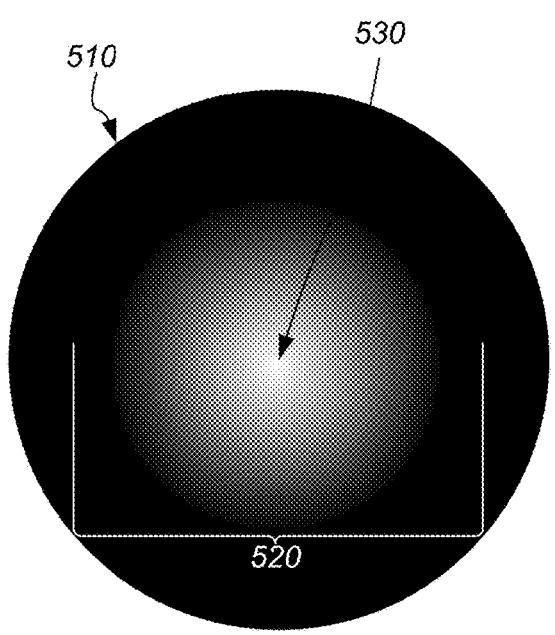

FIG. 5A and FIG. 5B illustrate a circular EC device 500, which can be included in one or more EC devices illustrated in at least FIG. 4A-C, which is selectively apodized, according to some embodiments. Device 500 includes an outer portion 510, which restricts light transmission, and an inner portion 520, which includes EC regions which are independently controllable, so that each of the EC regions can be separately switched from a common transmission level to a separate one of at least two different transmission levels. In the illustrated embodiment, portion 520 is shown in a transmission state where all EC regions in portion 520 are at a common transmission level. This common transmission level can be a full transmission level, so that portion 520 is, in FIG. 5A, in a clear transmission state. In FIG. 5B, device 500 is shown where the multiple regions in portion 520 are selectively switched to separate transmission levels, so that portion 520 is switched from a clear transmission state to a particular transmission pattern. In the illustrated embodiment, the various EC regions in portion 520 include concentric annular EC regions extending outward towards portion 510 from the center 530 of portion 520. In some embodiments, one or more transmission patterns of one or more EC regions can include one or more various continuous transmission distribution patterns. In the illustrated embodiment of FIG. 5B, for example, EC device 500 switches to a transmission distribution pattern that is centered on the center 530, where the greatest transmission level in portion 520 is at center 530, and the transmission level continuously decreases as a function of distance outward from center 530 and towards one or more edge portions of the EC device 500. In some embodiments, the transmission distribution pattern approximates a Gaussian pattern, also referred to herein as a "Gaussian".

Figure 5C:
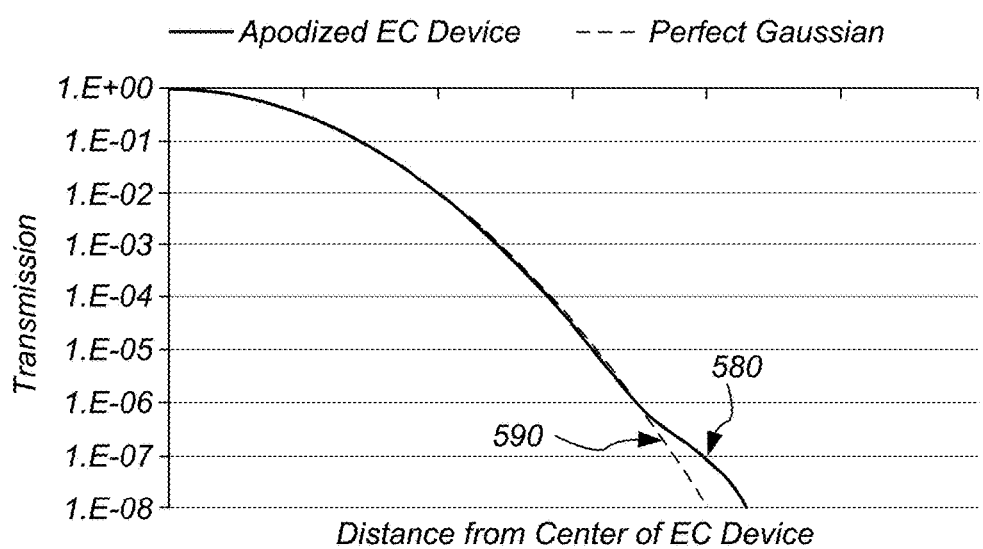
FIG. 5C illustrates a transmission distribution pattern of an apodized EC device portion as a function of intensity against distance from the center of the EC device, according to some embodiments.

FIG. 5C illustrates a transmission distribution pattern of an apodized EC device portion, as shown in FIG. 5B, as a function of transmission against distance from the center 530, where the distribution pattern 580 approximates a Gaussian 590, according to one embodiment. As used herein, a distribution which approximates a Gaussian can include a distribution pattern which matches a Gaussian through multiple orders of magnitude in transmission. For example, in FIG. 5C, the transmission distribution pattern 580 in portion 520 approximates a Gaussian 590, as the pattern 580 matches the Gaussian 590 down to six orders of magnitude in transmission. In some embodiments, a transmission pattern to which an EC device can switch is separate from an approximation of a Gaussian.

In some embodiments, a continuous distribution pattern in an EC device is established based at least in part upon a sufficiently large number of EC regions, one or more distributions through the EC device which are associated with the transmission distribution pattern, etc. Such distributions are discussed further below.

Figure 6:
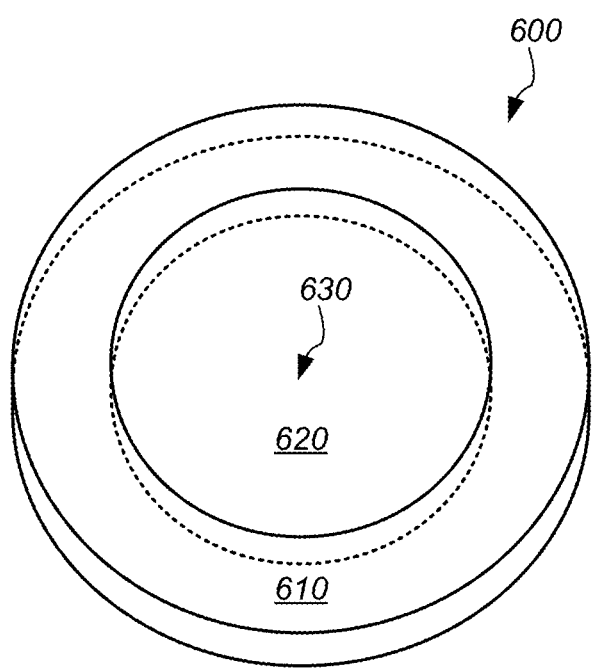
FIG. 6 illustrates an EC device which includes a circular EC region and an annular EC region encircling the circular EC region, according to some embodiments.

In some embodiments, an EC device can be selectively switched to a non-continuous distribution pattern. An EC device may include multiple regions which can be controlled to switch to discrete and separate transmission levels, thus resulting in a "stepped" transmission pattern. FIG. 6 illustrates an EC device 600, which can be included in one or more EC devices illustrated in at least FIG. 4A-C, which includes a circular EC region 620 having a center 630 and an annular EC region 610 encircling the circular EC region 620, according to some embodiments. The EC device, in some embodiments, independently controls potential difference across at least one of the regions 610-620 to selectively switch between at least two transmission states, where at least one transmission state can be where both EC regions 610-620 have a common transmission level, including a clear transmission state. Another transmission state can be where the separate EC regions 610, 620 are switched from a common transmission level to at least two separate transmission levels. In some embodiments, EC region 620 is isolated from any electrical connections, so that transmission level control is restricted to annular EC region 610. EC region 610 can be controlled to switch between separate transmission levels to apodize EC device 600.

Figure 7:
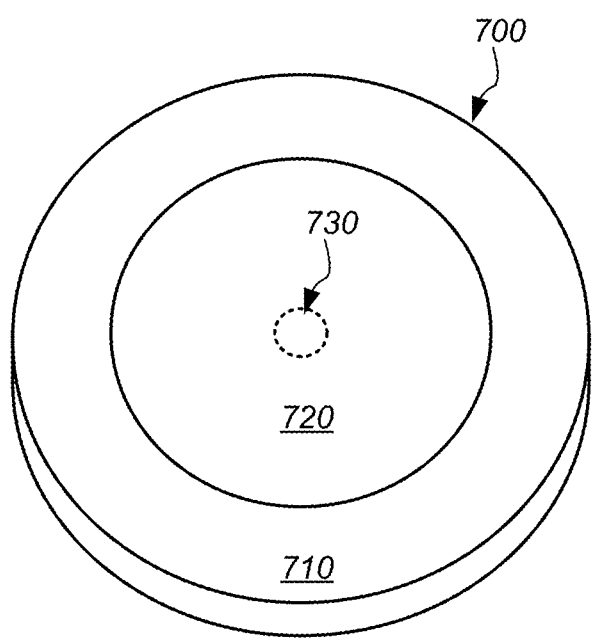
FIG. 7 illustrates an EC device which includes a circular EC region and at least two concentric annular EC regions which extend outward from the circular region, according to some embodiments.

FIG. 7 illustrates an EC device 700 which includes a circular EC region 730 and at least two concentric annular EC regions 710, 720 which extend outward from the circular region 730, according to some embodiments. EC device 700 can be included in one or more EC devices illustrated in at least FIG. 4A-C. The circular region 730 may be isolated from any electrical connection, direct, indirect, or otherwise, with any of the electrodes coupled to the EC device, and the inner annular EC region 720 may be isolated from any direct electrical connection, while outer annular EC region 710 may interpose an indirect electrical connection between EC region 720 and one or more electrodes. Upon application of one or more voltages to one or more electrodes coupled to region 710, the separate annular EC regions 710, 720 may switch between a common transmission level and separate ones of at least two transmission levels, while region 730 does not initially switch between transmission levels, as not potential difference is immediately induced. However, current leakage into region 730, in some embodiments, can cause region 730 to change transmission level over time. Selectively changing regions 710, 720 to separate transmission levels can selectively apodize EC device 700.

Figure 8A:
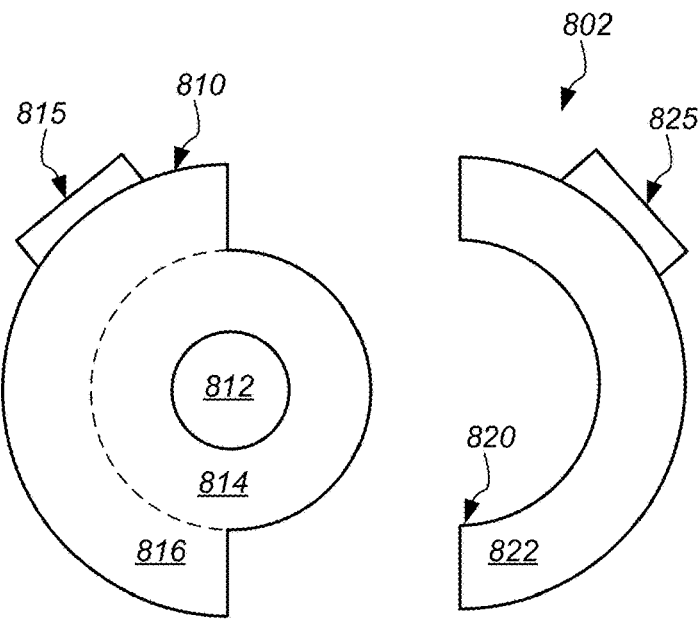
FIG. 8A-E illustrate an EC device, which includes multiple layers deposited on a substrate, according to some embodiments.
Figure 8B:
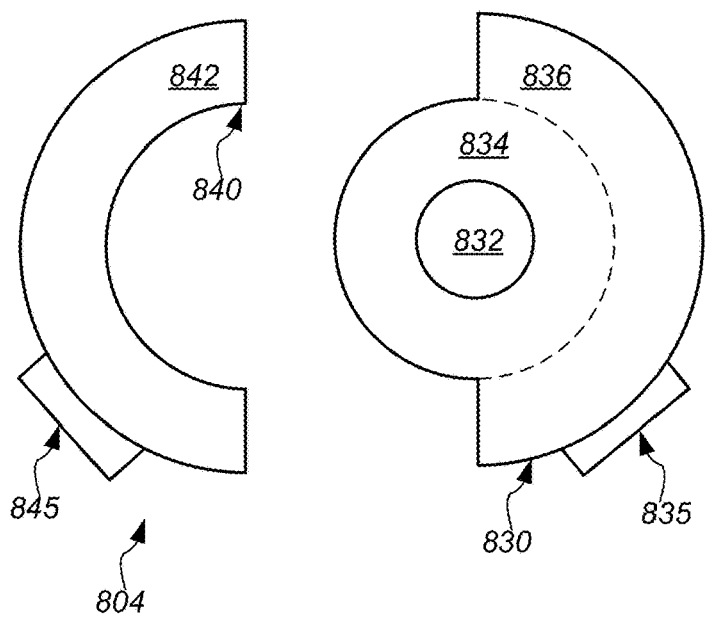
Figure 8C:
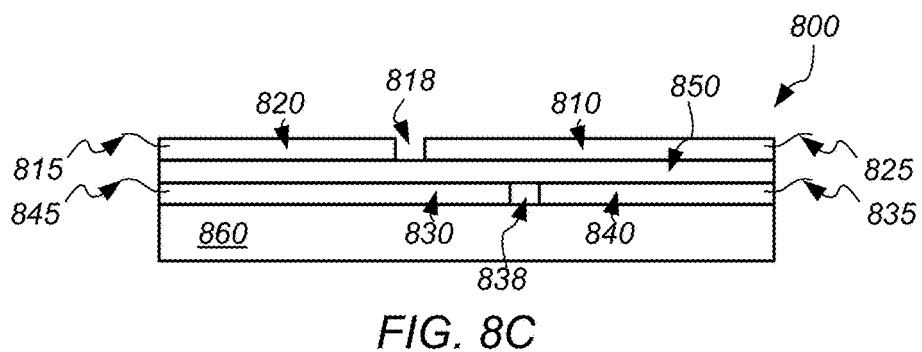

FIG. 8A-C illustrates an EC device 800, which includes multiple layers 802, 850, 804, deposited on a substrate 860, according to some embodiments. EC device 800 can include an EC stack 850 and at least two separate conductive layers 802, 804, on opposite sides of the EC stack 850, which are segmented into separate conductive layer segments to establish separate EC regions in the device 800, where the separate EC regions include a circular EC region and two concentric annular EC regions extending outward from the circular EC region. EC device 800 can be included in one or more EC devices illustrated in at least FIG. 4A-C.

EC device 800 includes two separate conductive layers which are segmented to establish multiple separate EC regions of the EC device. Such establishing of separate EC regions via segmenting conductive layers may proceed similarly to the segmenting discussed above with reference to FIG. 1A-C.

EC device 800 includes a bottom conductive layer 804 deposited on a substrate 860, an EC stack deposited on the bottom conductive layer 804, and a top conductive layer 802 deposited on the EC stack. Each conductive layer, which can include a transparent conductive (TC) layer, is segmented 818, 838 into separate conductive layer segments to establish separate EC regions based at least in part upon the segmenting.

Top conductive layer 802, shown in FIG. 8A, is segmented into a major conductive layer segment 810 and a minor conductive layer segment 820. Each segment has an electrode 815, 825 physically coupled to a portion of the respective segment which extends through an established outer annular EC region. The major segment is structured to include an outer portion 816 which extends through an outer annular EC region of the EC device 800 and an inner portion 814 which extends through an entirety of an inner annular EC region of the EC device 800. In addition, a circular portion 812 of the major segment 810 is segmented from the segment 810 to establish a circular EC region encircled by the concentric annular EC regions. The outer portion 816 of the major segment 810 and the entire portion 822 of the minor segment 820 comprise the portions of the top conductive layer 802 which collectively extend through the outer annular EC region of device 800.

Bottom conductive layer 804, shown in FIG. 8B, is segmented into a major conductive layer segment 830 and a minor conductive layer segment 840. Each segment has an electrode 835, 845 physically coupled, electrically coupled, etc. to a portion of the respective segment which extends through an established outer annular EC region. The major segment 830 is structured to include an outer portion 836 which extends through an outer annular EC region of the EC device 800 and an inner portion 834 which extends through an entirety of an inner annular EC region of the EC device 800. In addition, a circular portion 832 of the major segment 830 is segmented from the segment 830 to establish a circular EC region encircled by the concentric annular EC regions. The outer portion 836 of the major segment 830 and the entire portion 842 of the minor segment 840 comprise the portions of the bottom conductive layer 804 which collectively extend through the outer annular EC region of device 800.

A cross-sectional view of device 800, shown in FIG. 8C, illustrates that, similar to the EC device 100 illustrated in FIG. 1A-C, the major segments 810, 830 overlap at portions 814, 834 to establish an inner annular EC region which is isolated from direct electrical connections with any of electrodes 815, 825, 835, 845, and where the portions 816, 836 of major segments 810, 830 establish an electrical connection between the inner annular EC region and electrodes 815, 835, so that the outer annular EC region through which the portions 816, 836 extend is an interposer EC region.

In some embodiments, the segmentation of the conductive layers is implemented in the process of depositing the various layers of the EC device 800 on the substrate 860. For example, segmentation 838 of bottom conductive layer 804 may be established subsequent to depositing the bottom conductive layer 804 on the substrate, and prior to depositing the EC stack 850 on the bottom conductive layer 804. Similarly, the segmentation 818 of top conductive layer 802 may be established subsequent to depositing the top conductive layer on the EC stack 850. In some embodiments, one or more of the segmentations 818, 838 are established based at least in part upon depositing the respective conductive layers 802, 804 in masked portions, such that the segments 810, 830, 820, 840 are deposited as segments that are segmented from each other.

Figure 8D:
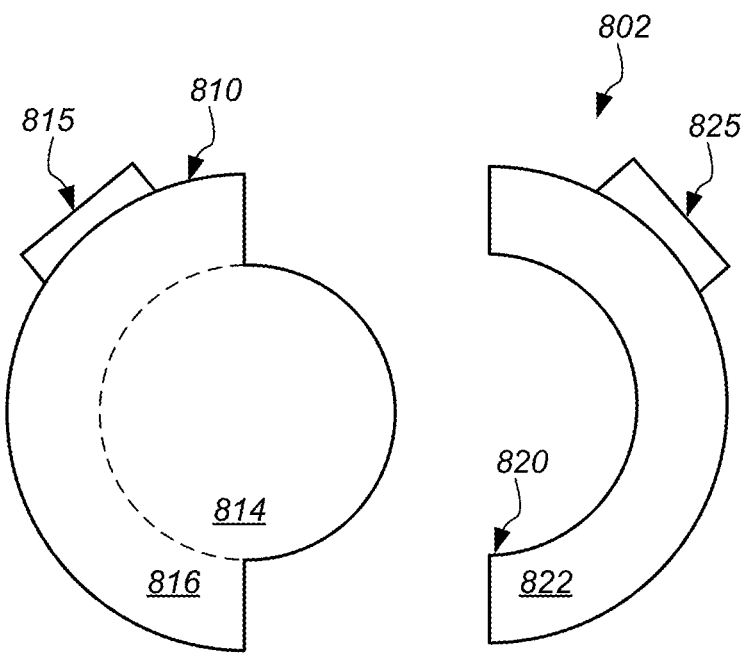
Figure 8E:
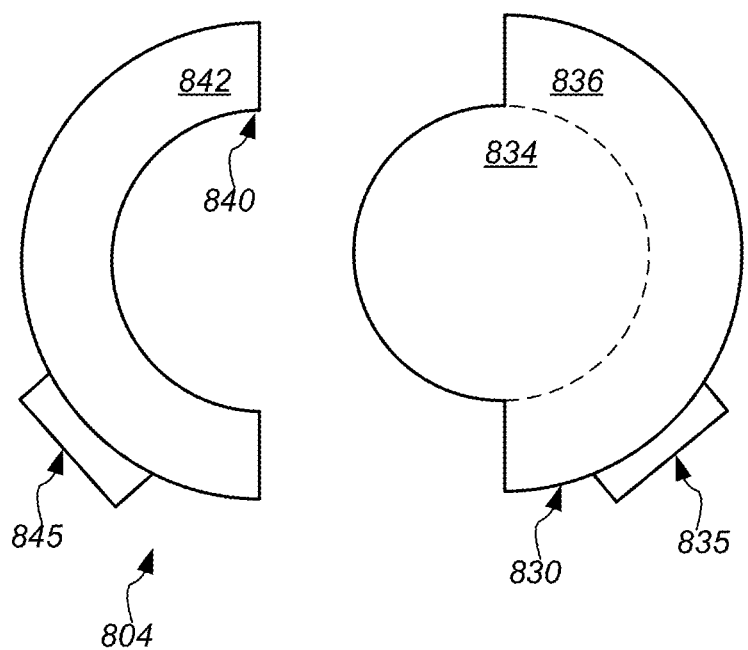

In some embodiments, an EC device includes multiple layers deposited on a substrate, where at least two separate conductive layers on opposite sides of the EC stack of the EC device are segmented into separate conductive layer segments to establish separate EC regions where the separate EC regions include an "isolated" circular region and at least one annular EC region which can "interpose" an indirect electrical connection between the isolated circular region and one or more electrodes. FIG. 8D-E illustrate separate conductive layers of one embodiment of an EC device comprising a circular "isolated" EC region and an annular "interposing" EC region.

Top conductive layer 802, shown in FIG. 8D, is segmented into a major conductive layer segment 810 and a minor conductive layer segment 820. Each segment has an electrode 815, 825 physically coupled to a portion of the respective segment which extends through an established annular EC region. The major segment is structured to include an outer portion 816 which extends through an annular EC region of the EC device 800 and an inner portion 814 which extends through an entirety of a circular EC region of the EC device 800. The outer portion 816 of the major segment 810 and the entire portion 822 of the minor segment 820 comprise the portions of the top conductive layer 802 which collectively extend through the annular EC region of device 800.

Bottom conductive layer 804, shown in FIG. 8E, is segmented into a major conductive layer segment 830 and a minor conductive layer segment 840. Each segment has an electrode 835, 845 physically coupled to a portion of the respective segment which extends through an established annular EC region. The major segment 830 is structured to include an outer portion 836 which extends through an annular EC region of the EC device 800 and an inner portion 834 which extends through a circular EC region of the EC device 800. The outer portion 836 of the major segment 830 and the entire portion 842 of the minor segment 840 comprise the portions of the bottom conductive layer 804 which collectively extend through the annular EC region of device 800.

Figure 9A:
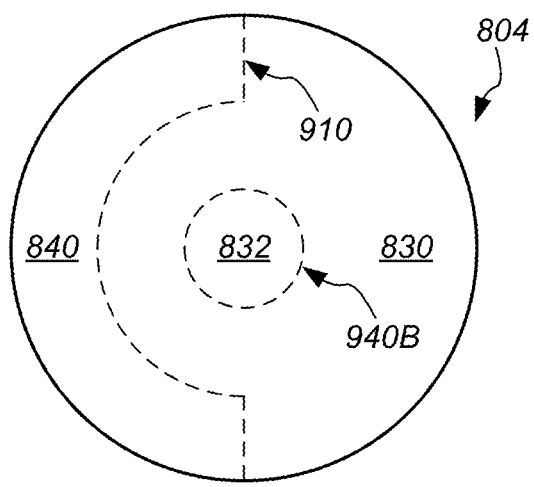
FIG. 9A-B illustrate separate segmentation operations which are implemented on the separate conductive layers of an EC device to segment the conductive layers to establish the separate EC regions, according to some embodiments.
Figure 9B:
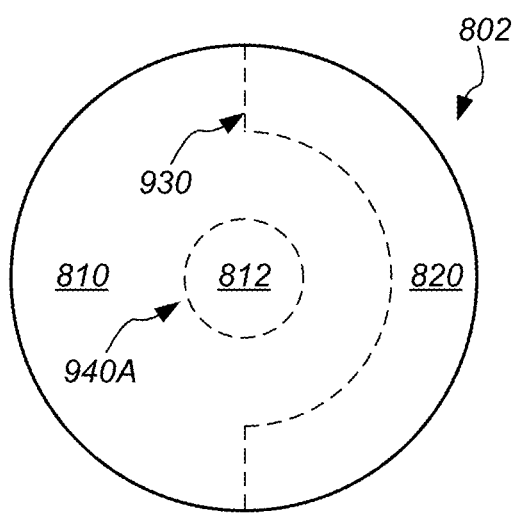

FIGS. 9A-B illustrate separate segmentation operations which are implemented on the separate conductive layers of EC device 800, illustrated in FIGS. 8A-C, to segment the conductive layers to establish the separate EC regions, according to some embodiments.

FIG. 9A illustrates the segmentation operations which are implemented on the bottom conductive layer 804 of EC device 800. One or more of the operations can be implemented subsequently to depositing the bottom conductive layer 804 on a substrate, and prior to depositing an EC stack on the bottom conductive layer. Segmentation operation 910 can be implemented to segment the bottom conductive layer 804 into a major conductive layer segment 830 and a minor conductive layer segment 840, as described above. Each segmentation operation illustrated in FIG. 9 can include one or more of a cutting operation, ablation operation, etc. For example, operation 910 can be a cutting operation which selectively cuts as illustrated in FIG. 9 to conductive layer 804 into segments 830 and 840.

FIG. 9B illustrates the segmentation operations which are implemented on the top conductive layer 802 of EC device 800. One or more of the operations can be implemented subsequently to depositing the top conductive layer 802 on an EC stack that is itself deposited on bottom conductive layer 804. Segmentation operation 930 can be implemented to segment the top conductive layer 802 into a major conductive layer segment 810 and a minor conductive layer segment 820, as described above.

As shown in FIGS. 9A-B, one or more segmentation operations 940A-B can be implemented to segment circular portions 812, 832 of the respective major segments 810, 830. The segmentations operations 940A-B can, in some embodiments, comprise a single segmentation operation that simultaneously segments deposited top conductive layer 804 and bottom conductive layer 802, where the segmentation operation portion 940A is implemented through a deposited EC stack. In some embodiments, one of segmentation operations 940A-B is not implemented, so that a circular EC region is established based at least in part upon segmenting one of the major segments 810, 830 to establish one of portions 812, 832. In some embodiments, neither of segmentation operations 940A-B are implemented, so that a circular EC region is established based at least in part upon the operations 910 and 930 which establish outer boundaries of the circular EC region and inner boundaries of an annular EC region.

In some embodiments, one or more conductive layers of an EC device are segmented into various segments to establish at least three separate concentric annular EC regions around a central, circular EC region. Multiple electrodes may be coupled to the various segments to structure the EC device to selectively switch at least some of the separate EC regions between different transmission levels.

Figure 10:
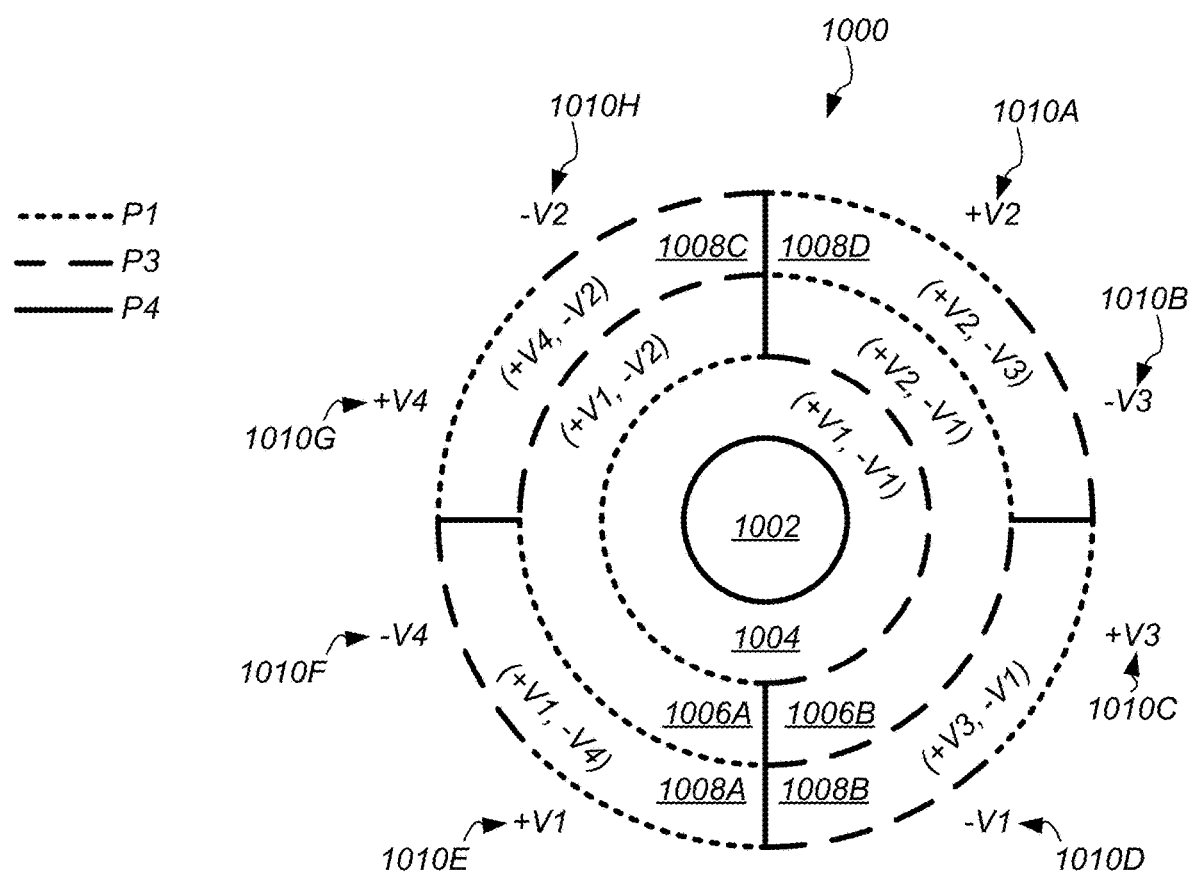
FIG. 10 illustrates a top view of a circular EC device to which eight separate electrodes are coupled and comprising at least three concentric annular EC regions, according to some embodiments.

FIG. 10 illustrates a top view of an EC device 1000 to which eight separate electrodes 1010A-H are coupled, according to some embodiments. EC device 1000 can be included in one or more EC devices illustrated in at least FIG. 4A-C. The device 1000 includes a central circular EC region 1002, which is isolated from electrical connections with any of the electrodes. The circular EC region 1002 is established based at least in part upon a segmentation operation, which can include one or more of a cutting operation, ablation operation, and various segmentation processes known in the art for segmenting a conductive layer of an electrochromic device.

The EC device 1000 includes three concentric EC regions, established based at least in part upon various segmentation operations implemented on one or more conductive layers of the EC device 1000. EC region 1004 is established by a single portion of each conductive layer which extends through an entirety of the region 1004 and encircles region 1002. EC region 1004 is isolated from any direct electrical connection with any of the electrodes 1010A-H and is indirectly electrically connected with electrodes 1010D and 1010E, via portions of interposing EC regions 1008A-B and 1006A-B through which segment portions 1008A, 1006A and 1008B and 1006B extend. Similarly, EC region 1006A-B, established by portions 1006A-B of separate conductive layer segments, is isolated from any direct electrical connection with any of the electrodes 1010A-H and is indirectly electrically connected with electrodes 1010D, 1010A and 1010E, 1010H via portions of interposing EC region 1008A-B through which segment portions 1008A-D extend.

As shown in the illustrated embodiment of FIG. 10, the circular EC region and three concentric annular EC regions are established based at least in part upon at least three separate segmentation operations, labeled "P1", "P3", "P4". Segmentation operations P1 and P3 are implemented upon separate conductive layers on opposite sides of the EC stack of EC device 1000, and segmentation operation P4 can be implemented through both of the separate conductive layers.

As shown in the illustrated embodiment, the segmentation operations, which segment the EC device into separate segments, establishes separate EC regions 1004, 1006A-B, 1008A-B in which separate potential differences can be induced, based at least in part upon particular voltages applied to the various electrodes 1010A-H coupled to the various portions of the EC device 1000. As shown, the voltages applied to the various electrodes can establish different voltages on opposite sides of the EC stack in each separate portion of each separate EC region. The voltages to various electrodes can be selected to cause the separate portions of a given EC region to have a common potential difference. For example, each of the separate portions 1008A-D of annular EC region 1008 A-B can have a common potential difference, based at least in part upon the voltages applied to each of the separate electrodes 1010A-H. Similarly, both of the separate portions 1006A-B of annular EC region 1006A-B can have a common potential difference, which is different from the potential differences through the separate portions 1008A-B of EC region 1008A-B, based at least in part upon separate voltages applied to electrodes 1010D, 1010A and 1010E, 1010H. Similarly, EC annular region 1004 can have a certain potential difference, which is different from the potential differences through the separate portions of regions 1006A-B and 1008A-B, based at least in part upon separate voltages applied to electrodes 1010D-E. The various voltages to the different electrodes 1010A-H can be varied to establish various transmission patterns in EC device 1000. In some embodiments, the EC regions are selectively switched from a common transmission level to different transmission levels for each EC region, where the transmission levels of regions 1006A-B and 1004 are greater than that of EC region 1008A-B, and the transmission level of region 1004 is greater than that of EC regions 1006A-B and 1008A-B. Such selective switching can include selectively switching the EC device from a clear transmission state to an apodized transmission state.

II. Controlled Electrochromic Switching with Sheet Resistance

In some embodiments, an EC device is structured to selectively switch, in separate EC regions, between different transmission levels, so that the EC device can selectively switch the EC regions of the EC device from a common transmission level to separate ones of at least two different transmission levels.

In some embodiments, the EC device is structured to selectively switch to different transmission levels in different regions, based at least in part upon different respective sheet resistances of corresponding conductive layer regions, of one or more of the conductive layers of the EC device, which extend through the respective EC regions. The sheet resistance of various conductive layer regions, of one or more conductive layers, in corresponding EC regions can be adjusted to structure an EC device to selectively switch the various EC regions to different transmission levels.

Figure 11A:
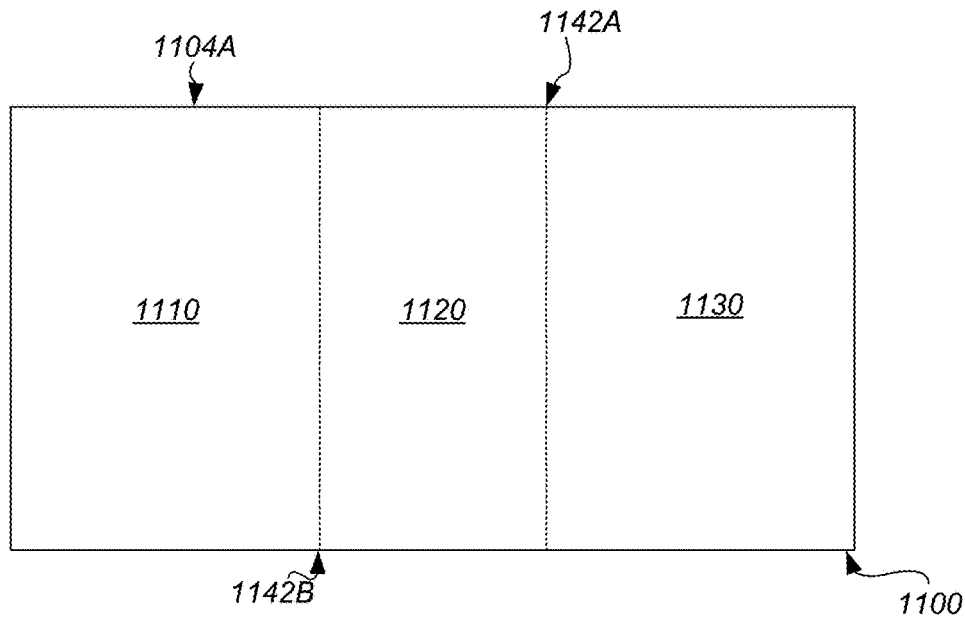
FIG. 11A-C illustrate an EC device which includes an EC stack and separate conductive layers on opposite sides of the EC stack, according to some embodiments.
Figure 11B:
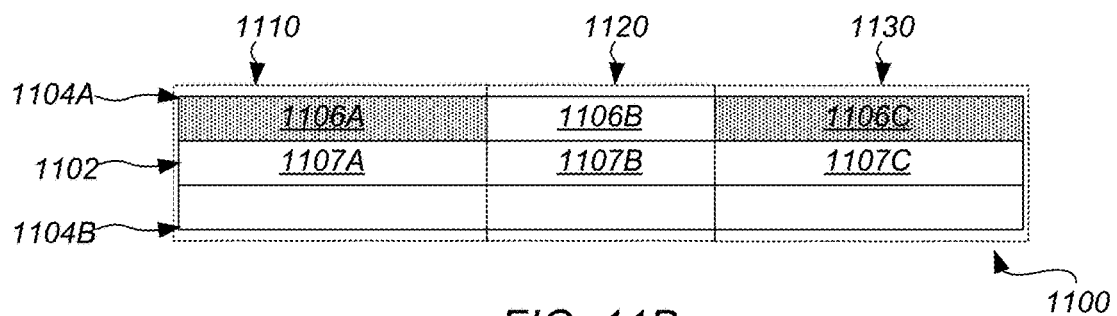
Figure 11C:
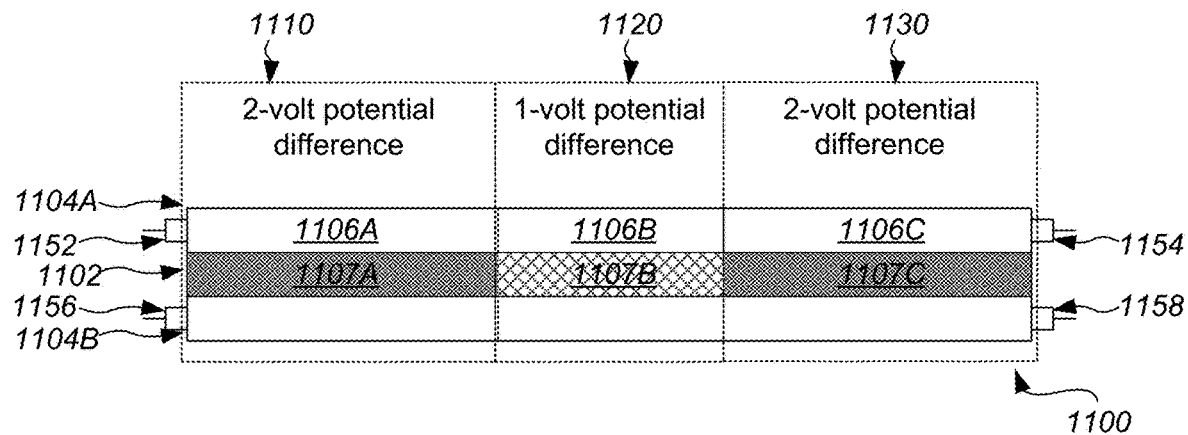

FIG. 11A, FIG. 11B, and FIG. 11C illustrate an EC device 1100 which includes an EC stack and separate conductive layers 1104A-B on opposite sides of an intermediate layer 1102 of the EC stack, according to some embodiments. The EC device 1100 includes three separate EC regions 1110, 1120, 1130, the internal boundaries 1142A-B of which are established by variations in sheet resistance in various conductive layer regions of the top conductive layer 1104A. It will be understood that sheet resistance in various conductive layer regions of both conductive layers 1104A-B can establish various EC regions in the EC device 1100. In some embodiments, variations in sheet resistance in various conductive layer regions of the bottom conductive layer 1104B establish one or more of the boundaries of the EC regions in EC device 1100. EC device 1100 can be included in one or more various EC devices illustrated and discussed with reference to various other figures in the disclosure, including EC device 200 in FIG. 2A EC, device 400 in FIG. 4A-C, etc.

FIG. 11B shows a cross-sectional view of EC device 1100, where top conductive layer 1104A includes separate conductive layer regions 1106A-C which at least partially establish the boundaries of the separate EC regions 1110, 1120, 1130. In the illustrated embodiment, the separate conductive layer regions 1106A, 1106C have a different sheet resistance relative to conductive layer region 1106B. As a result, EC device 1100 is structured to selectively switch the various EC regions 1110, 1120, 1130, based at least in part upon application of voltage to one or more of the conductive layers 1104A-B, from a common transmission level, which can include a full transmission level, to separate ones of at least two different transmission levels. In other words, as shown in FIG. 11C, EC device 1100 is structured to switch the various EC stack regions 1107A-C from a common transmission level to at least two different transmission levels, where EC stack regions 1107A, 1107C are switched to a transmission level that is lower than the different transmission level to which EC stack region 1107B is switched. The transmission level to which a given EC stack region in a given EC region can be switched is based at least in part upon the sheet resistance of the conductive layer regions of the conductive layers which are on one or more sides of the given EC stack region.

The sheet resistance of one or more conductive layer regions in one or more conductive layer regions in one or more EC regions of an EC device can affect the electrical potential difference across an EC stack region in the one or more EC regions. In some embodiments, the electrical potential difference, also referred to as a "potential difference", across an EC stack in a given EC region determines the maximum rate of current flow through the respective portion of the EC stack in that EC region from the CE layer of the EC stack to the EC layer of the EC stack, causing the EC device in the given region to change transmission level, which can include transforming to a colored state and, thus, causing coloring of the EC device. Current can flow at a rate proportional to the potential difference across the layers of the device, provided there is a ready supply of charge, in the form of lithium ions and electrons, to satisfy the requirements.

In some embodiments, adjusting the sheet resistance of one or more of the conductive layers, in a given EC region, can adjust the potential difference across the region of the EC stack that extends through the same EC region. As a result, adjusting the sheet resistance of one or more regions of one or more of the conductive layers can result in one or more corresponding EC stack regions switching to different transmission levels, when a voltage is applied to one or more of the conductive layers. As will be discussed in further detail below, sheet resistance adjustment can be implemented through various processes.

As shown in FIG. 11C, where a voltage is applied to one or more of electrodes 1152-1158 coupled to the various conductive layers 1104A-B, different potential differences are induced in some of the separate EC regions, based at least in part upon different sheet resistances of conductive layer regions in the separate EC regions. In particular, the conductive layer regions 1106A, 1106C have a greater sheet resistance than the conductive layer region 1106B, as is also shown in FIG. 11B. As a result, when one or more voltages are applied to one or more of the electrodes 1152-1158, different potential differences are induced in EC region 1120 and EC regions 1110, 1130. The potential difference in regions 1110, 1130 is greater than in EC region 1120, based at least in part upon the greater sheet resistance of conductive layer regions 1106A, 1106C relative to conductive layer region 1106B. As a result, while EC stack regions 1107A-C switch from a common transmission level upon the application of voltage, EC stack region 1107B switches to a transmission level which is different from, and greater than, the transmission levels to which both of the EC stack regions 1107A, 1107C switch. Thus, the transmission level to which a particular region of an EC stack switches, in a given EC region, can be based at least in part upon a sheet resistance of one or more of the conductive layer regions, of the one or more conductive layers, which are also in the given EC region.

In some embodiments, an EC device is structured to selectively switch each of separate EC regions from a common transmission level to a separate one of at least two different transmission levels, wherein structuring the EC device thusly includes adjusting a sheet resistance of one or more conductive layer regions, of one or more conductive layers of an EC device, based at least in part upon various adjustment processes.

In some embodiments, adjusting the sheet resistances of various conductive layer regions, so that the various conductive layer regions have different sheet resistances, different sheet resistance distribution patterns, etc., includes adjusting one or more various characteristics of the conductive layer in the various conductive layer regions. Such characteristics can include one or more of a particular crystal structure, a particular crystallinity level, a particular chemical composition, a particular chemical distribution, a particular thickness, etc. associated with a particular sheet resistance of the respective TC layer region. For example, changing a crystalline structure, lattice structure, etc. of a conductive layer in a particular conductive layer region can result in changing the sheet resistance of the conductive layer in that particular region. In another example, changing the chemical composition, chemical distribution, etc. of the conductive layer in a given conductive layer region can result in changing the sheet resistance of that given conductive layer region. Adjustments in sheet resistance in one conductive layer region can be independent of other conductive layer regions, including adjacent conductive layer regions.

Figures 12A, 12B:
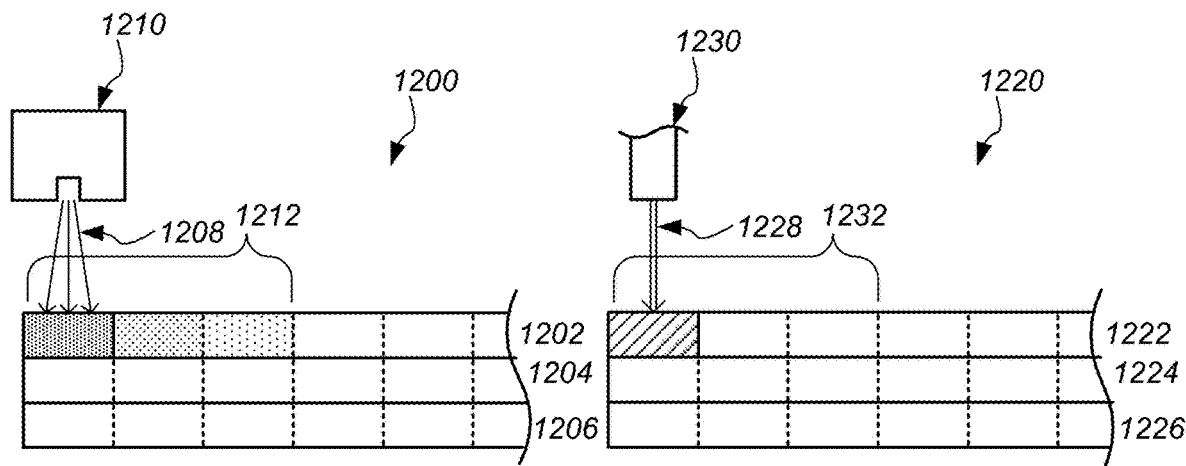
FIG. 12A-D illustrate various methods of changing sheet resistance in various conductive layer regions of one or more conductive layers of an EC device, according to some embodiments.

FIG. 12A-D illustrate various methods of changing sheet resistance in various conductive layer regions of one or more conductive layers of an EC device, according to some embodiments. Such an EC device can be included in one or more various EC devices illustrated in one or more various other figures of the disclosure, including EC device 200 in FIG. 2, EC device 400 in FIG. 4A-C, etc. FIG. 12A illustrates changing the sheet resistance of various conductive layer regions, of a particular conductive layer, via introducing one or more chemical species into the various conductive layer regions to establish one or more particular chemical species distributions, in the various conductive layer regions, which are associated with particular selected sheet resistance distributions. Such introduction of chemical species can include adjusting a charge carrier density, charge carrier distribution, etc. in a conductive layer region to adjust the sheet resistance distribution in the conductive layer region. Such introducing can include introducing, in one or more conductive layer regions, one or more oxidizing species which increase the oxidation level of the conductive layer region to adjust the sheet resistance of the conductive layer region. The conductive layer regions can subsequently be heated to activate one or more species introduced in the layer regions, according to various processes for activation of introduced chemical species in a conductive material, including one or more various processes for activating various species introduced into a material via one or more ion implantation processes. In some embodiments, such heating, also referred to as "firing", of a conductive layer region includes heating at least the conductive layer region to a peak temperature. Some embodiments of "firing" at least a portion of a conductive layer can include heating a conductive layer portion to at least a particular temperature associated with the material of the conductive layer to approximately 370 Celsius, 380 Celsius, etc. Non-limiting examples of oxidizing species which could be introduced can include oxygen, nitrogen, etc. In another example, one or more of various metallic species can be introduced to change the charge carrier density, charge carrier distribution, etc. in a conductive layer region. Non-limiting examples of such metallic species can include indium, tin, some combination thereof, etc. In short, introducing one or more chemical species into a conductive layer region, where the chemical species can change the charge carrier density, charge carrier distribution, etc. in the conductive layer region, can result in an adjustment of the sheet resistance of the conductive layer region. Such introducing can include one or more of implanting one or more chemical species, which can be implemented via well-known ion implantation processes.

FIG. 12A illustrates an EC device 1200 which includes top and bottom conductive layers 1202, 1206 and an EC stack 1204. EC device 1200 can be included in one or more various EC devices illustrated in various other figures of the disclosure. Using a chemical species introduction system 1210, which can include an ion implantation system, masked ion beam, focused ion beam, etc., one or more chemical species 1208 are introduced to various conductive layer regions 1212 of one or more of the conductive layers 1202, 1206. The chemical species distribution can be adjusted and varied across the various regions 1212 to adjust the sheet resistance in various conductive layer regions differently. For example, where an ion implantation system 1210 is used to implant various ions in the various regions 1212, one or more of the ion dosage, ion energy level, number of ion implantation processes, etc. can be adjusted for each region 1212 to establish different chemical species distributions, charge carrier distributions, charge carrier densities, etc. in the various regions 1212, thus establishing different sheet resistances in the various regions 1212. In some embodiments, on or more of ion implantation, a masked ion beam, focused ion beam (FIB), etc. can be used to "draw" a particular sheet resistance pattern into one or more conductive layer regions. In some embodiments, a chemical species "distribution" may include one or more variations in chemical species density, concentration, depth of introduction through a thickness of a conductive layer, etc., across one or more regions of a conductive layer. For example, the depth to which a chemical species is introduced in a conductive layer may vary across the conductive layer, and the sheet resistance of the conductive layer to vary accordingly to the variation in species depth. In another example, the concentration, density, etc. of an introduced chemical species may vary across the conductive layer, and the sheet resistance of the conductive layer to vary accordingly to the variation in species concentration, density, etc.

In some embodiments, the sheet resistance of various conductive layer regions can be adjusted based at least in part upon heating the various conductive layer regions to high temperature in air or oxygen containing gas. Such a process can include selectively exposing various conductive layer regions to the atmosphere during the heating, heating the conductive layer in a specific pattern using a method such as a laser, or a xenon flash lamp, etc. Heating a conductive layer region to high temperature can enable, induce, etc. one or more chemical reactions which oxidize that conductive layer region. In some embodiments, the heating is patterned so that certain conductive layer regions are oxidized, independently of other conductive layer regions which can be heated differently, not at all, etc. As a result, one or more various patterns of oxidation can be created, thus establishing one or more patterns of sheet resistance in the conductive layer which results in structuring the EC device to selectively switch to a transmission pattern corresponding to the sheet resistance pattern. In some embodiments, additional oxidation of a conductive layer results in a higher sheet resistance. In some embodiments, laser annealing can be used to heat particular conductive layer regions to change the sheet resistance in one or more particular "patterns". In some embodiments, the sheet resistance of various conductive layer regions can be adjusted based at least in part upon heating the various conductive layer regions to high temperature in one or more various atmospheres, including one or more mixtures of one or more various gases at one or more atmospheric pressures, etc. In some embodiments, the sheet resistance of various conductive layer regions can be adjusted based at least in part upon heating the various conductive layer regions to high temperature in a vacuum.

FIG. 12B illustrates an EC device 1220 which includes top and bottom conductive layers 1222, 1226 and an EC stack 1224. EC device 1200 can be included in one or more various EC devices illustrated in various other figures of the disclosure. Using a heat source 1230, which can include flash lamp, laser, etc., heat 1228 is applied to one or more various conductive layer regions 1232 of one or more of the conductive layers 1222, 1226. The application of heat 1228 can be adjusted and varied across the various regions 1232 to adjust the sheet resistance in various conductive layer regions differently. For example, where an annealing laser 1230 is used to induce oxidation chemical regions in the various regions 1232, one or more of the laser energy, application time, etc. can be adjusted for each region 1232 to adjust the amount of oxidation in the given region 1232, thus establishing different sheet resistances in the various regions 1232. In some embodiments, an annealing laser 1230 can be used to "draw" a particular sheet resistance pattern into one or more conductive layer regions.

In some embodiments, sheet resistance of various conductive layer regions can be adjusted based at least in part upon adjustment of the relative thicknesses of the various conductive layer regions. For example, additional quantities of conductive layer material can be deposited, in various conductive layer regions, to adjust the sheet resistance of the various conductive layer regions. In another example, one or more removal processes can be implemented to selectively remove at least a portion of the thickness of the conductive layer in particular conductive layer regions to adjust the sheet resistance in the various conductive layer regions. Removal processes can include one or more of a laser ablation process, laser cutting process, etching process, etc. Adding or removing thickness to a given conductive layer region can include adding or removing conductive layer material in a conductive layer region according to a particular pattern, so that the sheet resistance distribution in the conductive layer region is patterned. Such a patterning can structure the EC device to selectively switch to a corresponding transmission pattern.

In some embodiments, adding or removing thickness to a given conductive layer region can include adding an additional buffer material to establish a uniform total thickness of a conductive layer which includes the conductive layer material and the buffer material.

Figure 12C:
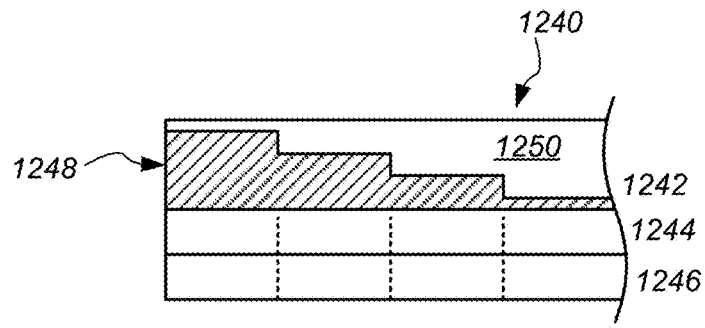

FIG. 12C illustrates an EC device 1240 which includes top and bottom conductive layers 1242, 1246 and an EC stack 1244. EC device 1240 can be included in one or more various EC devices illustrated in various other figures of the disclosure. As shown, various regions of the top conductive layer include different thicknesses of conductive layer material 1248 and buffer material 1250. The buffer material can include one or more various nonconducting material. The different thicknesses of the conductive layer material 1248 in different regions of the conductive layer can cause the different regions to have different sheet resistances.

Figure 12D:
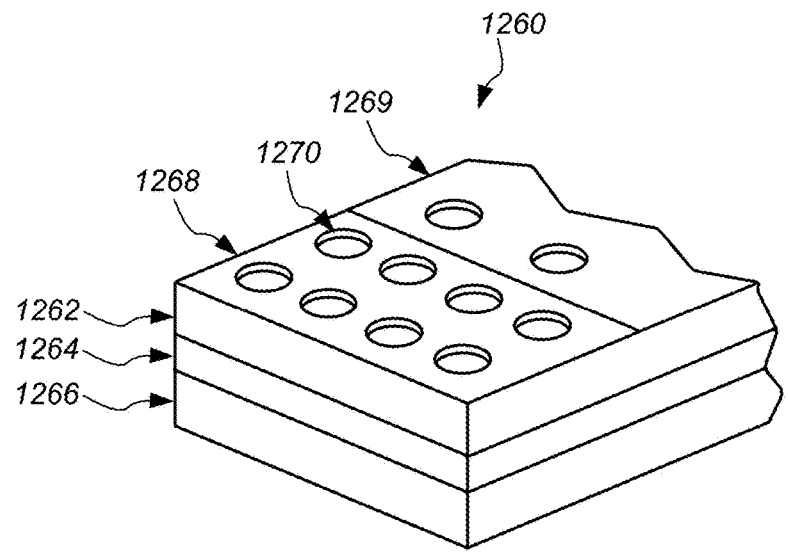

In some embodiments, one or more maskings can be used to establish one or more various sheet resistance patterns in one or more conductive layers of an EC device. FIG. 12D illustrates an EC device 1260 which includes top conductive layer 1262, EC stack 1264, bottom conductive layer 1266, where the top conductive layer includes separate conductive layer regions 1268, 1269 which each include a separate pattern of dot areas 1270 with adjusted sheet resistance. Such patterns can be established through selectively exposing portions of the conductive layer, including selectively exposing one or more portions of one or more conductive layer regions, to one or more of the above sheet resistance adjustment processes, including one or more of chemical species introduction, laser annealing, laser ablating, etc. In some embodiments, a masking can be graded, continuously, in step-changes, etc. so that the exposure of various portions of the conductive layer may selectively vary based on one or more masking gradients in the masking, where the exposure of the conductive layer varies based at least in part upon the masking gradients, so that variable levels of species can pass through the masking and lead to one or more various chemical species distributions throughout the conductive layer, based at least in part upon one or more gradients in the masking. For example, the thickness, permeability, etc. of a masking may vary continuously according to a particular chemical species distribution, etc., so that the amount, density, etc. of chemical species introduced through the masking continuously varies over an area, volume, etc., based at least in part upon the variations in the masking thickness, permeability, etc.

In some embodiments, one or more various other processes can be used to adjust sheet resistance of one or more conductive layer regions. For example, the conductivity on one or more conductive layer regions can be disrupted via implanting various heavy species that damage the lattice structure, as it is known in the art that a defected lattice structure will reduce the conductivity of a conductive layer.

In some embodiments, sheet resistance adjustment can be implemented in one or more of the conductive layers. Such adjustment can be implemented at various stages of a process of providing the layers of the EC device. For example, where an EC device includes a bottom conductive layer, EC stack, and top conductive layer which are sequentially deposited on a substrate, one or more sheet resistance adjustment processes can be implemented on various conductive layer regions of the bottom conductive layer, subsequent to depositing the bottom conductive layer on the substrate and prior to depositing the EC stack on the bottom conductive layer. In another example, one or more sheet resistance adjustment processes can be implemented on various conductive layer regions of the top conductive layer, subsequent to depositing the top conductive layer on the EC stack. In some embodiments, a combination of the above two processes can be implemented.

Figure 13:
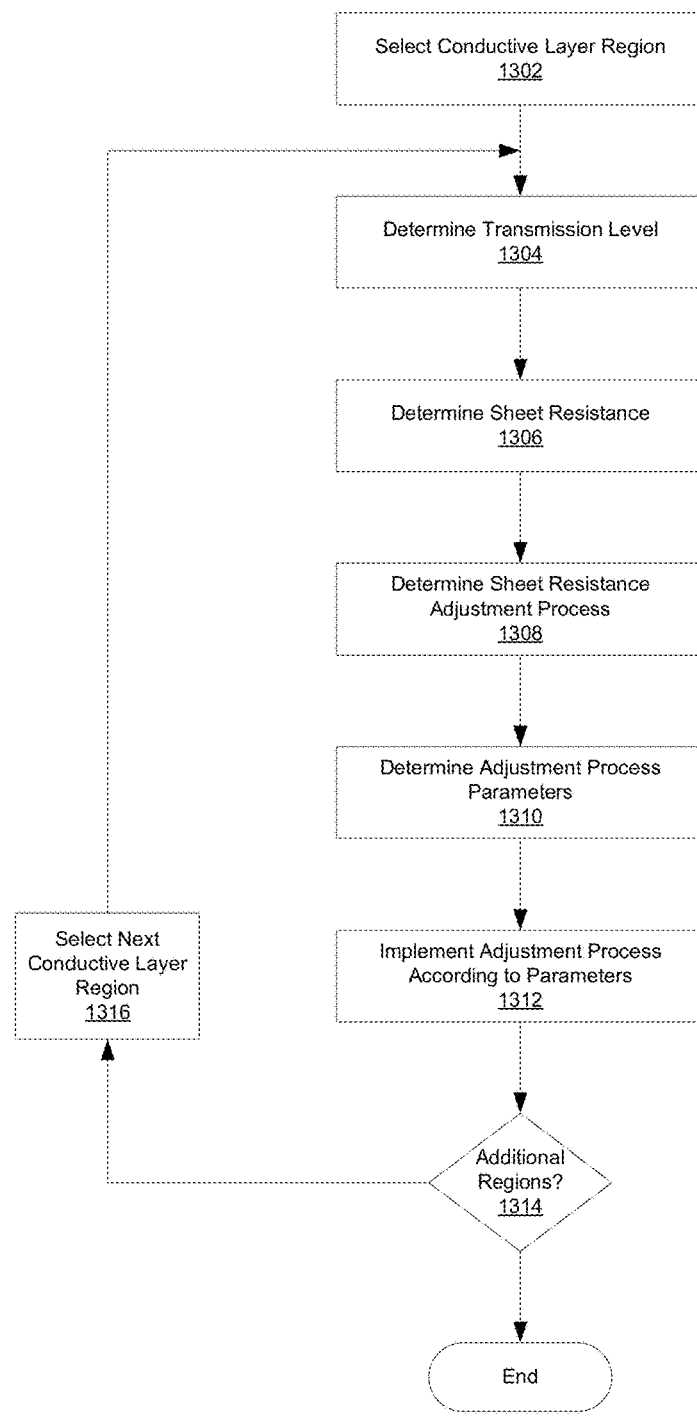
FIG. 13 illustrates adjusting the sheet resistance in various regions of a conductive layer to structure an EC device to selectively switch to a particular transmission pattern, according to some embodiments.

FIG. 13 illustrates adjusting the sheet resistance in various regions of a conductive layer to structure an EC device to selectively switch to a particular transmission pattern, according to some embodiments. The sheet resistance can be adjusted in various conductive layer regions to structure an EC device included in one or more of the various EC devices illustrated in various figures in the disclosure, including EC device 200 in FIG. 2, EC device 400 in FIG. 4A-C, etc.

At 1302, a conductive layer region of a conductive layer is selected. At 1304, a particular transmission level to which an EC stack region corresponding to the conductive layer region is desired to be structured to switch is determined. The corresponding EC stack region may be a region of the EC stack which extends through a common EC region as the selected conductive layer region. It may be desired to structure the entire EC device to selectively switch to an overall particular transmission pattern, including an approximation of a Gaussian transmission pattern. As a result, various EC regions may be desired to be structure to switch to various particular transmission patterns that comprise various portions of the overall particular transmission pattern. At 1306, a particular sheet resistance pattern, distribution, etc. of the selective conductive layer region which is associated with the determined transmission level of the corresponding EC stack region is determined. In some embodiments the determined sheet resistance distribution for the selected conductive layer region is different from a present sheet resistance pattern of the conductive layer region, such that adjustment of the sheet resistance distribution in the selected conductive layer region is required. At 1308, one or more various adjustment processes to implement to adjust the sheet resistance distribution in the selected conductive layer region are determined. Such processes can include introduction of one or more various chemical species, ion implantation, laser annealing, depositing or removal various patterns of thickness of the conductive layer material, etc. At 1310, one or more various parameters of the determined adjustment processes are determined, so that the adjustment process can be implemented to establish the particular determined sheet resistance distribution for the selected conductive layer region. In one example, for introducing a chemical species into the selective conductive layer region, such parameters can include a determined chemical species distribution associated with the determined sheet resistance distribution. In another example, for an ion implantation process, such parameters can include charge carrier density, charged carrier distribution, ion dosage, ion energy level, depth of implantation of ions in the conductive layer material, etc. At 1312, the one or more adjustment processes are implemented in the selected conductive layer region according to the determined parameters. In some embodiments, implementing an adjustment process for a selected conductive layer region is independent of a remainder of the conductive layer regions in the conductive layer. At 1314, a determination is made regarding whether additional conductive layer regions are to be selected for sheet resistance adjustment. If so, at 1316, a next conductive layer region is selected.

In some embodiments, inducing potential differences in various EC regions of an EC device results in the transmission levels of various EC regions changing at different rates, based at least in part upon the different sheet resistances of conductive layer regions in the various EC regions. The transmission level of various EC stack regions may change over time and may not remain fixed at a particular transmission level. In some embodiments, the sheet resistance of a conductive layer region is sufficiently high to preclude transmission level switching of a corresponding EC stack region.

In some embodiments, an EC device includes a short of the EC stack. Such an EC device can be structured to switch various EC regions of the EC device to separate and different transmission levels, where the various EC regions can remain fixed at the different transmission levels.

Figure 14A:
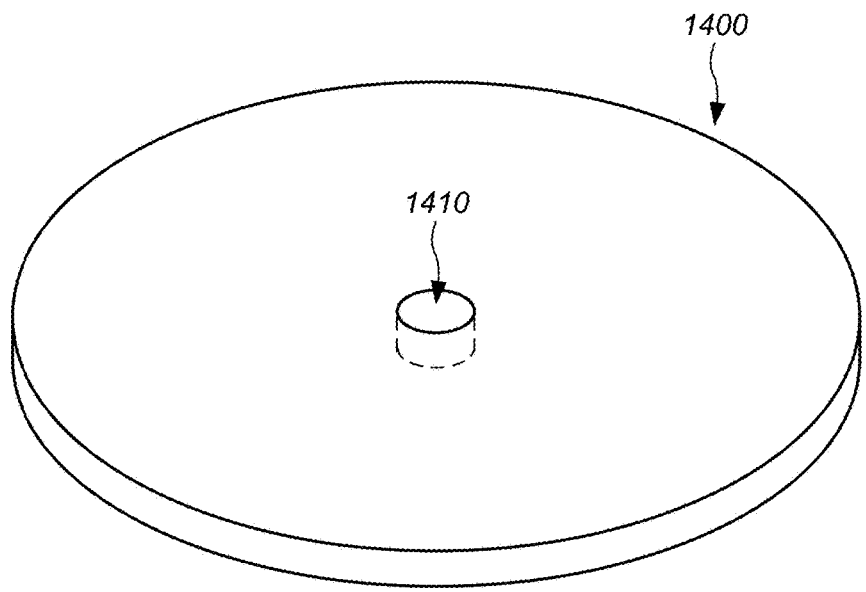
FIG. 14A-B illustrate perspective and cross-sectional views, respectively, of an EC device which includes a short of the EC stack, according to some embodiments.
Figure 14B:
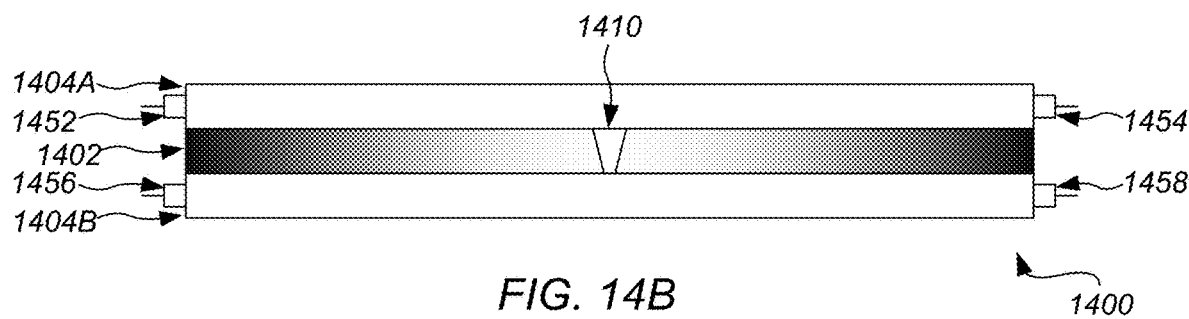

FIG. 14A, FIG. 14B illustrate perspective and cross-sectional views, respectively, of an EC device 1400 which includes a short 1410 of the EC stack 1402, according to some embodiments. EC device 1400 which can be included in one or more EC devices illustrated in various figures in the disclosure. Applying a voltage to one or more of the conductive layers 1404A-B in the EC device 1400, via one or more coupled electrodes 1452-1458, can cause the EC stack 1402 to switch from a common transmission level to multiple different transmission levels, in different regions, extending away from the short 1410. As shown in FIG. 14B, the different EC regions can be sufficiently small, and sufficiently numerous, that the EC stack 1402 is understood to switch from one transmission state, where the various EC regions are at a common transmission level, to a particular transmission pattern, where the transmission level in the EC stack 1402 is a continuous distribution pattern where a given portion of the EC stack varies based on distance from the short 1410 according to a particular relationship between potential difference and distance from the short. In some embodiments, the EC stack 1402 can remain switched at a particular equilibrium transmission pattern indefinitely, provided that voltage continues to be applied and current leakage is negligible.

Figure 15:
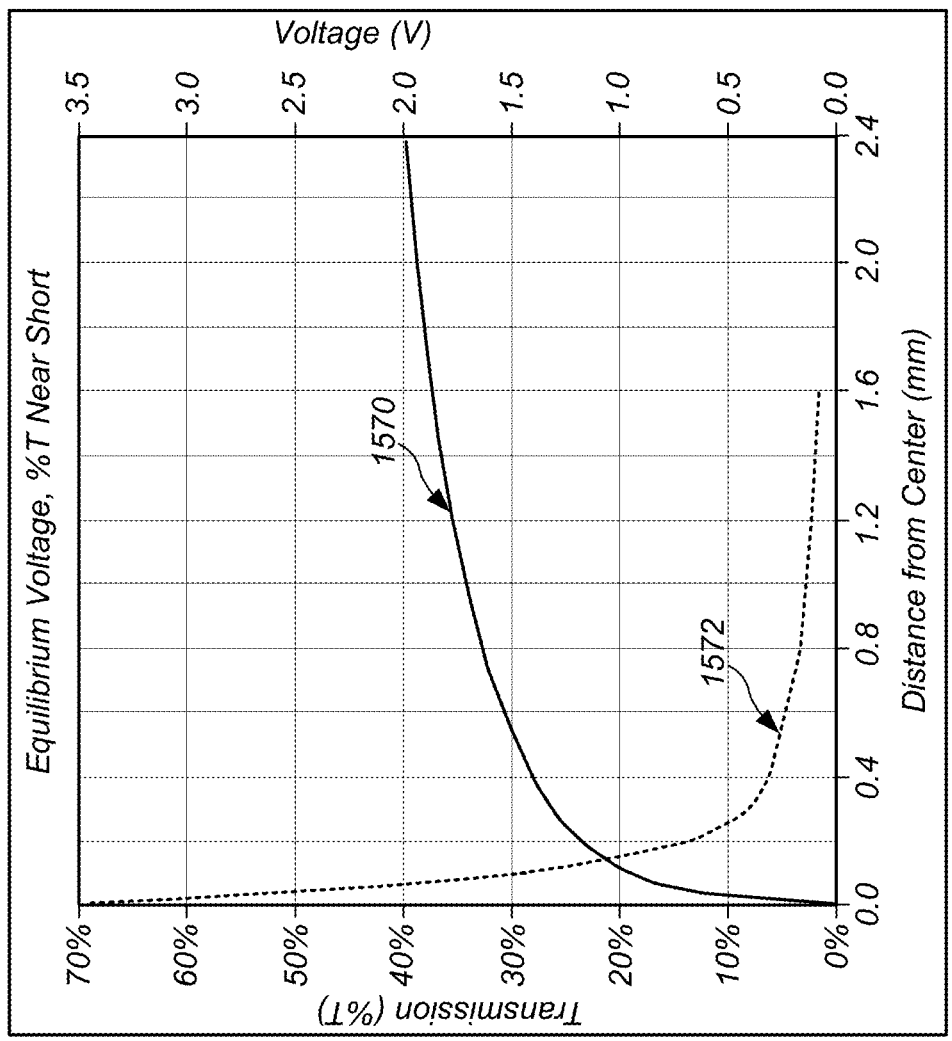
FIG. 15 illustrates a graphical representation of a relationship between potential difference and transmission level of the EC stack of an EC device, upon application of a particular voltage to one or more of the conductive layers of the EC device, according to some embodiments.

FIG. 15 illustrates a graphical representation of a relationship between potential difference and transmission level of the EC stack 1402 of the EC device illustrated in FIG. 14, upon application of a particular voltage to one or more of the conductive layers 1404A-B of the EC device 1400, according to some embodiments. As shown, the potential difference 1570 increases as a function of distance from the short 1410 at the center of EC stack 1402, such that the transmission pattern 1572 of the EC stack 1402, extending away from the short 1410, approximates a logarithmic distribution.

In some embodiments, it is desirable to adjust the sheet resistance of various regions of one or more of the conductive layer regions of one or more conductive layers, to adjust the transmission pattern to which a shorted EC stack can switch. In some embodiments, the sheet resistance in at least one of the conductive layers can be adjusted, in one or more conductive layer regions, to follow a distribution which structures the potential difference across the EC stack to follow a particular distribution pattern extending away from the short of the EC device, so that the transmission pattern to which the EC device switches upon the induction of the potential differences follows a particular distribution pattern. In some embodiments, the sheet resistance of one or more of the conductive layers is adjusted, according to a particular distribution of sheet resistance in the conductive layer, to structure the EC device to selectively switch the EC stack to a transmission pattern which approximates a Gaussian pattern.

Figure 16A:
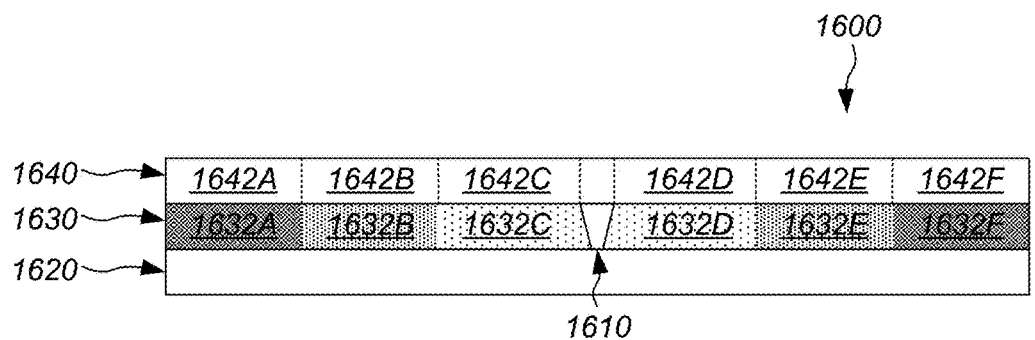
FIG. 16A illustrates an EC device which includes a short of the EC stack and a conductive layer in which the sheet resistance of various conductive layer regions is altered to structure the EC device to selectively switch the EC stack from one transmission state to a particular transmission pattern, according to some embodiments.

FIG. 16A illustrates an EC device which includes a short of the EC stack and a conductive layer in which the sheet resistance of various conductive layer regions is altered to structure the EC device to selectively switch the EC stack from one transmission state to a particular transmission pattern, according to some embodiments. The particular transmission pattern can approximate a Gaussian. EC device 1600, which can be included in one or more EC devices illustrated in at least FIG. 4A-C, includes bottom conductive layer 1620, EC stack 1630, top conductive layer 1640, and a short 1610 of the EC stack 1630. In addition, the top conductive layer 1640 includes various conductive layer regions 1642A-F, and the sheet resistances of the various conductive layer regions 1642A-F are adjusted to various sheet resistances, so that the EC device 1600 is structured to selectively switch from one transmission state, including a clear transmission state, to a particular transmission pattern associated with a distribution pattern of sheet resistance across the various regions 1642A-F of the top conductive layer 1640. The EC stack includes EC stack regions 1632A-F which selectively switch to different transmission levels, transmission patterns, etc., based at least in part upon the various sheet resistances, distribution of sheet resistance, etc. of the various corresponding conductive layer regions 1642A-F. In some embodiments, the sheet resistance distributions in the various regions 1642A-F are such that the EC device 1600 is structured to selectively switch the EC stack 1630 to a transmission pattern which approximates a Gaussian. In some embodiments, a sheet resistance distribution in one or more conductive layer regions includes a variation of sheet resistance through a depth of a conductive layer in one or more conductive layer regions.

Figure 16B:
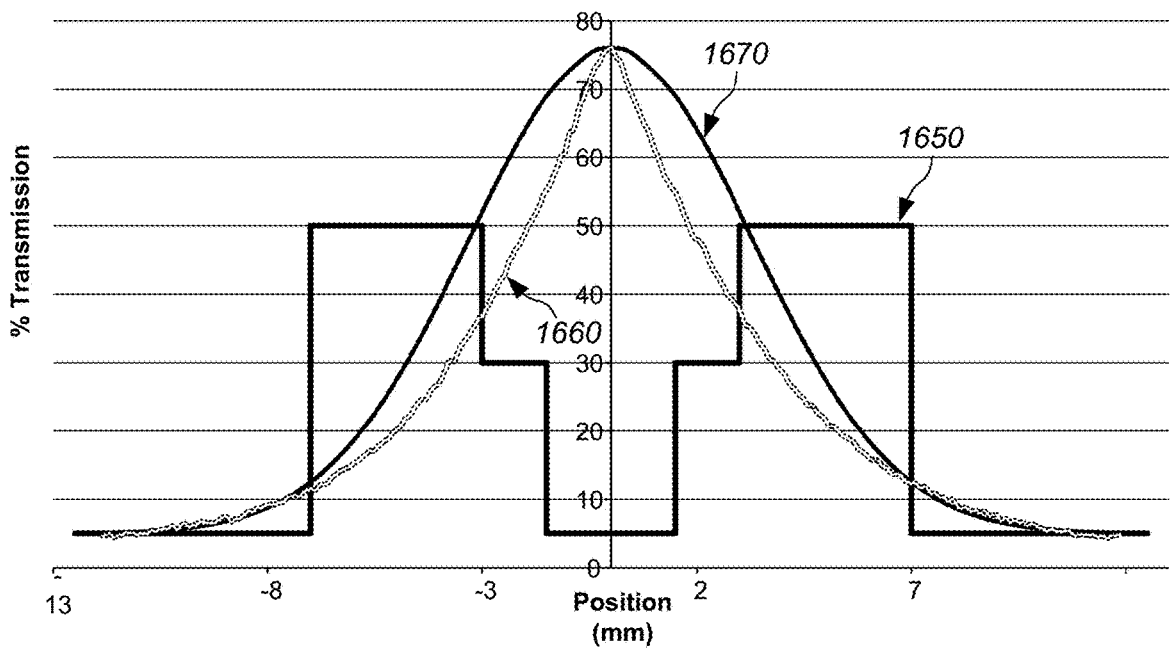
FIG. 16B illustrates a graphical representation of various transmission patterns of an EC device, a transmission pattern of an EC device including a short and a transmission pattern of an EC device which includes one or more sheet resistance distributions through one or more conductive layer regions, according to some embodiments.

FIG. 16B illustrates a graphical representation of various transmission patterns of an EC device, a transmission pattern of an EC device including a short and a transmission pattern of an EC device which includes one or more sheet resistance distributions through one or more conductive layer regions, according to some embodiments. The graphical representation shows a transmission pattern 1660 of an EC device which includes a short, where the transmission pattern 1660 in the representation shows the transmission level of the EC stack, as a percentage of a full transmission level, at various distances from the short. Where the short is located in a center of the EC device, pattern 1660 illustrates variation of transmission level at various distances from the center of the device. Transmission pattern 1660, in some embodiments, is a transmission pattern to which an EC device can switch, where the EC device includes one or more conductive layers having common sheet resistances. Pattern 1650 is a representation of sheet resistance of one or more conductive layer regions, relative to one or more of a short of the EC device, a center of the EC device, etc. Pattern 1670 is a representation of transmission level of an EC device which includes the sheet resistance distribution illustrated by pattern 1650. As shown, the sheet resistance 1650 of the EC device is "stepped" between separate uniform levels as the distance from one or more of the short, center of the EC device, etc., increases. Similarly, as shown by pattern 1670, the transmission pattern to which an EC device can switch, where the EC device include the illustrated sheet resistance distribution 1650 in one or more conductive layers, can be different from a transmission pattern 1660 to which an EC device can switch, where the EC device includes uniform sheet resistance of conductive layer regions and a short can switch. While an EC device with uniform sheet resistances of conductive layers and a short may switch to a transmission pattern 1660 which approximates a logarithmic distribution, an EC device with a sheet resistance distribution 1650 in one or more conductive layers, including an EC device with distribution 1650 in one or more conductive layers and a short, may switch to a transmission pattern 1670 which is different from pattern 1660. In some embodiments, pattern 1670 approximates a Gaussian pattern.

In some embodiments, an EC device includes one or more particular EC regions, surrounded at one or more outer boundaries by one or more outer EC regions, which includes a conductive layer region having a sheet resistance that is greater than a sheet resistance of the conductive layer region in the one or more outer EC regions. The particular region can, in some embodiments, surround one or more inner EC regions, where the one or more inner EC regions include one or more conductive layer regions having a lower sheet resistance relative to the conductive layer regions in the particular EC region. In some embodiments, the particular EC region can be a particular conductive layer region for which the sheet resistance distribution is adjusted to be greater than one or more other conductive layer regions in the EC device.

Figure 17:
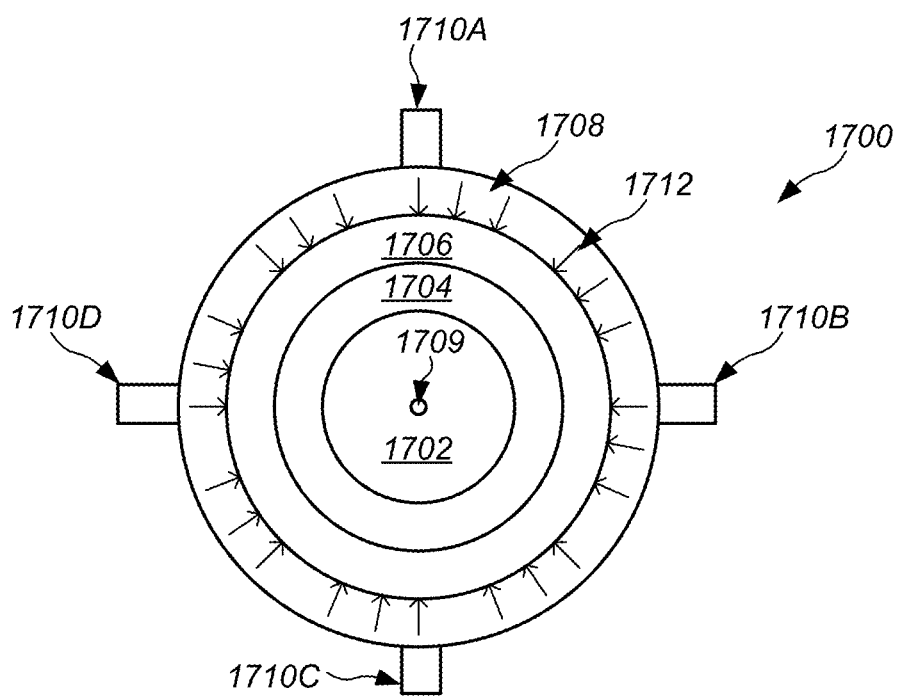
FIG. 17 illustrates an EC device which includes multiple concentric annular EC regions extending outward from a central short of the EC stack included in the EC device, according to some embodiments.

In some embodiments, an EC device can include multiple concentric annular EC regions, where the particular EC region is an annular EC region which is encircled by at least one outer region. The particular annular EC region can encircle one or more inner regions. In some embodiments, the particular annular EC region, outer annular EC regions, and inner annular EC regions extend outward from a short of the EC stack. FIG. 17 illustrates an EC device 1700 which includes multiple concentric annular EC regions 1702, 1704, 1706, 1708 extending outward from a central short 1709 of the EC stack included in the EC device 1700, according to some embodiments. The annular EC regions 1702-1708 may be established based at least in part upon separate concentric annular conductive layer regions, in one or more of the conductive layers in the EC device, which each include separate sheet resistance distributions. The EC device 1700 can be included in one or more of the EC devices illustrated in various other figures of the disclosure. Various electrodes 1710A-D are coupled to one or more of the conductive layer regions included in the outer annular EC region 1708.

In some embodiments, an EC device 1700 structured to include a particular EC region which has a conductive layer region with a sheet resistance that is greater than a sheet resistance of a conductive layer region in an outer EC region is structured to provide increased uniformity in current distribution through at least the particular EC region. Where additional inner EC regions are surrounded by the particular EC region, and the inner EC regions include conductive layer regions with sheet resistances that are lower than that of the particular EC region, the particular EC region can enable increased uniformity in current distribution to and through the one or more inner EC regions. As a result, electrodes coupled to the EC device can be made smaller and spaced further apart, as a need to particularly size and space the electrodes to establish uniform current distribution is at least partially mitigated by the particular EC region increasing the uniformity of current distribution through one or more EC regions from the outer EC region.

In some embodiments, EC region 1706 is a particular annular EC region which includes a conductive layer region having a sheet resistance that is greater than that of conductive layer regions in EC region 1712. In addition, inner annular EC regions 1702-1706 can include conductive layer regions with lower sheet resistances than that of EC region 1706. As a result, and at least partially because electrodes 1710A-C are coupled to conductive layer portions in EC region 1708, current can be distributed through region 1708 before being distributed through EC region 1706, based at least in part upon the increased sheet resistance of the conductive layer in region 1706 relative to region 1708. As a result, current distribution from region 1708 to region 1706, and from region 1706 to one or more of the inner regions 1702-1706, is increased in uniformity, relative to if region 1706 included a conductive layer region having a sheet resistance that is less than that of region 1708.

In one example, EC region 1706 includes a conductive layer region with a sheet resistance of approximately 500 ohms/square mm, and region 1708 includes a conductive layer region with a sheet resistance of approximately 50 ohms/square mm. The lower sheet resistance around the outer boundary of region 1706 enables the low sheet resistance region 1708 to distribute the current from electrodes 1710A-D more uniformly because the high resistance region 1706 provides the current limit for the EC device 1700. As a result, electrodes, 1710A-D, which can include one or more bus bars, can be located further away from region 1706 without impacting switching speed or uniformity. In addition, the potential difference in the EC device 1700 will be across the high sheet resistance annular region 1706, so the width of the voltage profile to the short can be adjusted by varying the dimensions of the annular region 1706.

III. Controlling Electrochromic Switching with Implanted Species Transport Rate In some embodiments, an EC device is structured to selectively switch, in separate EC regions, between different transmission levels, so that the EC device can selectively switch the EC regions of the EC device from a common transmission level to separate ones of at least two different transmission levels.

An EC device, as describe hereinafter and above, can include an EC stack which can change transmission based at least in part upon an induced potential difference across the EC stack which moves charge from one layer, including an anode, to another layer, including a cathode. Materials included in the EC stack can be selected so that when the anode is oxidized, it becomes more absorbing, and when the cathode is reduced it becomes more absorbing. The charge can be in the form of one or more various species, including protons, lithium ions, heavier ions than lithium, etc. In some embodiments, a charged electrolyte species has a particular transport rate, associated with the mobility of the species between the various layers, so that a charged electrolyte species with a lower transport rate will move more slowly between layers, resulting in a slower rate of change of transmission level of the EC stack when a potential difference is induced.

In some embodiments, various charged electrolyte species can be introduced into one or more of the layers of an EC stack, where the various charged electrolyte species have various different transport rates, to structure the EC stack to change transmission at different rates, change to different transmission levels, etc. in different EC regions of the EC stack.

In some embodiments, introducing various species having various transport rates can include replacing some of the mobile charge, represented by charged electrolyte species with a relatively high transport rate, with other charge that is either less mobile or not mobile, represented by other charged electrolyte species with relatively low transport rates. Such introduction could be implemented using a variety of methods, including chemical bath diffusion, sputtering of different species through masks, ion implantation through masks, focused ion beam (FIB), etc.

An EC stack, as referred to hereinafter and above, can include a counter-electrode (CE) layer, an electrochromic (EC) layer, and an ion conducting (IC) layer between the two. In some embodiments, one of the CE layer or the EC layer is structured to reversibly insert ions such as cations, including one or more of H+, Li+, D+, Na+, K+ or anions, including one or more of OH−, especially made of an anodic (or respectively cathodic) electrochromic material; and the other of the CE layer or the EC layer is structure to reversibly inserting said ions, especially made of a cathodic (or respectively anodic) electrochromic material. The IC layer, in some embodiments, is structured to include an electrolyte layer. The EC stack may be characterized in that at least one of the CE layer or the EC layer may be structure to reversibly insert said ions, including layer made of an anodic or cathodic electrochromic material, has a sufficient thickness to allow all the ions to be inserted without electrochemically disfunctioning said active layers, in that the IC layer having an electrolyte function comprises at least one layer based on a material chosen from tantalum oxide, tungsten oxide, molybdenum oxide, antimony oxide, niobium oxide, chromium oxide, cobalt oxide, titanium oxide, tin oxide, nickel oxide, zinc oxide optionally alloyed with aluminum, zirconium oxide, aluminum oxide, silicon oxide optionally alloyed with aluminum, silicon nitride optionally alloyed with aluminum or with boron, boron nitride, aluminum nitride, vanadium oxide optionally alloyed with aluminum, and tin zinc oxide, at least one of these oxides being optionally hydrogenated, or nitrided, in that one or more of the CE layer or the EC layer comprises at least one of the following compounds: oxides of tungsten W, niobium Nb, tin Sn, bismuth Bi, vanadium V, nickel Ni, iridium Ir, antimony Sb and tantalum Ta, alone or as a mixture, and optionally including an additional metal such as titanium, rhenium or cobalt, and in that the thickness of one or more of the EC layer or the CE layer is between 70 and 250 μm, between 150 and 220 μm, etc.

The EC layer can include various materials, including tungsten oxides. The CE layer can include various materials, including one or more tungsten-nickel oxides. The IC layer can include various materials including one or more silicon oxides. The charge can include various charged electrolyte species, including lithium ions. An IC layer can include a layer region, a multilayer region, an interfacial region, some combination thereof, or the like. An IC layer which includes an interfacial region can include one or more component materials of one or more of the EC or CE layer.

In some embodiments, each of the layers of the EC stack can reversibly insert cations and electrons, the modification of their degree of oxidation as a result of these insertions/extractions leading to a modification in its optical and/or thermal properties. In particular, it is possible to modulate their absorption and/or their reflection at wavelengths in the visible and/or the infrared. An EC stack can be included in an EC device in which the electrolyte is in the form of a polymer or a gel. For example, a protonically conductive polymer, or a conductive polymer conducting by lithium ions, where the other layers of the system generally being of inorganic nature. In another example, an EC stack can be included in an EC device where the electrolyte and the other layers of the stack are of inorganic nature, which may be referred to by the term "all solid-state" system. In another example, an EC stack can be included in an EC device where all of the layers are based on polymers, which may be denoted by the term "all polymer" system.

Where an EC stack is in a "rest" state, where the EC device including the EC stack is referred to as being in a full transmission state, the charge resides in the CE layer, reducing it and making it highly transparent. When the device is switched, by inducing a potential difference across the conductive layers on opposite sides of the EC stack in the EC device, charge, including Lithium ions, move from the CE layer to the EC layer, which causes the transmission level of the EC stack to change. In some embodiments, some of the lithium ions are replaced with another charged electrolyte species that still reduces the CE layer but has a relatively lower transport rate, relative to the lithium ions (either by being larger or by being more strongly bound within the molecular lattice structure of the CE layer). As a result, the rate and amount of transmission level switching by one or more regions of the CE layer can be adjusted. Adjusting a rate and amount of transmission level switching by a CE layer region includes adjusting a rate and amount of transmission level switching by a corresponding EC layer.

Charge electrolyte species having various transport rates can include rare earth and alkali metals. These are species heavier or more tightly bound than Lithium and would include, for example, sodium, potassium, rubidium, cesium, francium, beryllium, magnesium, calcium, strontium, barium, and radium.

For example, in some embodiments, a CE layer of an EC stack can be deposited on a conductive layer, which can include a transparent conductive layer including ITO, and various different charged electrolyte species can be introduced, implanted, etc. into separate CE layer regions. For example, magnesium ions can be implanted in one or more CE layer regions, and sodium ions can be implanted into one or more other CE layer regions. It should be understood that the pattern, depth, and dosage of ion implantation, as discussed throughout the disclosure, can be controlled. For example, aluminum foil masking can be utilized to selectively expose a pattern of CE layer regions to implantation of one or more particular charged electrolyte species.

In some embodiments, one or more charged electrolyte species can be introduced into a CE layer region via one or more certain implantation processes, including an ion implantation process, and one or more other charged electrolyte species can be introduced into one or more CE layer regions via one or more other implantation processes, including chemical diffusion, chemical bath diffusion, etc. For example, subsequent to implanting magnesium ions in one or more CE layer regions via an ion implantation process, lithium ions can be introduced into one or more CE layer regions via an electrochemical lithiating process. The CE layer regions can subsequently be heated to activate one or more species introduced in the layer regions, according to various processes for activation of introduced chemical species, including one or more various processes for activating various species introduced into a material via one or more ion implantation processes. In some embodiments, such heating, also referred to as "firing", of a CE layer region includes heating at least the CE layer region to a peak temperature. Some embodiments of "firing" at least a portion of a CE layer can include heating a CE layer portion to at least a particular temperature associated with the material of the CE layer to approximately 370 Celsius, 380 Celsius, etc. As magnesium and lithium ions have different transport rates, such that the transport rate of magnesium is less than that of lithium, inducing a potential difference across an EC stack which includes the CE layer regions can result in CE layer regions which include the magnesium ions switching transmission level at a lower rate than the CE layer regions which include the lithium ions.

In some embodiments, the distribution of one or more charged electrolyte species in one or more CE layer regions is controlled to establish a particular distribution pattern of the charged electrolyte species in the CE layer, so that the CE layer, upon induction of a potential difference across the EC stack, changes transmission in different regions at different rates so that the EC device is structured to selectively switch from a "rest" or "clear" transmission state to a particular transmission pattern, based on the different transmission change rates in the different CE layer regions.

In some embodiments, charged electrolyte species which have a sufficiently low transport rate to be non-mobile are implanted in one or more CE layer regions to structure the CE layer regions to not switch transmission level upon a voltage level being induced across the EC stack. In some embodiments, an EC device including the CE layer is structured to selectively switch from a "rest" or "clear" transmission state to a particular transmission pattern, based at least in part upon inducing a potential difference across the EC stack in which the CE layer is included, where the various CE layer regions include various distributions of various charged electrolyte species of various mobility, transport rate, etc.

In some embodiments, the distribution pattern can be varied, across various CE layer regions, to structure the EC device to switch to a particular transmission pattern which includes a particular transmission distribution pattern. Such a pattern can approximate a Gaussian. As a result, an EC device can be structured to selectively switch to an approximate Gaussian transmission pattern. Where the EC device is included in a camera device, the EC device can be structured to selectively apodize an aperture to approximate a Gaussian transmission pattern. In some embodiments, the various distribution patterns can include multiple concentric annular CE layer regions, established by different transport rates of charged electrolyte species in each separate CE layer region. As a result, an aperture with multiple stepped regions can be established without segmenting conductive layer regions. In another example, the distribution patterns can approximate an image, watermark, etc.

In some embodiments, implanting charged electrolyte species with various transport rates in one or more layers of the EC stack structures the EC device to switch between one transmission state and a particular transmission pattern associated with the distribution of charged electrolyte species in the one or more layers. As changes move between EC stack layers, including CE layers, IC layers, and EC layers, by moving from one charge site to another, implanting charge sites in a region of an EC stack layer with charged electrolyte species having a reduced transport rate, relative to other charged electrolyte species introduced in one or more layers of the EC stack, can enable the implanted charged electrolyte species to at least partially block transport of other charged electrolyte species through at least that region. As a result, the rate of transmission level switching, or whether transmission switching can occur at all, in a particular EC region can be adjusted through implanting charged electrolyte species having different transport rates in various regions of one or more EC stack layers.

For example, a charged electrolyte species with a relatively low transport rate, implanted in a particular region of the IC layer or EC layer in an EC stack, can at least partially inhibit movement of more mobile charges through the EC stack, thereby altering the rate of transmission level change in at least one EC region of the EC stack, altering a transmission pattern to which the EC stack can be switched, etc. Where a charged electrolyte species is introduced into the EC layer, the introduced distribution of the charged electrolyte species may switch one or more regions of the CE layer to a particular transmission pattern associated with the distribution of the introduced species in the one or more regions, and switching of the one or more regions to a full transmission level may be at least partially precluded.

Figure 18A:
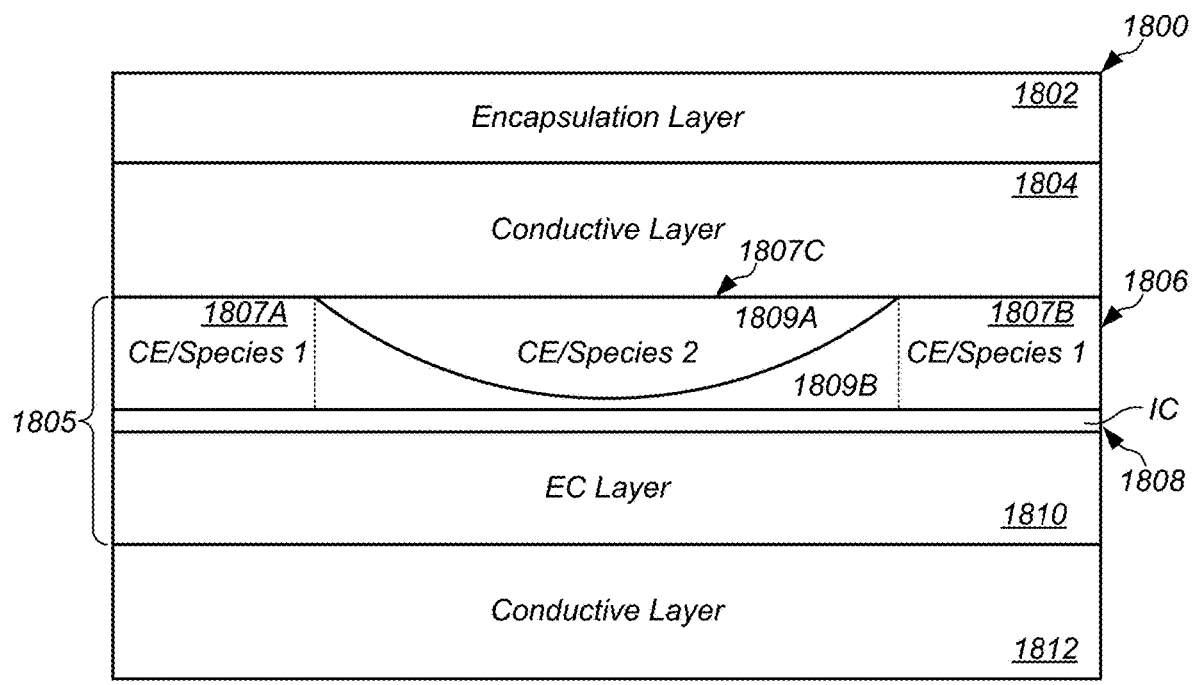
FIG. 18A-B illustrates an EC device including one or more EC stack layers with various distributions of various charged electrolyte species with different transport rates.
Figure 18B:
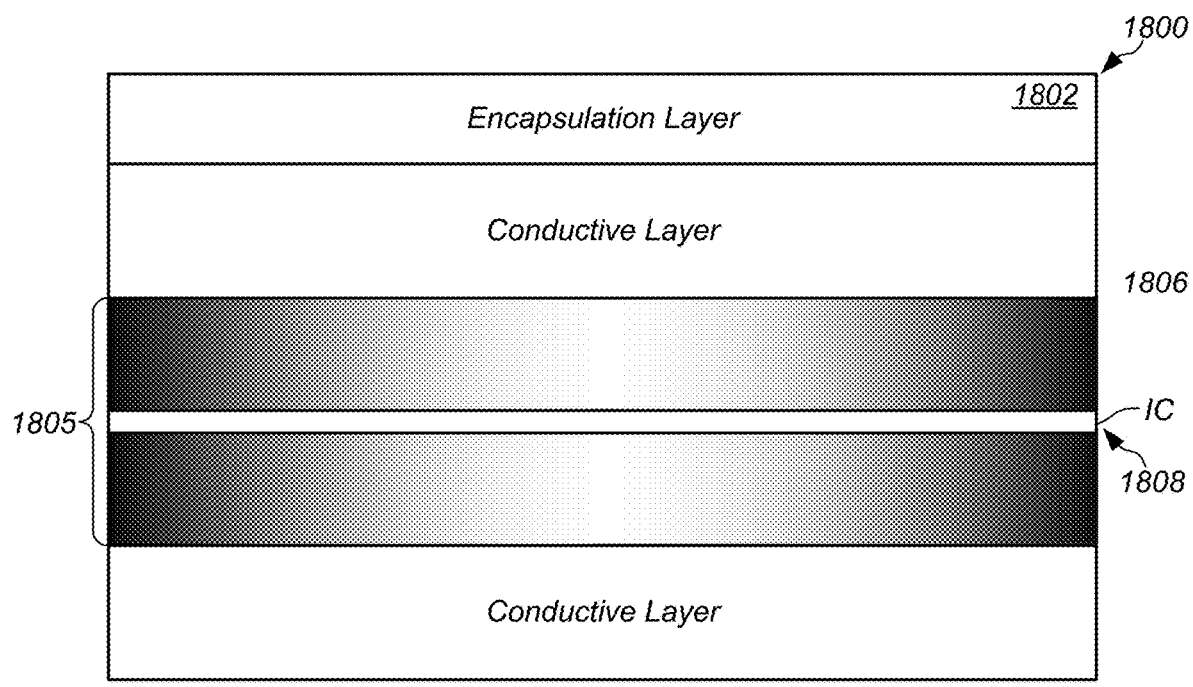

FIG. 18A-B illustrate an EC device 1800 including one or more EC stack layers with various distributions of various charged electrolyte species with different transport rates. EC device 1800 can be included in one or more various EC devices illustrated in various other figures of the disclosure. EC device 1800 includes multiple layers which can be deposited on a substrate. EC device 1800 includes an encapsulation layer 1802, a top conductive layer 1804, an EC stack 1805, and a bottom conductive layer 1812. The EC stack includes a CE layer 1806, an IC layer 1808, and an EC layer 1810. The CE layer includes multiple CE layer regions 1807A-C, each of which includes a distribution of one or more charged electrolyte species. CE layer regions 1807A-B each include a distribution of one charged electrolyte species, and region 1807C includes a separate distribution 1809A-B of another separate charged electrolyte species. In some embodiments, the species in regions 1807A-B includes a lower transport rate than the species in region 1807C. As shown, the distribution 1809A of the charged electrolyte species in region 1807C varies in depth through the CE layer. The distribution of a charged electrolyte species through in a CE layer region can vary in depth, concentration, etc. The distribution can be associated with a particular selected transmission pattern, where the distribution of the charged electrolyte species in the CE layer region structures the EC device 1800 to selectively switch to the particular selected transmission pattern. FIG. 18B illustrates EC device 1800 where a potential difference is induced across EC stack 1805. As shown, where the species introduced in regions 1807A-B have a greater transport rate than the species distributed 1809A in region 1807C, inducing a potential difference across EC stack 1805 can result in more charge moving between the CE layer and the EC layer from regions 1807A-B, relative to region 1807C, and according to at least the distribution 1809A of the species in region 1807C. As a result, a transmission pattern is established in the CE layer and EC layer of the EC stack, where the transmission pattern is associated with the various distributions of the two species of different transport rates in the various CE layer regions 1807A-C. As shown, because the species in distribution 1809A has reduced transport rate, relative to the species in at least regions 1807A-B, the transmission level in a region of the EC stack corresponding to region 1807C is greater than in regions corresponding to regions 1807A-B, and varies based at least in part upon the distribution of the reduced transport rate species in region 1807C.

In some embodiments, multiple separate species are introduced in a common CE layer region, so that the CE layer region includes at least two separate distributions of at least two separate charged electrolyte species. For example, in the illustrated embodiment, region 1807C may include a distribution 1809A of a charged electrolyte species having one transport rate, and another distribution 1809B of another charged electrolyte species having a greater transport rate. Where one charged electrolyte species is introduced in a particular distribution through a portion of a CE layer region, another charged electrolyte species can be introduced in a remainder of charge sites in the CE layer region. For example, distribution 1809A may be established via an ion implantation process which implants a species various charge sites in region 1807C, and distribution 1809B may be established via a chemical diffusion bath, subsequent to the ion implantation process, to introduce another species to the remaining charge sites in region 1807C.

IV. Moisture-Resistant Electrochromic Device

In some embodiments, an EC device, including the one or more of the various EC devices illustrated and discussed above, is structured to restrict moisture permeation between the EC stack of the EC device and an external environment.

In some embodiments, a moisture-resistant EC device includes a single substrate, upon which the plurality, or stack, of layers of the EC device are provided. A single substrate may be used to limit the thickness of the overall EC device. The plurality of layers may be structured to restrict moisture permeation between the EC stack and an external environment. Such structuring of an EC device may be referred to as "passivating" the device, and an EC device structure to restrict moisture permeation between the EC stack and the external environment may be referred to as a "passivated" EC device.

Such structuring or "passivating" can include providing, in the plurality of layers of the EC device, at least one encapsulation layer. An encapsulation layer is resistant to moisture permeation, and the at least one encapsulation can extend over various layers in the EC device to cover various portions of various layers, including edge portions, from being exposed to the external environment. In some embodiments, an encapsulation layer includes one or more of an anti-reflective (AR) layer, infrared cut-off filter (IR cut) layer, so that the encapsulation layer is structured to simultaneously block moisture and perform one or more various functions of the EC device, including mitigating reflection where the layer includes an AR layer. In some embodiments, an EC device includes a protonic device which includes water used to enable ions to move between layers. An encapsulation layer can at least partially restrict the water in the protonic device from leaving the device and entering an external environment.

In some embodiments, a passivated EC device can be included in a camera device, including an EC device included in camera device 300 illustrated in FIG. 3. A passivated EC device may be used as an aperture filter, iris, etc. for the camera device, and may be structured to selectively apodize, as discussed further above. In some embodiments, a passivated EC device is included in architectural 'motherboards' which can be shipped across extended distance before further processing. The passivation of the motherboards can protect against moisture damage. As a result, a passivated EC device could enable the shipment of completed mother boards to remote IGU assembly operations without risking moisture damage to the exposed device. In some embodiments, a passivated EC device can be included in one or more single pane windows for transportation applications and other uses where weight is important. In some embodiments, a passivated EC device which includes a single substrate can also be used to hide or reveal information on displays for hand held devices, computers, etc. In some embodiments, a passivated EC device is used in dynamic eyewear.

In some embodiments, an EC device includes at least one encapsulation layer and one or more conductive layers which collectively restrict moisture permeation between the EC stack and the external environment. Providing an encapsulation layer alone on a plurality of layers of an EC device may be insufficient to preclude moisture permeation between the EC stack and the external environment, as exposed edge portions of the EC stack layers can transport moisture. Structuring the EC device so that the only exposed edge portions of layers in the plurality of layers include the at least one encapsulation layer and one or more conductive layers, where the exposed edge portions of the conductive layers resist moisture permeation, can result in a passivated EC device. In some embodiments, a conductive layer includes one or more transparent conductive layers, also referred to as transparent conducting oxides (TCOs) which resist moisture permeation. As a result, the conductive layers can extend to the edges and be exposed to the external environment at one or more edge portions, while the EC stack remains covered from the external environment.

In some embodiments, a conductive layer includes multiple elements, including a moisture-resistant outer portion and a moisture-transporting inner portion which is covered from exposure to the external environment by the outer portion. For example, the conductive layer may include an inner transparent conducting oxide portion which transports moisture, and one or more outer non-transparent conducting portion which resists moisture permeation. The outer portion may be exposed to the external environment, enabling the transparent conducting oxides to be protected from moisture permeation.

In some embodiments, a passivated EC device includes one or more sets of bus bars which are structured to cause the EC device to switch between separate transmission states with uniform and symmetrical radial optical density distribution. Each set of bus bars can include a bus bar coupled to one of the conductive layers of the EC device, on a first side of the device, and another bus bar coupled to another one of the conductive layers on an opposite side of the device. The separate bus bars in the set may be structured to extend uniformly in spacing from each other. Where the EC device is circular, the bus bars in a set may be curved to extend at a fixed distance from each other.

In some embodiments, an EC device includes two separate encapsulation layers, including a top encapsulation layer which is located between the EC stack and an external environment and a bottom encapsulation layer which is located between the EC stack and the substrate. A bottom encapsulation layer may be present where the single substrate transports moisture. Where the single substrate is structured to resist moisture permeation, the bottom encapsulation layer may be absent from the EC device. The substrate can comprise one or more of sapphire, chemically strengthened glass, chemically tempered glass, including GORILLA GLASS™, chemically tempered borosilicate glass, etc.

In some embodiments, an EC device includes an obscuration layer which is located between the EC stack and the single substrate. Where the EC device includes a bottom encapsulation layer, the obscuration layer may be located between the bottom encapsulation layer and the single substrate. In some embodiments, the obscuration layer is the first layer deposited on the substrate and obscures all other film layers from the viewer observing the EC device from an opposite side of the single substrate from the side on which the layers of the EC device are deposited. The obscuration layer can be comprised of a black material which has an optical density of ≥3. The black material can include dielectric stack which looks dark black from the viewing side of the substrate, but is structured to reflect key laser processing wavelengths (e.g. green, and near-IR) used to selectively ablate layers on the device side of the substrate. The obscuration layer may obscure the bus bars, edges of various layers, etc. so that a viewer is precluded from seeing conductive bus bars or any evidence of laser processing when looking through the substrate.

In some embodiments, an EC device includes a buffer layer which is located between the EC stack and the obscuration layer. The buffer layer can at least partially isolate the obscuration layer from damage during removal of one or more portions of the plurality of layers, including damage due to laser ablation of the various other layers during EC device fabrication. The buffer layer could include a thick layer of a material that does not affect the optical properties of the EC device. For example, the buffer layer can include might be $Al_2O_3$ or $SiO_x$ or similar materials. In some embodiments, a bottom encapsulation layer can serve as a buffer layer if it is thick enough to prevent laser damage to the obscuration layer. The buffer layer can preclude dielectric interference between the EC stack and the obscuration layer so that the optical properties of the obscuration layer permit reflection of the laser energy rather than absorption and degradation of the black material of the obscuration layer. The thickness of the buffer layer can enable and enhance the selective ablation processes for the EC device layers.

Figure 19A:
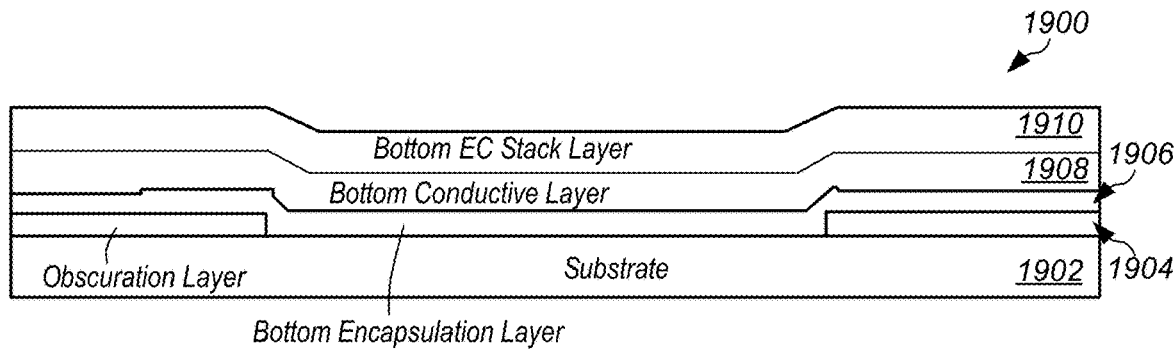
FIG. 19A-G illustrate a process of fabricating a passivated EC device, according to some embodiments.

FIGS. 19A-G illustrate a process of fabricating a passivated EC device, according to some embodiments. In some embodiments, the process includes preheating a chamber in which at least a portion of the passivated EC device is fabricated, which results in removing adsorbed water. As shown in FIG. 19A, starting from a single substrate 1902, an obscuration layer 1904 is deposited on the substrate. In some embodiments, the process of fabricating the passivated EC device includes pre-heating the substrate, which results in removing at least some adsorbed water. In some embodiments, the substrate is heated during deposition of one or more layers. Such heating can include heating the substrate from 80 degrees Celsius to 150 degrees Celsius. In some embodiments, such heating includes heating the substrate from 90 degrees Celsius to 120 degrees Celsius.

The obscuration layer 1904, in some embodiments, is annular in shape, so that the deposited obscuration layer 1904 encircles an exposed portion of the substrate 1902. A bottom encapsulation layer 1906 can be deposited on the exposed portion of the substrate and the obscuration layer. In some embodiments, the obscuration layer can transport moisture, but moisture permeation between the obscuration layer and the EC stack is restricted by one or more moisture-resistant layers, which can include a conductive layer, an encapsulation layer, etc. As further shown in FIG. 19A, a bottom conductive layer 1908 and a bottom EC stack layer 1910 can be deposited on the bottom encapsulation layer 1906. As discussed further above, an EC stack layer can include one or more of a CE layer, IC layer, EC layer, etc. In the illustrated embodiment, layer 1910 can be one of a CE layer or an EC layer.

Figure 19B:
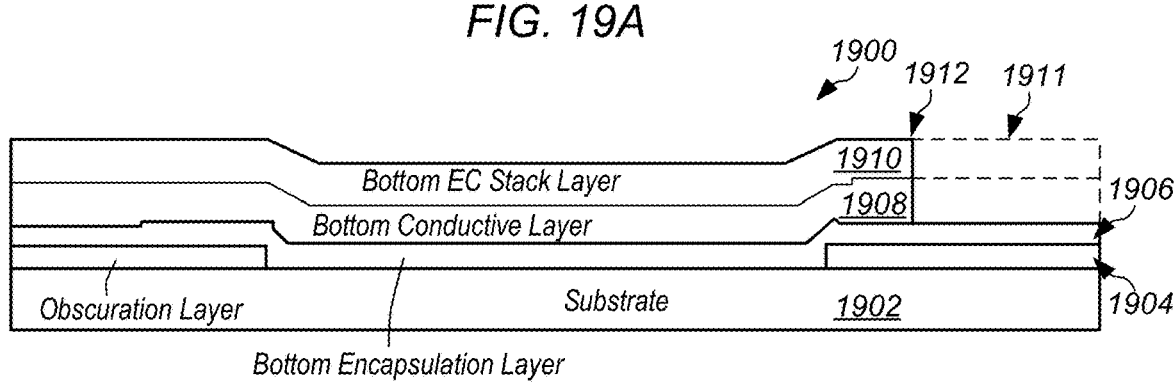

As shown in FIG. 19B, outer portions of the bottom EC stack layer 1910 and the bottom conductive layer 1908 can be selectively removed proximate to a first side of the EC device 1900, via a removal operation 1911, to expose edge portions 1912 of the bottom EC stack layer and the bottom conductive layer. The removal operation, which can include a laser ablation operation, can restrict the edge portions 1912 of at least the bottom EC stack from the edge of the EC device 1900 at the first side of the device. In addition, as shown, the removal operation 1911 can expose an outer portion of the bottom encapsulation layer at the first side of the EC device 1900.

Figure 19C:
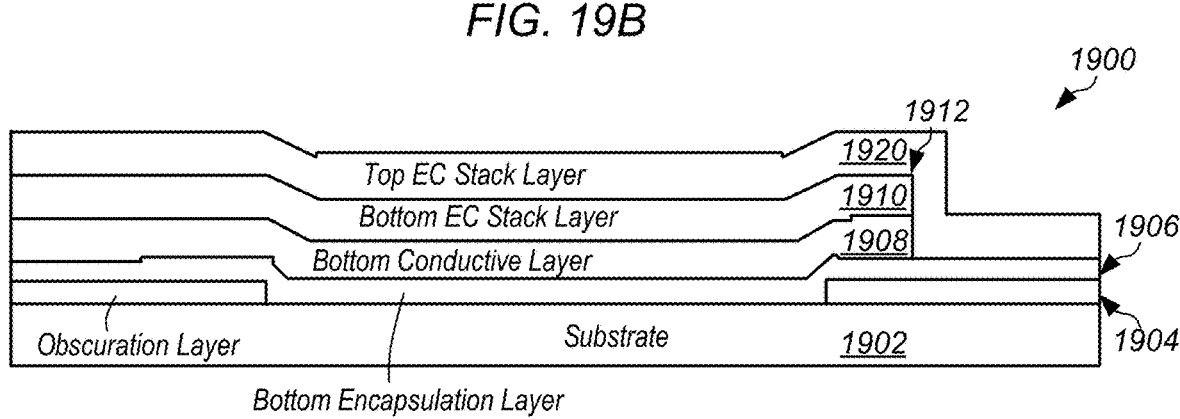

As shown at FIG. 19C, a top EC stack layer 1920 is deposited over the bottom EC stack layer and exposed outer portion of the bottom encapsulation layer at the first side of the EC device 1900. The deposited top EC stack layer covers the edge portions 1912 of the bottom EC stack layer 1910 and the bottom conductive layer 1908.

Figure 19D:
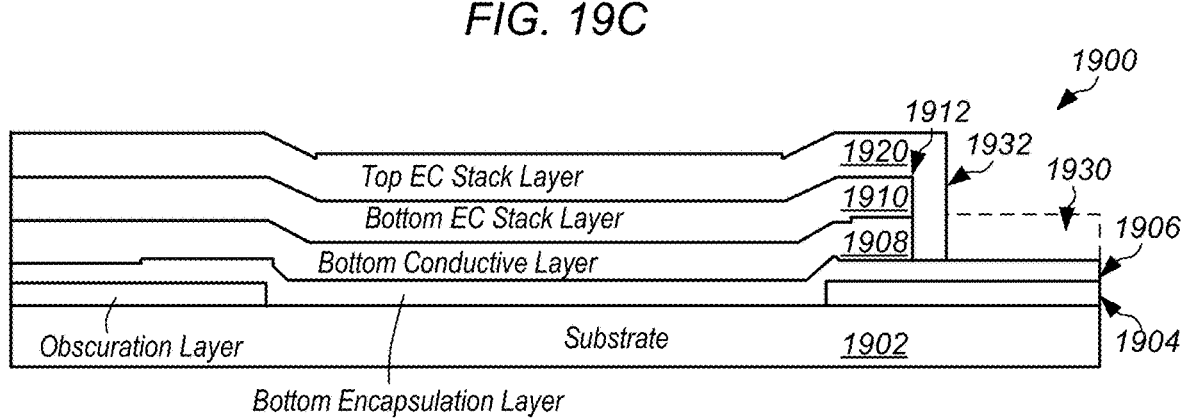

As shown at FIG. 19D, an outer portion of the top EC stack layer 1920 can be selectively removed 1930 proximate to the first side of the EC device 1900, via a removal operation 1930, to expose the outer portion of the bottom encapsulation layer 1906 proximate to the first side. The removal operation 1930, which can include a laser ablation operation, can leave an edge portion 1932 of the top EC layer 1920 which covers the edge portions 1912 of the bottom EC layer 1910 and bottom conductive layer from exposure to an external environment.

Figure 19E:
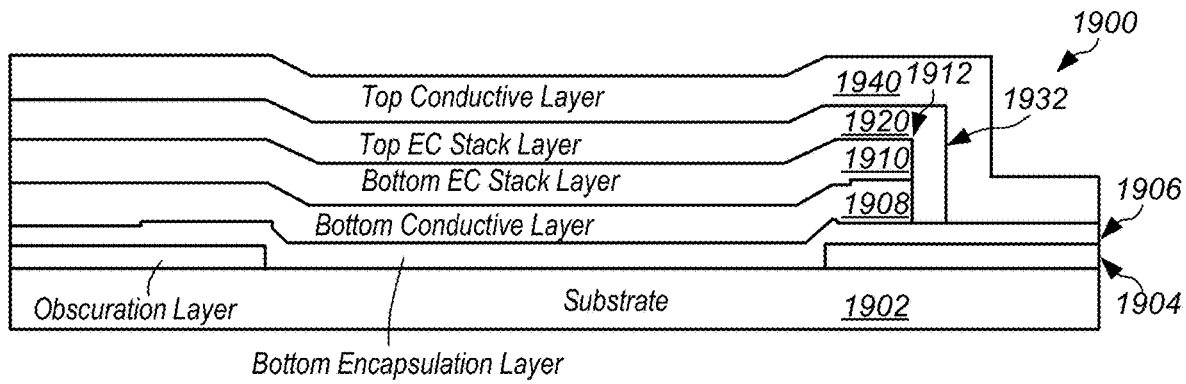

As shown at FIG. 19E, a top conductive layer 1940 is deposited over the top EC stack layer 1920 and exposed outer portion of the bottom encapsulation layer 1906 at the first side of the EC device 1900. The deposited top conductive layer 1940 covers the edge portions 1932 of the top EC stack layer 1920. As shown, the edge portions 1932 of the top EC stack layer 1920 isolate the top and bottom conductive layers 1940, 1908 from each other, while the top conductive layer 1940 isolates the edge portions 1932 of the top EC stack layer from the external environment.

Figure 19F:
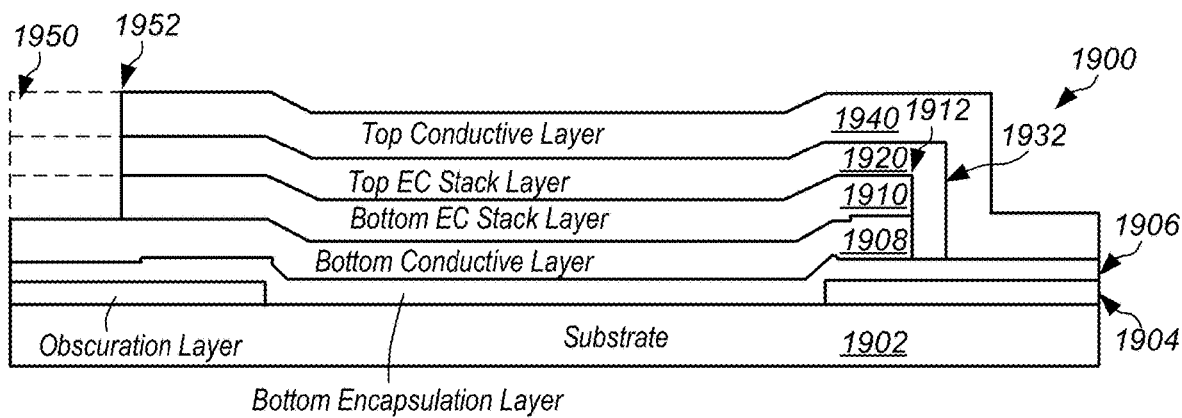

As shown at FIG. 19F, an outer portion of the top conductive layer 1940, top EC stack layer 1920, and bottom EC stack layer 1910 can be selectively removed proximate to a second side of the EC device 1900, via a removal operation 1950. The removal operation 1950, which can include a laser ablation operation, can restrict the edge portions 1952 of at least the top conductive layer 1940, top EC stack layer 1920, and bottom EC stack layer 1910 from the edge of the EC device 1900 at the second side of the device. As a result, the EC stack layers 1910, 1920 are restricted in area from extending through the entire area of the EC device 1900. In addition, as shown, the removal operation 1950 can expose an outer portion of the bottom conductive layer at the second side of the EC device 1900.

Figure 19G:
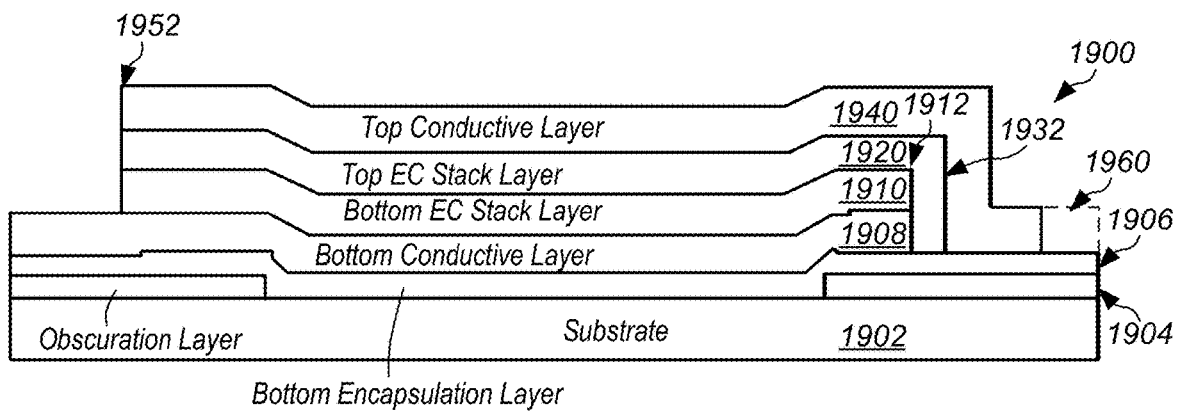

As shown at FIG. 19G, an outer portion of the top conductive layer 1940 can be selectively removed 1960 proximate to the first side of the EC device 1900. The removal operation 1960, which can include a laser ablation operation, can restrict the top conductive layer 1940 from the edge of the EC device 1900 at the first side of the device. As a result, a pathway to couple a bus bar to the bottom encapsulation layer 1906 is established.

In some embodiments, the removal operations are referred to as "patterning". The various layers in the EC device can be patterned with laser ablation, a succession of precision shadow masks, and/or photolithography. In some embodiments, the various layers are deposited in the form as shown in FIG. 19G without any removal operation, via one or more maskings which selectively expose a portion of the EC device, and a layer is deposited in the portion, so that the deposited layer has a certain shape and size.

Subsequent to removal operation 1960, a top encapsulation layer can be deposited on the top conductive layer 1940, and one or more sets of bus bars can be coupled to the EC device 1900. The bus bars can include two or more sets of two bus bars per set, so that at least four bus bars are included in the device 1900. In some embodiments, a symmetrical aperture shape is achieved by structuring the contacts and the bus bars of the device 1900 so that a circularly symmetrical aperture is approximated better by 4+ bus bar segments rather than by 2 bus bars on opposite sides of the device 1900.

Figure 20A:
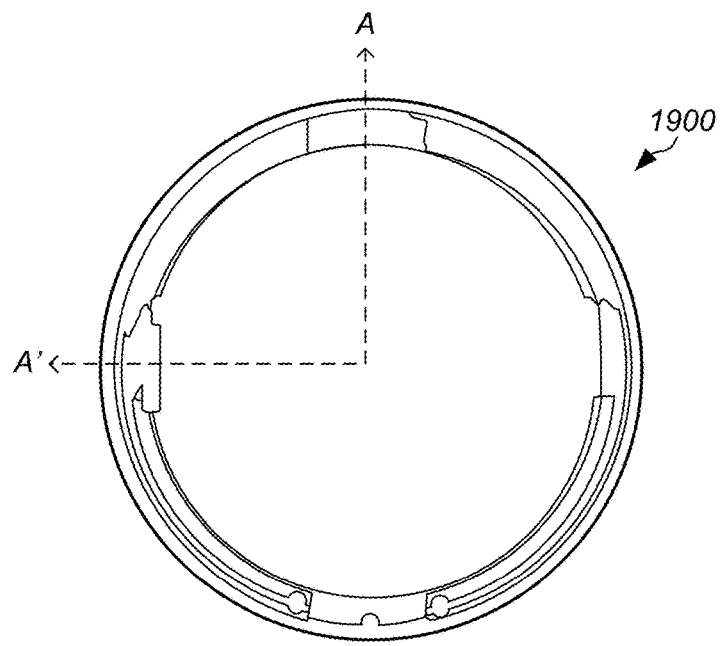
FIG. 20A-B illustrate an EC device subsequent to depositing the top encapsulation layer on the EC device and coupling one or more sets of bus bars to the EC device, according to some embodiments.
Figure 20B:
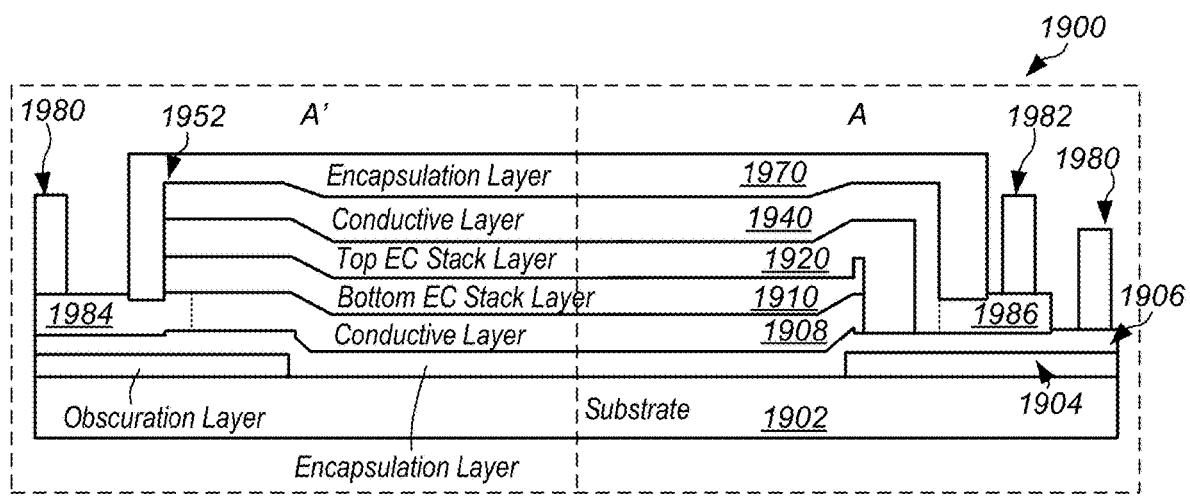

FIG. 20A-B illustrate EC device 1900 subsequent to depositing the top encapsulation layer 1970 on the EC device and coupling one or more sets 1980, 1982 of bus bars to the EC device, according to some embodiments, so that one set of bus bars 1980 couples to at least an outer portion 1984 of a bottom conductive layer 1908 and another set of bus bars 1982 couples to an outer portion of a top conductive layer 1940.

As shown, in some embodiments a top encapsulation layer 1970 is deposited over a portion of the EC device, so that the top encapsulation layer covers one or more exposed edge portions 1952 of the EC stack layers 1910, 1920, thereby completing an isolation of the edge portions of the EC stack layers 1910, 1920 from the external environment.

In some embodiments, the outer portions 1984, 1986 of the conductive layers is a separate material from the remainder of the respective layers 1908, 1940. For example, outer portions 1984, 1986, which are exposed to the external environment, may comprise non-transparent conducting material which resists moisture permeation, while the remainder of the layers 1908, 1940 comprises a transparent conducting material, including TCO, which transports moisture. As a result, the outer portions 1984, 1986 of the conductive layers collectively, with the encapsulation layers 1970, 1906, preclude moisture permeation between the external environment and the EC stack layers 1910, 1920. The illustrated top encapsulation layer is minimally sufficient to complete the isolation of the EC stack layers 1910, 1920, so that the various encapsulation layers 1906, 1970 and conductive layers 1908, 1940 collectively isolate the EC stack layers 1910, 1920, so that moisture permeation between the EC stack layers and the external environment is restricted.

As shown, FIG. 20B shows two different cross sections "A" and "A'" of the EC device 1900, where the cross sections A and A' are perpendicular to each other. As a result, the first side of the EC device 1900 is 90-degrees offset from the second side of the EC device 1900.

As noted above, the top encapsulation layer 1970 can include one or more of an AR layer, IR cut layer, etc. In some embodiments, the encapsulation layer 1970 includes a dense multilayer structure (e.g., up to 100 layers) of alternating high refractive index materials and low refractive index materials. Each of the alternating layers may be up to 5 microns thick. In some embodiments, the top encapsulation layer 1970 covers the EC stack layers, conductive layers, and bus bars. Due to the thick multilayer structure of an encapsulation, the encapsulation layer may reduce moisture permeation so that the EC device is sufficiently protected and does not require a top substrate to restrict moisture permeation.

In some embodiments, an encapsulation layer includes an inorganic multilayer stack. Such a multilayer structure of alternating high/low refractive index materials, e.g. $Si_3N_4$/ $SiO_2$, can be applied by e.g. a meta mode process (sputtering). This requires very clean surfaces with minimal particles that could contribute to pathways for moisture through the film. It is important to have good adhesion of the stack to device surfaces and to minimize compressive stress in the stack to <600 MPa. Dense amorphous alternating inorganic stacks can be applied by PECVD methods. These films can be highly adherent with reduced defects due to the amorphous, conforming film properties. Dense reduced defect multilayer coatings can also be applied by Atomic Layer Deposition (ALD) techniques. ALD techniques which can be utilized include, and are not limited to, thermal ALD techniques, plasma ALD techniques, etc.

In some embodiments, a multi-layer coating applied by ALD techniques includes a multi-layer stack comprising at least a 5 nanometer-thick layer of aluminum oxide ($Al_2O_3$), at least a 5 nanometer-thick layer of titanium oxide ($TiO_x$), where the multi-layer stack includes a total thickness which is between 50 nanometers to 200 nanometers, inclusive. In some embodiments, the multi-layer stack includes a total layer thickness which is between 100 nanometers and 150 nanometers, inclusively.

In some embodiments, an encapsulation layer includes a multilayer stack comprising alternating organic/inorganic units including an organic monomer including an acrylate and inorganic layer such as $SiO_2$ or $Al_2O_3$. A barrier stack can include multiple subsequently deposited dyads to achieve low moisture penetration rates. Such a stack relaxes the particulate contamination requirement and reduces the chances of crack type paths through the complete stack. The whole process is done in vacuum, and the monomer can be applied as a liquid and rapidly cured. The next deposition can include the inorganic layer, etc. The organic layer can coat defects conformally and prevent defects from propagating directly through the stack. The pathway for water to enter through the stack is very torturous and the permeation rate can be reduced.

In some embodiments, an encapsulation layer can include a barrier layer stack which is laminated on top of the EC stack. For example, an encapsulation layer can include one or more barrier layers, which can include a multi-layer stack, which is formed on a substrate, and the substrate can be laminated on the EC stack. The substrate can include a thin glass substrate, polymer substrate, etc., which is resistant to moisture permeation through the substrate. The multi-layer stack can include one or more AR layers, IR cut-off filter layers, etc. In some embodiments, the multi-layer stack is at least partially permeable to moisture, and the substrate on which the multi-layer stack is formed is moisture-permeation resistant, so the encapsulation layer which includes the substrate and the multi-layer stack is resistant to moisture permeation. The substrate can be laminated to the EC stack via one or more various adhesives, one or more index adaptation layers, etc.

In some embodiments, a barrier film stack, including VITEX™, is formed on a thin polymer substrate, which can include PET. This barrier stack can then be laminated to an EC device using one or more various adhesives, including silicone adhesives, other "dry" adhesives such as SENTRYGLAS™, etc.

Figure 21A:
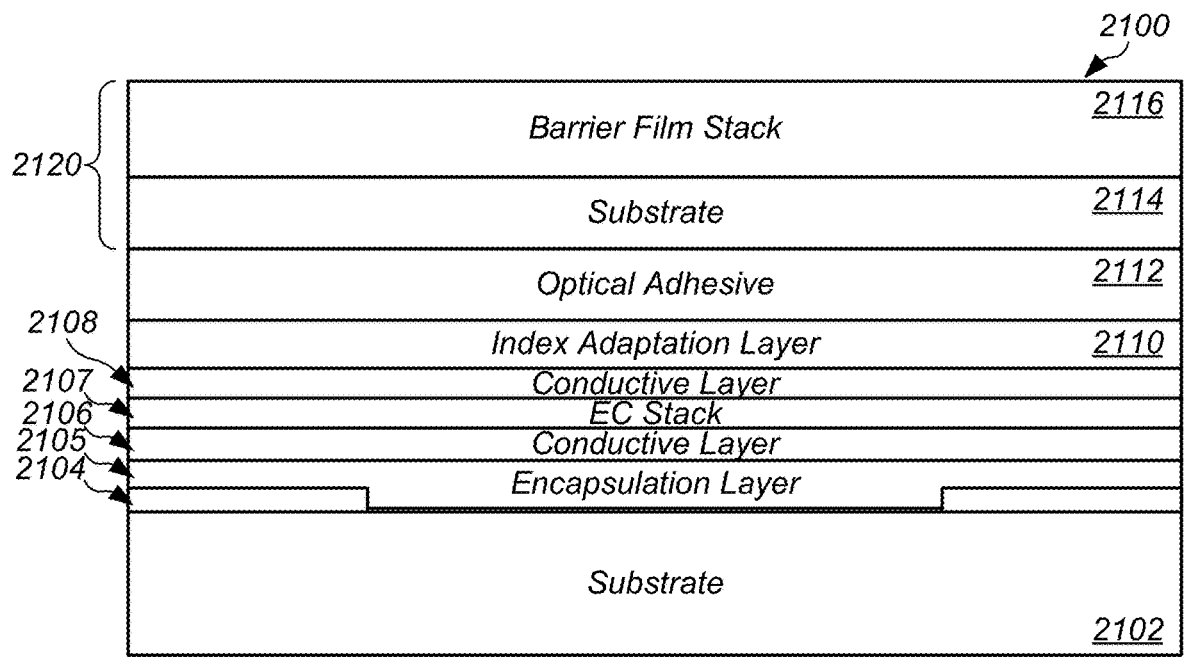
FIG. 21A-D illustrate an EC Device which includes a laminated encapsulation layer, according to some embodiments.

FIGS. 21A-D illustrates an EC Device 2100 which includes a laminated encapsulation layer 2120, according to some embodiments. FIG. 21A illustrates an EC device 2100, which can be included in one or more various EC devices illustrated in various other drawings in the disclosure, includes a single substrate 2102 and various layers 2104-2110 deposited on the single substrate, including an obscuration layer 2104, a bottom encapsulation layer 2105, a bottom conductive layer 2106, an EC stack 2107, a top conductive layer 2108, and an index adaptation layer 2110. The index adaptation layer can enable bonding of the laminated encapsulation layer 2120 to the EC device 2100. As shown, encapsulation layer 2120 of FIG. 21A includes a barrier film stack 2116, which can include a multi-layer stack, which is formed on a substrate 2114. The encapsulation layer 2120 is laminated on the EC device and is bonded to the device 2100 based at least in part upon an optical adhesive 2112, and index adaptation layer 2110, etc. In some embodiments, one or more of the illustrated layers may be absent. For example, one or more of the obscuration layer 2104 and bottom encapsulation layer 2105 may be absent from an EC device 2100. The substrate 2102 may resist moisture permeation; as a result, the bottom encapsulation layer 2105 may be redundant.

Figure 21B:
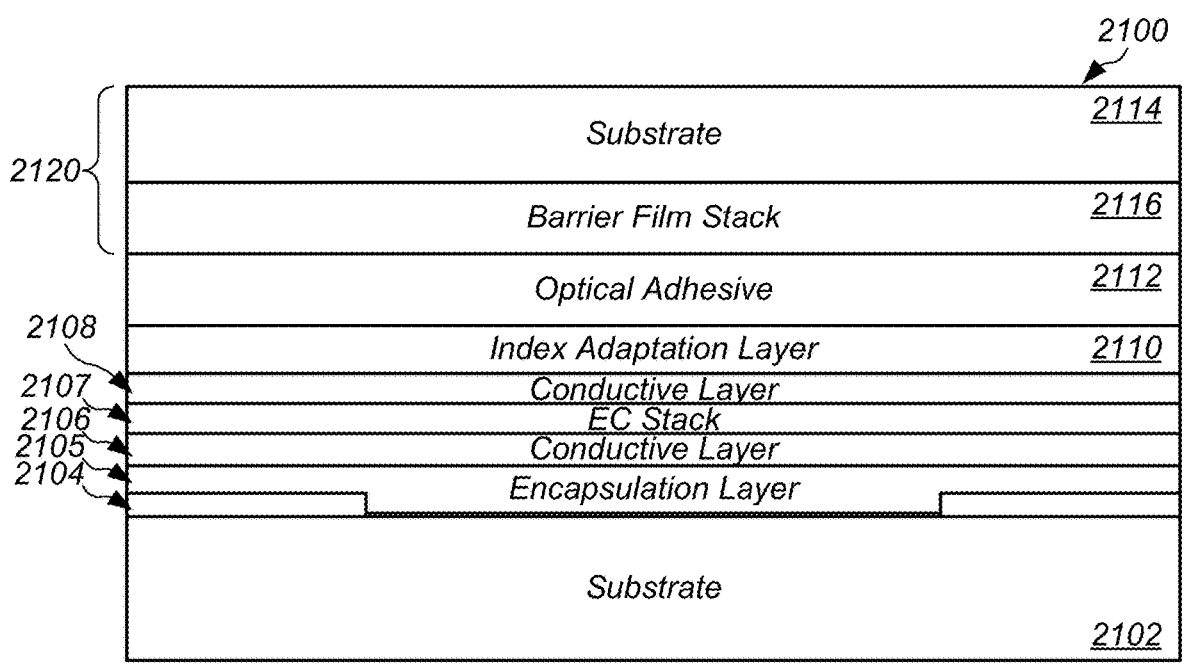

FIG. 21B illustrates an EC device 2100, which can be included in one or more various EC devices illustrated in various other drawings in the disclosure, where the arrangement of the substrate and barrier film stack is altered, relative to the EC device 2100 as illustrated in FIG. 21A, so that the barrier film stack is between the substrate and the EC stack. The EC device 2100 illustrated in FIG. 21B includes a single substrate 2102 and various layers 2104-2110 deposited on the single substrate, including an obscuration layer 2104, a bottom encapsulation layer 2105, a bottom conductive layer 2106, an EC stack 2107, a top conductive layer 2108, and an index adaptation layer 2110. The index adaptation layer can enable bonding of the laminated encapsulation layer 2120 to the EC device 2100. As shown, encapsulation layer 2120 of FIG. 21B includes a barrier film stack 2116, which can include a multi-layer stack, which is formed on a substrate 2114. The encapsulation layer 2120 is laminated on the EC device and is bonded to the device 2100 based at least in part upon an optical adhesive 2112, and index adaptation layer 2110, etc., so that the barrier film stack 2116 is between the substrate and the EC stack 2107. In some embodiments, one or more of the illustrated layers may be absent. For example, one or more of the obscuration layer 2104 and bottom encapsulation layer 2105 may be absent from an EC device 2100. The substrate 2102 may resist moisture permeation; as a result, the bottom encapsulation layer 2105 may be redundant.

Figure 21C:
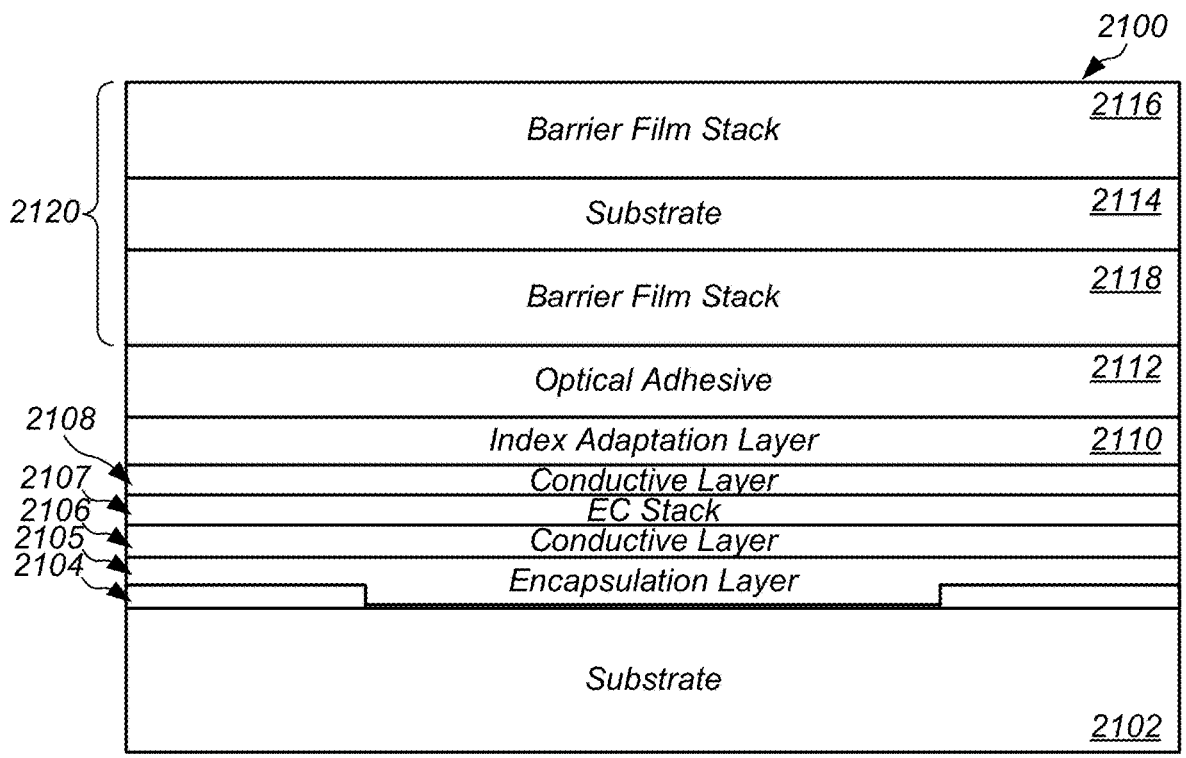

FIG. 21C illustrates an EC device 2100, which can be included in one or more various EC devices illustrated in various other drawings in the disclosure, where one or more barrier film stacks are included on multiple sides of the substrate in the encapsulation layer. The EC device 2100 illustrated in FIG. 21C includes a single substrate 2102 and various layers 2104-2110 deposited on the single substrate, including an obscuration layer 2104, a bottom encapsulation layer 2105, a bottom conductive layer 2106, an EC stack 2107, a top conductive layer 2108, and an index adaptation layer 2110. The index adaptation layer can enable bonding of the laminated encapsulation layer 2120 to the EC device 2100. As shown, encapsulation layer 2120 of FIG. 21C includes two separate barrier film stacks 2116 and 2118, one or more of which can include a multi-layer stack, which are formed on opposite sides of a substrate 2114. The encapsulation layer 2120 is laminated on the EC device and is bonded to the device 2100 based at least in part upon an optical adhesive 2112, and index adaptation layer 2110, etc., so that the barrier film stack 2116 is between the substrate and the EC stack 2107. In some embodiments, one or more of the illustrated layers may be absent. For example, one or more of the obscuration layer 2104 and bottom encapsulation layer 2105 may be absent from an EC device 2100. The substrate 2102 may resist moisture permeation; as a result, the bottom encapsulation layer 2105 may be redundant.

Figure 21D:
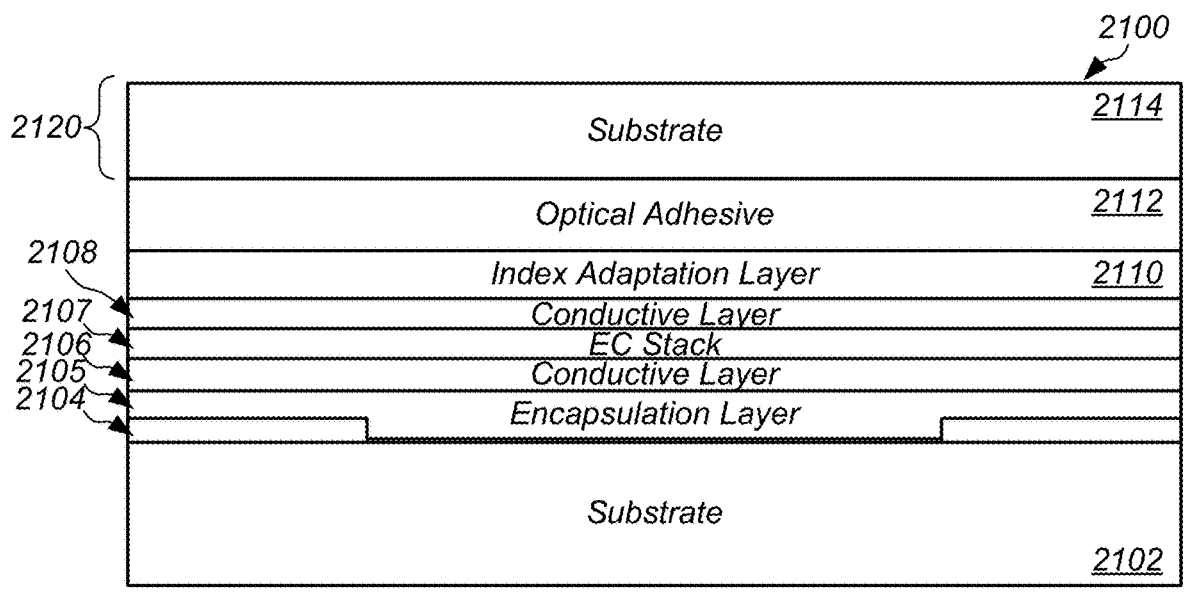

FIG. 21D illustrates an EC device 2100, which can be included in one or more various EC devices illustrated in various other drawings in the disclosure, where barrier film stacks separate from a substrate are absent from the encapsulation layer. Such an encapsulation layer may include a substrate which is structured to resist moisture permeation. The EC device 2100 illustrated in FIG. 21D includes a single substrate 2102 and various layers 2104-2110 deposited on the single substrate, including an obscuration layer 2104, a bottom encapsulation layer 2105, a bottom conductive layer 2106, an EC stack 2107, a top conductive layer 2108, and an index adaptation layer 2110. The index adaptation layer can enable bonding of the laminated encapsulation layer 2120 to the EC device 2100. As shown, encapsulation layer 2120 of FIG. 21D includes a substrate 2114, which can be a substrate structured to resist moisture permeation. The encapsulation layer 2120 is laminated on the EC device and is bonded to the device 2100 based at least in part upon an optical adhesive 2112, and index adaptation layer 2110, etc., so that the barrier film stack 2116 is between the substrate and the EC stack 2107. In some embodiments, one or more of the illustrated layers may be absent. For example, one or more of the obscuration layer 2104 and bottom encapsulation layer 2105 may be absent from an EC device 2100. The substrate 2102 may resist moisture permeation; as a result, the bottom encapsulation layer 2105 may be redundant.

In some embodiments, the substrate comprises a thin glass laminate, including a paper glass foil and a layer of adhesive. The thin glass laminate can include a glass foil that is approximates 25 micrometers in thickness. In some embodiments, the thin glass laminate can include one or more various thickness. For example, the thin glass laminate can be approximately 50 micrometers in thickness.

In some embodiments, photochromic or thermochromic materials may be used in place or in addition to the electrochromic (EC) materials disclosed herein. For example, some regions of a device may comprise electrochromic materials, including an EC stack, while other regions may comprise at least one of an electrochromic, photochromic, or thermochromic material. Suitable photochromic materials include, but are not limited to, triaryl-methanes, stilbenes, azastilbenes, nitrones, fulgides, spriropyrans, naphthopyrans, sprio-oxazines, and quinones. Suitable thermochromic materials include, but are not limited to, liquid crystals and leuco dyes. Both photochromic and thermochromic materials can be formed on the substrate in a well-known manner. No bus bars, electrodes, etc. would be needed for photochromic or thermochromic dynamic regions because light and heat respectively modulate the properties of the materials. One exemplary embodiment using photochromic and/or thermochromic dynamic regions could be a window having at least one electrochromic dynamic region towards the top of the window that is actively controlled for daylighting, to selectively switch between one or more particular transmission patterns, etc., and at least one photochromic dynamic region towards the bottom of the window that self-darkens when under direct light, and at least a second electrochromic region posited in another region of the device.

In some embodiments, one or more EC devices can be used as an aperture filter, iris, etc. for a camera device, and may be structured to selectively apodize, as discussed further above. In some embodiments, one or more EC devices can be included in architectural 'motherboards' which can be shipped across extended distance before further processing. In some embodiments, one or more EC devices can be included in one or more single pane windows for transportation applications and other uses where weight is important. In some embodiments, one or more EC devices, including one or more EC devices which include a single substrate, can be used to hide or reveal information on displays for hand held devices, computers, etc. In some embodiments, one or more EC devices can be used in dynamic eyewear.

Further, it should be understood that one embodiment of the subject matter disclosed herein can comprise a window, including an architectural window, having a single pane, or lite, that comprises a plurality of independently controlled dynamic regions. Another embodiment of the subject matter disclosed herein comprises an insulated glazing unit ("IGU") comprising multiple regions of electrochromic window on one pane and clear glass on the other pane. Yet another embodiment of the subject matter disclosed herein comprises an IGU comprising multiple regions of electrochromic window on one pane and a low-E, tinted, or reflective glass on the other pane. Still another embodiment of the subject matter disclosed herein comprises an IGU comprising multiple regions of electrochromic window on one pane of the IGU and a patterned or special glass on the other pane in which the patterning or features may match, compliment, and/or contrast the areas of dynamic regions on the first pane. It should be understood that the foregoing embodiments can be configured, structured, etc. so that the lite comprising the plurality of dynamic region is a clear lite, a low-E lite, a reflective, and/or partially reflective lite.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
    a substrate;
    a plurality of layers, deposited on the substrate, wherein the plurality of layers comprises:
        an electrochromic (EC) stack;
        at least one conductive layer; and
        at least one encapsulation layer;
        wherein at least one of the plurality of layers comprises a moisture-resistant layer positioned between the substrate and the EC stack; and
    at least one obscuration layer which at least partially obscures at least a portion of the plurality of layers from a surface of the substrate opposite the surface on which the plurality of layers is deposited, wherein the at least one obscuration layer is positioned between the substrate and the moisture-resistant layer.

2. The apparatus of claim 1, wherein the at least one obscuration layer at least partially reflects laser processing wavelengths used to execute removal of a portion of the plurality of layers from the substrate.

3. The apparatus of claim 1, wherein the at least one obscuration layer is an annular structure.

4. The apparatus of claim 1, wherein:
    the at least one obscuration layer is located between the plurality of layers and the substrate; and
    the moisture-resistant layer comprises at least one of:
        the at least one conductive layer; or
        the at least one encapsulation layer.

5. The apparatus of claim 1, further comprising a buffer layer, deposited between the at least one obscuration layer and the plurality of layers, wherein the buffer layer is structured to prevent damage to the at least one obscuration layer during removal of one or more portions of the plurality of layers.

6. The apparatus of claim 5, wherein the buffer layer comprises at least one layer of $Al_2O_3$, $SiO_x$, or similar materials in order to not substantially affect the optical properties of the EC device.

7. The apparatus of claim 1, wherein the at least one obscuration layer has an optical density greater than or equal to three.

8. The apparatus of claim 1, wherein the at least one encapsulation layer and the at least one conductive layer collectively restrict moisture permeation between the EC stack and an ambient environment.

9. The apparatus of claim 1, wherein one or more outer portions of the EC stack are selectively removed to expose edge portions of the EC stack and to reduce the area of the EC stack relative to at least one of the conductive layer and the encapsulation layer, such that one or more of the conductive layer and the encapsulation layer extend over the edge portions of the EC stack to restrict moisture permeation between the EC stack and the ambient environment.

10. The apparatus of claim 1, wherein:
    the at least one encapsulation layer comprises a barrier layer stack formed on another substrate which is resistant to moisture permeation, wherein the other substrate is laminated on the plurality of layers.

11. The apparatus of claim 1, wherein the conductive layer comprises one or more edge portions which resist moisture permeation and an inner portion which permits moisture permeation, wherein the one or more edge portions of the conductive layer and the at least one encapsulation layer portion restrict moisture permeation between the EC stack and inner portion of the conductive layer and the ambient environment.

12. A method, comprising:
    depositing a plurality of layers on a substrate, the depositing of the plurality of layers comprising:
        depositing an electrochromic (EC) stack,
        depositing at least two conductive layers above and below the EC stack,
        depositing at least one encapsulation layer,
        wherein at least one of the plurality of layers comprises a moisture-resistant layer positioned between the substrate and the EC stack; and
    depositing at least one obscuration layer on the substrate, wherein the obscuration layer is structured to obscure at least a portion of the plurality of layers from a surface of the substrate opposite another surface on which the plurality of layers is deposited, wherein the at least one obscuration layer is positioned between the substrate and the moisture-resistant layer.

13. The method of claim 12, wherein depositing at least one encapsulation layer comprises one or more of:
    depositing an encapsulation layer on a conductive layer that is deposited on the EC stack; or
    depositing an encapsulation layer on the substrate, such that the encapsulation layer is between the EC stack and the substrate.

14. The method of claim 12, wherein the obscuration layer is structured to at least partially reflecting laser processing wavelengths used to execute removal of a portion of the plurality of layers from the substrate.

15. The method of claim 12, further comprising:
    coupling at least one set of bus bars to the at least one conductive layer above and below the EC stack, wherein each set of bus bars comprises at least one bus bar coupled to the top conductive layer at a location proximate to one side of the substrate and at least one other bus bar coupled to at least the bottom conductive layer proximate to an opposite side of the substrate.

16. The method of claim 15, wherein the obscuration layer at least partially obscures the bus bars so that a viewer is precluded from seeing the bus bars or any evidence of laser processing.

17. The method of claim 12, further comprising:
depositing the at least two conductive layers above and below the EC stack to form a top conductive layer above the EC stack and a bottom conductive layer below the EC stack, wherein the EC stack comprises:
a bottom EC stack layer which comprises one of an EC film or a counter-electrode film;
a top EC stack layer which comprises another of the EC film or the counter-electrode film; and
an ion conducting (IC) layer between the top EC stack layer and the bottom EC stack layer;
wherein the depositing the plurality of layers further comprises depositing one of the top conductive layer, top EC stack layer, IC layer, bottom EC stack layer, or bottom conductive layer in a particular pattern on the substrate, based at least in part upon one or more masking elements, such that one or more of the conductive layers and the encapsulation layer extend over the edge portions of the EC stack to restrict moisture permeation between the EC stack and the ambient environment.

18. A method, comprising:
structuring an electrochromic device, the electrochromic device comprising a substrate, an obscuration layer, an electrochromic (EC) stack, and a plurality of layers on opposite sides of the EC stack, to obscure at least a portion of the plurality of layers from a surface of the substrate, the structuring comprising:
depositing at least one obscuration layer on the substrate; and
depositing the plurality of layers on opposite sides of the EC stack, such that the at least one obscuration layer at least partially obscures at least a portion of the plurality of layers from a surface of the substrate opposite another surface on which the plurality of layers is deposited, wherein at least one of the plurality of layers comprises a moisture-resistant layer positioned between the substrate and the EC stack, and wherein the at least one obscuration layer is positioned between the substrate and the moisture-resistant layer.

19. The method of claim 18, wherein the at least one obscuration layer is deposited between the plurality of layers and the substrate to at least partially reflect laser processing wavelengths used to execute removal of a portion of the plurality of layers from the substrate.

20. The method of claim 18, wherein the at least one obscuration layer is deposited on the substrate to at least partially obscure at least one set of bus bars so that a viewer is precluded from seeing the at least one set of bus bars or any evidence of laser processing.

* * * * *